(12) United States Patent
Takashima

(10) Patent No.: US 9,640,090 B2
(45) Date of Patent: May 2, 2017

(54) CRYPTOGRAPHIC SYSTEM AND COMPUTER READABLE MEDIUM

(71) Applicant: MITSUBISHI ELECTRIC CORPORATION, Tokyo (JP)

(72) Inventor: Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/118,797

(22) PCT Filed: Feb. 24, 2014

(86) PCT No.: PCT/JP2014/054280
§ 371 (c)(1),
(2) Date: Aug. 12, 2016

(87) PCT Pub. No.: WO2015/125293
PCT Pub. Date: Aug. 27, 2015

(65) Prior Publication Data
US 2017/0053566 A1  Feb. 23, 2017

(51) Int. Cl.
*G06F 21/00* (2013.01)
*G09C 1/00* (2006.01)
(Continued)

(52) U.S. Cl.
CPC ............... *G09C 1/00* (2013.01); *H04L 9/08* (2013.01); *H04L 9/083* (2013.01); *H04L 9/0861* (2013.01);
(Continued)

(58) Field of Classification Search
CPC .. G09C 1/00; H04L 9/08; H04L 9/083; H04L 9/0861; H04L 9/3073; H04L 2209/24
See application file for complete search history.

(56) References Cited

U.S. PATENT DOCUMENTS 7,634,085 B1   12/2009  Sahai et al.
8,559,631 B1 * 10/2013  Waters ................... H04L 9/085
                                                         380/28
(Continued)

FOREIGN PATENT DOCUMENTS

JP   2010-273317 A   12/2010
JP   2011-124853 A    6/2011
(Continued)

OTHER PUBLICATIONS

Lewko, Allison, et al. "Fully secure functional encryption: Attribute-based encryption and (hierarchical) inner product encryption.", Retrieved from http://link.springer.com/chapter/10.1007/978-3-642-13190-5_4 , Annual International Conference on the Theory and Applications of Cryptographic Techniques. Springer Berlin Heidelberg, 2010.*

(Continued)

*Primary Examiner* — Chau Le
*Assistant Examiner* — Muhammad Chaudhry
(74) *Attorney, Agent, or Firm* — Birch, Stewart, Kolasch & Birch, LLP

(57) ABSTRACT

A cryptographic system (10) performs a cryptographic process using a basis. B and a basis B*. An encryption device (200) generates a ciphertext including a transmission-side vector being a vector in the basis B and being generated using one vector of a first vector consisting of coefficients $y_j$ of a polynomial having $x_i$ as roots and a second vector consisting of $v_1^i$ being a power of $v_1$. A decryption device (300) decrypts the ciphertext generated by the encryption device (200) with a decryption key including a reception-side vector being a vector in the basis B* and being generated using the other vector of the first vector and the second vector.

9 Claims, 26 Drawing Sheets

(51) Int. Cl.
*H04L 9/08* (2006.01)
*H04L 9/30* (2006.01)

(52) U.S. Cl.
CPC ........ *H04L 9/3073* (2013.01); *H04L 2209/24* (2013.01)

(56) References Cited

U.S. PATENT DOCUMENTS

| | | | |
|---|---|---|---|
| 8,559,638 B2 | 10/2013 | Takashima et al. | |
| 8,577,030 B2 | 11/2013 | Takashima et al. | |
| 8,913,742 B2 | 12/2014 | Takashima et al. | |
| 8,938,623 B2 | 1/2015 | Takashima et al. | |
| 9,106,408 B2 | 8/2015 | Takashima et al. | |
| 2007/0195948 A1* | 8/2007 | Bunimov | H04L 9/065 380/28 |
| 2009/0080658 A1 | 3/2009 | Waters et al. | |
| 2012/0045056 A1 | 2/2012 | Takashima et al. | |
| 2012/0284530 A1 | 11/2012 | Takashima et al. | |
| 2013/0028415 A1 | 1/2013 | Takashima et al. | |
| 2013/0173929 A1 | 7/2013 | Takashima et al. | |
| 2013/0322627 A1 | 12/2013 | Takashima et al. | |
| 2015/0098566 A1 | 4/2015 | Takashima et al. | |

FOREIGN PATENT DOCUMENTS

| | | |
|---|---|---|
| JP | 2011-128609 A | 6/2011 |
| JP | 2011-232475 A | 11/2011 |
| JP | 2012-133214 A | 7/2012 |
| JP | 2012-155088 A | 8/2012 |
| JP | 2012-249215 A | 12/2012 |
| JP | 2013-148822 A | 8/2013 |
| JP | 2014-29415 A | 2/2014 |

OTHER PUBLICATIONS

Okamoto, Tatsuaki, et al. "Hierarchical predicate encryption for inner-products.", Retrieved from http://link.springer.com/chapter/10.1007/978-3-642-10366-7_13 International Conference on the Theory and Application of Cryptology and Information Security. Springer Berlin Heidelberg, 2009.*

Attrapadung et al., "Expressive Key-Policy Attribute-Based Encryption with Constant-Size Ciphertexts", International Association for Cryptologic Research 2011, pp. 90-108.

Attrapadung et al., "Functional Encryption for Inner Product: Achieving Constant-Size Ciphertexts with Adaptive Security or Support for Negation", International Association for Cryptologic Research 2010, pp. 384-402.

Brent Waters, "Dual System Encryption: Realizing Fully Secure IBE and HIBE under Simple Assumptions", pp. 1-37, 2009.

Cécile Delerablée, "Identity-Based Broadcast Encryption with Constant Size Ciphertexts and Private Keys", International Association for Cryptology Research 2007, pp. 200-215.

Emura et al., "A Ciphertext-Policy Attribute-Based Encryption Scheme with Constant Ciphertext Length", Springer-Verlag Berlin Heidelberg 2009, pp. 13-23.

Han et al., "Attribute-Based Signcryption Scheme with Non-monotonic Access Structure", 2013 IEEE, pp. 796-802.

Katz et al., "Predicate Encryption Supporting Disjunctions, Polynomial Equations, and Inner Products", pp. 1-28, 2008.

Lewko et al., "Decentralizing Attribute-Based Encryption", pp. 1-31, 2011.

Lewko et al., "Fully Secure Functional Encryption: Attribute-Based Encryption and (Hierarchical) Inner Product Encryption", pp. 1-56, 2010.

Lewko et al., "New Techniques for Dual System Encryption and Fully Secure HIBE with Short Ciphertexts", pp. 1-21, 2010.

Lewko et al., "Revocation Systems with Very Small Private Keys", pp. 1-26, 2010.

Li et al., "An Expressive Decentralizing KP-ABE Scheme with Constant-Size Ciphertext", International Journal of Network Security, vol. 15, No. 3, May 2013, pp. 161-170.

Okamoto et al., "Achieving Short Ciphertexts or Short Secret-Keys for Adaptively Secure General Inner-Product Encryption", Springer-Verlag Berlin Heidelberg 2011, pp. 138-159.

Okamoto et al., "Adaptively Attribute-Hiding (Hierarchical) Inner Product Encryption", pp. 1-33, 2012.

Okamoto et al., "Decentralized Attribute-Based Signatures", Dec. 22, 2011, pp. 1-57.

Okamoto et al., "Efficient Attribute-Based Signatures for Non-Monotone Predicates in the Standard Model", Dec. 22, 2011, pp. 1-41.

Okamoto et al., "Fully Secure Functional Encryption with General Relations from the Decisional Linear Assumption", Nov. 5, 2010, pp. 1-49.

Okamoto et al., "Hierarchical Predicate Encryption for Inner-Products", International Association for Cryptologic Research 2009, pp. 214-231.

Sakai et al., "Identity-Based Broadcast Encryption", Osaka Electro-Communication University, NEC Corporation, 2007.

* cited by examiner

Fig. 3

$$s_0 = \underbrace{(1, \ldots, 1)}_{r \text{ COLUMNS}} \begin{pmatrix} f_1, \ldots, f_r \end{pmatrix} = \sum_{k=1}^{r} f_k$$

Fig. 4

$$\vec{s}^T = \begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix} \begin{pmatrix} f_1, & \cdots & , f_r \end{pmatrix} = \begin{pmatrix} s_1, & \cdots & , s_L \end{pmatrix}$$

CRYPTOGRAPHIC SYSTEM AND COMPUTER READABLE MEDIUM

TECHNICAL FIELD

The present invention relates to a functional encryption (FE) scheme.

BACKGROUND ART

Patent Literature 1 describes a functional encryption (FE) scheme.

CITATION LIST

Patent Literature

Patent Literature 1: JP 2012-133214 A

Non-Patent Literature

Non-Patent Literature 1: Attrapadung, N., Libert, B., de Panafieu, E.: Expressive key-policy attribute-based encryption with constant-size ciphertexts. In: Catalano et al. [6], pp. 90.108

Non-Patent Literature 2: Okamoto, T., Takashima, K.: Achieving Short Ciphertexts or Short Secret-Keys for Adaptively Secure General Inner-Product Encryption. CANS 2011, LNCS, vol. 7092, pp. 138-159 Springer Heidelberg (2011).

Non-Patent Literature 3: Okamoto, T Takashima, K.: Decentralized Attribute-Based Signatures.ePrint http://eprint.iacr.org/2011/701

SUMMARY OF INVENTION

Technical Problem

In the functional encryption scheme described in Patent Literature 1, it is necessary to generate a vector constituting a ciphertext or a vector constituting a decryption key for each attribute category t. The size of a ciphertext is large, so that decryption and so on require processing time.

It is an object of the present invention to reduce the sizes of a ciphertext, a decryption key, a signature, and so on.

Solution to Problem

A cryptographic system according to the present invention performs a cryptographic process using a basis B and a basis B*, and the cryptographic system includes:

a transmission device to generate a transmission-side vector being a vector in the basis B and being generated using one vector of a first vector consisting of coefficients $y_j$ ($j=1, \ldots, n$) of a polynomial having attribute information $x_i$ ($i=1, \ldots, n'$, n' being an integer from 1 to n-1, n being an integer of 2 or greater) as roots and a second vector consisting of $v_1'$ ($i=0, \ldots, n-1$) being a power of predicate information $v_1$; and a reception device to perform a pairing operation on the transmission-side vector and a reception-side vector being a vector in the basis B* and being generated using the other vector of the first vector and the second vector.

Advantageous Effects of Invention

A cryptographic system according to the present invention can reduce the sizes of a ciphertext, a decryption key, a signature, and so on by providing special configurations of vectors used to generate a transmission-side vector and a reception-side vector.

BRIEF DESCRIPTION OF DRAWINGS

FIG. 3 is an explanatory drawing of $s_0$;

FIG. 4 is an explanatory drawing of $\vec{s}^T$;

DESCRIPTION OF EMBODIMENTS

Embodiment 1

Figure 1:
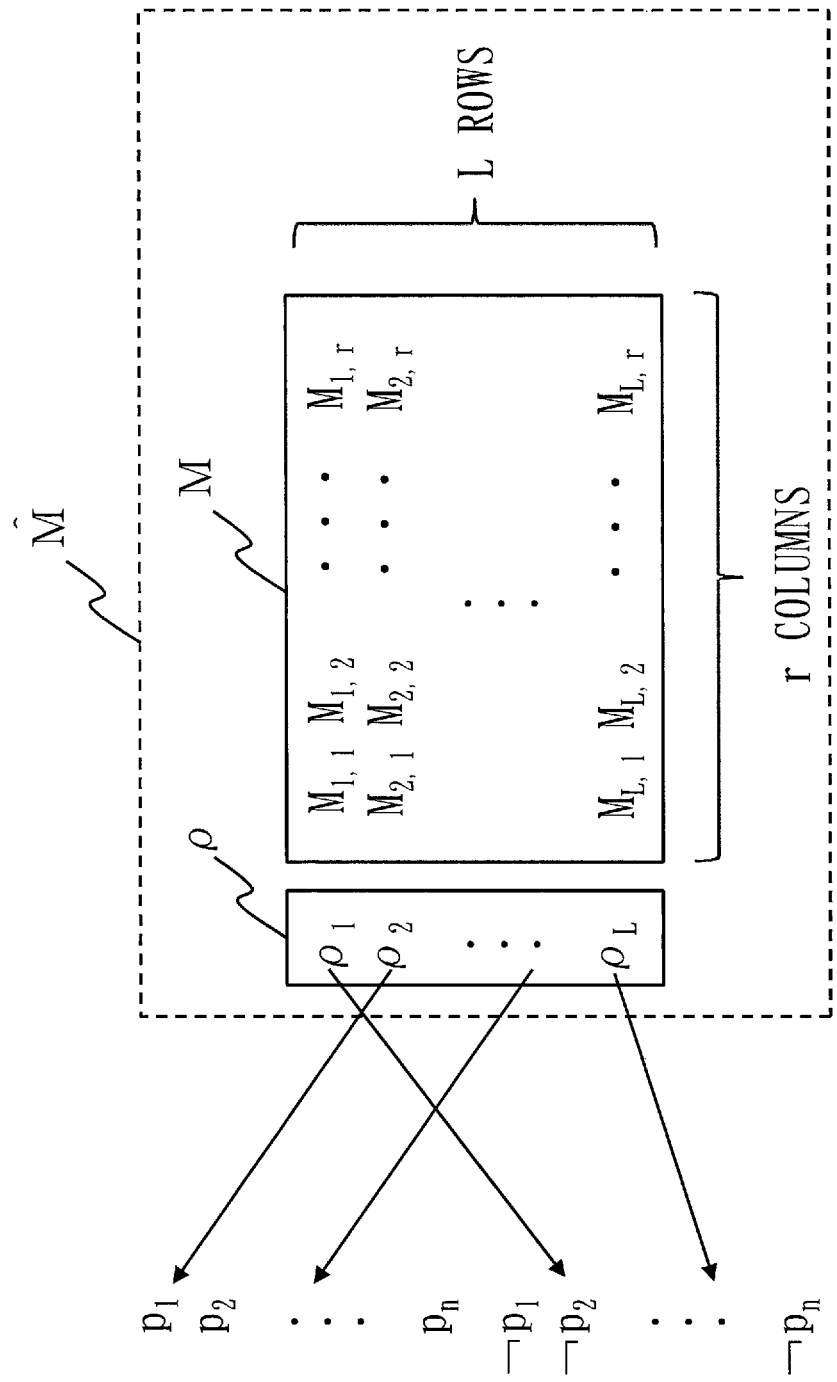
FIG. 1 is an explanatory drawing of a matrix $M^\wedge$.

Notations to be used in the following description will be described.

When A is a random variable or distribution, Formula 101 denotes that y is randomly selected from A according to the distribution of A. That is, y is a random number in Formula 101.

$$y \xleftarrow{R} A \qquad \text{[Formula 101]}$$

When A is a set, Formula 102 denotes that y is uniformly selected from A. That is, y is a uniform random number in Formula 102.

$$y \xleftarrow{U} A \qquad \text{[Formula 102]}$$

Formula 103 denotes that y is set, defined, or substituted by z.

$$y := z \qquad \text{[Formula 103]}$$

When a is a fixed value, Formula 104 denotes that a machine (algorithm) A outputs a on input x.

$$A(x) \to a \qquad \text{[Formula 104]}$$

For example, $$A(x) \to 1$$

Formula 105, namely $F_q$, denotes a finite field of order q.

$$\mathbb{F}_q \qquad \text{[Formula 105]}$$

A vector symbol denotes a vector representation over the finite field $F_q$, as indicated in Formula 106. $\vec{x}$ denotes $$(x_1, \ldots, x_n) \in \mathbb{F}_q^n. \qquad \text{[Formula 106]}$$

Formula 107 denotes that the inner-product, indicated in Formula 109, of two vectors $\vec{x}$ and $\vec{v}$ indicated in Formula 108.

$$\vec{x} \cdot \vec{v} \qquad \text{[Formula 107]}$$

$$\vec{x} = (x_1, \ldots, x_n),$$

$$\vec{v} = (v_1, \ldots, v_n) \qquad \text{[Formula 108]}$$

$$\sum_{i=1}^{n} x_i v_i \qquad \text{[Formula 109]}$$

Note that $X^T$ denotes the transpose of a matrix X.

For a basis B and a basis B* indicated in Formula 110, Formula 111 is established.

$$\mathbb{B} := (b_1, \ldots, b_N),$$

$$\mathbb{B}^* := (b_1^*, \ldots, b_N^*) \qquad \text{[Formula 110]}$$

$$(x_1, \ldots, x_N)_\mathbb{B} := \sum_{i=1}^{N} x_i b_i,$$

$$(y_1, \ldots, y_N)_{\mathbb{B}^*} := \sum_{i=1}^{N} y_i b_i^* \qquad \text{[Formula 111]}$$

Note that $\vec{e}_j$ denotes a normal basis vector indicated in Formula 112.

$$\vec{e}_j := (\overbrace{0 \ldots 0}^{j-1}, 1, \overbrace{0 \ldots 0}^{n-j}) \in \mathbb{F}_q^n \text{ for } j = 1, \ldots, n, \qquad \text{[Formula 112]}$$

In the following description, when Vt, nt, ut, wt, zt, nu, wu, and zu are each represented as a subscript or superscript, these Vt, nt, ut, wt, zt, nu, wu, and zu respectively denote $V_t$, $u_t$, $n_t$, $w_t$, $z_t$, $n_u$, $w_u$, and $z_u$. Similarly, when δi,j is represented as a superscript, this δi,j denotes $\delta_{i,j}$. Similarly, when ϕj is represented as a superscript, this ϕj denotes $\phi_j$. Similarly, when s0 is represented as a superscript, this s0 denotes $s_0$.

When → denoting a vector is attached to a subscript or superscript, it is meant that this → is attached as a superscript to the subscript or superscript.

In the following description, a cryptographic process and a cryptographic scheme include not only a narrowly-defined cryptographic process for keeping information secure from a third party, but also include a signature process, and include a key generation process, an encryption process, a decryption process, a signature process, and a verification process.

In Embodiment 1, a basic concept for implementing a cryptographic scheme will be described, and then a structure of a cryptographic scheme according to Embodiment 1 will be described.

First, a space having a rich mathematical structure called "dual pairing vector spaces (DPVS)" which is a space for implementing the cryptographic scheme will be described.

Second, a concept for implementing the cryptographic scheme will be described. Here, a span program, an access structure, and a secret distribution scheme (secret sharing scheme) will be described.

Third, a basic structure of the cryptographic scheme according to Embodiment 1 will be described. In Embodiment 1, a key-policy attribute-based encryption (KP-ABE) scheme will be described.

Fourth, a basic configuration of a cryptographic system 10 that implements the cryptographic scheme according to Embodiment 1 will be described.

Fifth, a key technique and a simplified cryptographic scheme of the cryptographic scheme according to Embodiment 1 will be described.

Sixth, the cryptographic scheme according to Embodiment 1 will be described in detail.

<1. Dual Pairing Vector Spaces>

First, symmetric bilinear pairing groups will be described.

Symmetric bilinear pairing groups (g, G, $G_T$, g, e) are a tuple of a prime q, a cyclic additive group G of order q, a cyclic multiplicative group $G_T$ of order q, g≠0∈G, and a polynomial-time computable nondegenerate bilinear pairing e: G×G→$G_T$. The nondegenerate bilinear pairing signifies e(sg, tg)=e(g, g)$^{st}$, and e(g, g)≠1.

In the following description, let $G_{bpg}$ be an algorithm that takes as input $1^\lambda$ and outputs values of a parameter param$_G$:= (q, G, $G_T$, g, e) of bilinear pairing groups with a security parameter λ.

Dual pairing vector spaces will now be described.

Dual pairing vector spaces (q, V, $G_T$, A, e) can be constructed by a direct product of the symmetric bilinear pairing groups (param$_G$:=(q, G, $G_T$, g, e)). The dual pairing vector spaces (q, V, $G_T$, A, e) are a tuple of a prime q, an N-dimensional vector space V over $F_q$ indicated in Formula 113, a cyclic group $G_T$ of order q, and a canonical basis A:=($a_1$, . . . , $a_N$) of the space V, and have the following operations (1) and (2), where $a_i$ is as indicated in Formula 114.

$$\mathbb{V} := \overbrace{\mathbb{G} \times \ldots \times \mathbb{G}}^{N} \qquad \text{[Formula 113]}$$

-continued $$a_i := (\overset{i-1}{\overline{0, \ldots, 0}}, g, \overset{N-i}{\overline{0, \ldots, 0}})$$ [Formula 114]

Operation (1): Nondegenerate Bilinear Pairing
A pairing in the space V is defined by Formula 115.

$$e(x,y) := \Pi_{i=1}^{N} e(G_i, H_i) \in \mathbb{G}_T$$ [Formula 115]

where $(G_1, \ldots, G_N) := x \in \mathbb{V}$, $(H_1, \ldots, H_N) := y \in \mathbb{V}$ This is nondegenerate bilinear, that is, $e(sx, ty) = e(x, y)^{st}$ and if $e(x, y) = 1$ for all $y \in V$, then $x = 0$. For all i and j, $e(a_i, a_j) = e(g, g)^{\delta_{i,j}}$, where $\delta_{i,j} = 1$ if $i = j$, and $\delta_{i,j} = 0$ if $i \neq j$, and $e(g, g) \neq 1 \in G_T$.

Operation (2): Distortion Maps
Linear transformations $\phi_{i,j}$ on the space V indicated in Formula 116 can achieve Formula 117.

If $\phi_{i,j}(a_j) = a_i$ and $k \neq j$, then $\phi_{i,j}(a_k) = 0$. [Formula 116]

$$\phi_{i,j}(x) := (\overset{i-1}{\overline{0, \ldots, 0}}, g_j, \overset{N-i}{\overline{0, \ldots, 0}})$$ [Formula 117]

where $(g_1, \ldots g_N) := x$

The linear transformations $\phi_{i,j}$ will be called distortion maps.

In the following description, let $G_{dpvs}$ be an algorithm that takes as input $1^\lambda$ ($\lambda \in$ natural number), $N \in$ natural number, and values of a parameter $param_G := (q, G, G_T, g, e)$ of bilinear pairing groups, and outputs values of a parameter $param_V := (q, V, G_T, A, e)$ of dual pairing vector spaces with a security parameter $\lambda$ and an N-dimensional space V.

Description will be directed herein to a case where the dual pairing vector spaces are constructed using the above-described symmetric bilinear pairing groups. The dual pairing vector spaces can also be constructed using asymmetric bilinear pairing groups. The following description can easily be adapted to a case where the dual pairing vector spaces are constructed using asymmetric bilinear pairing groups.

<2. Concept for Implementing Cryptographic Scheme>
<2-1. Span Program>

FIG. 1 is an explanatory drawing of a matrix M^.

Let $\{p_1, \ldots, p_n\}$ be a Set of Variables. $M^{\wedge} := (M, \rho)$ is a Labeled Matrix. The matrix M is an (L rows×r columns) matrix over $F_q$, and $\rho$ is a label of columns of the matrix M and is related to one of literals $\{p_1, \ldots, p_n, \neg p_1, \ldots, \neg p_n\}$. A label $\rho_i$ ($i=1, \ldots, L$) of each row of M is related to one of the literals. That is, $\rho: \{1, \ldots, L\} \to \{p_1, \ldots, p_n, \neg p_1, \ldots, \neg P_n\}$.

For every input sequence $\delta \in \{0, 1\}^n$, a submatrix $M_\delta$ of the matrix M is defined. The matrix $M_\delta$ is a submatrix consisting of those rows of the matrix M the labels $\rho$ of which are related to a value "1" by the input sequence $\delta$. That is, the matrix $M_\delta$ is a submatrix consisting of the rows of the matrix M which are related to $p_i$ such that $\delta_i = 1$ and the rows of the matrix M which are related to $\neg p_i$ such that $\delta_i = 0$.

Figure 2:
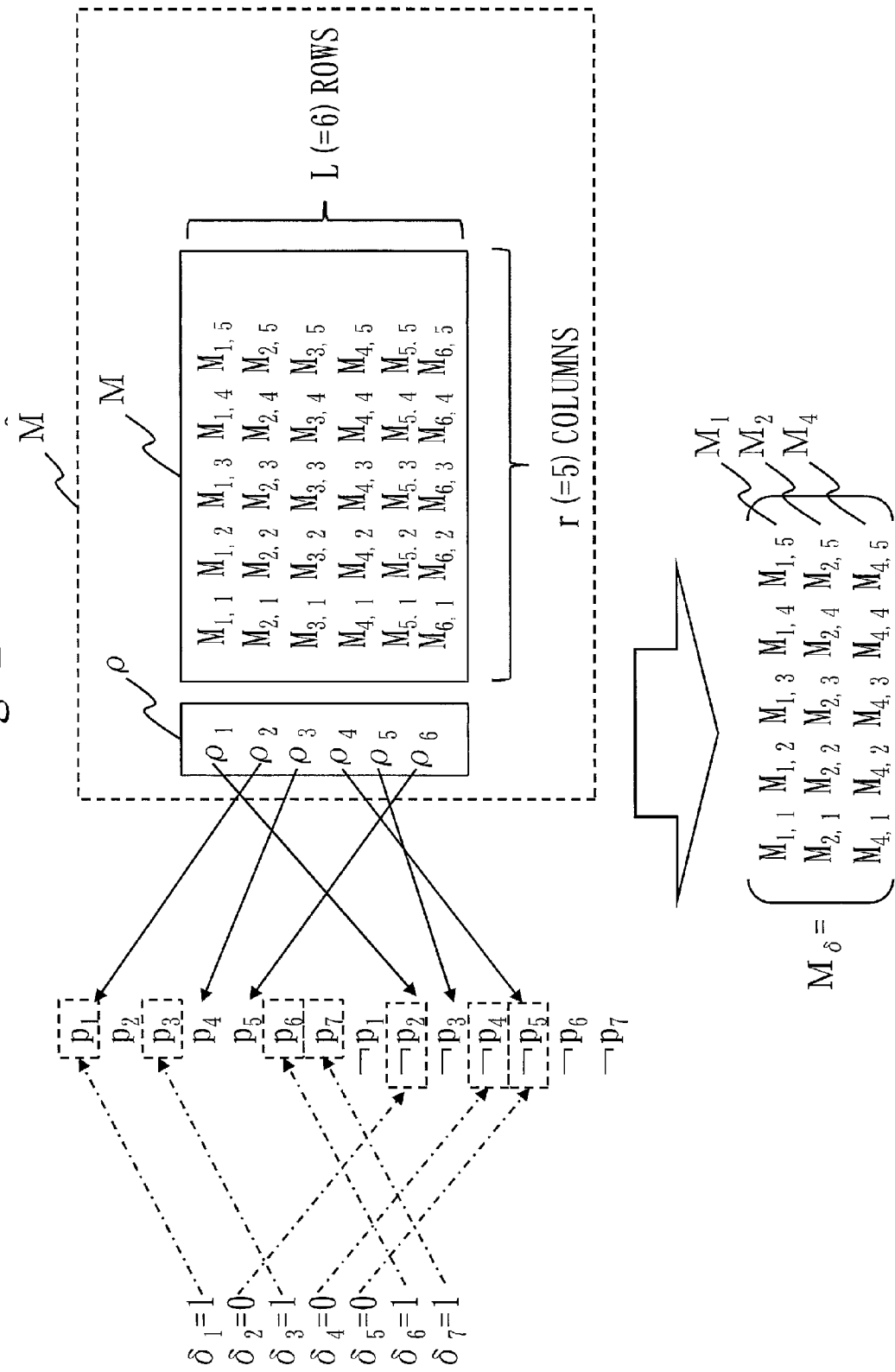
FIG. 2 is an explanatory drawing of a matrix $M_\delta$.

FIG. 2 is an explanatory drawing of the matrix $M_\delta$. In FIG. 2, note that $n=7$, $L=6$, and $r=5$. That is, the set of variables is $\{p_1, \ldots, p_7\}$, and the matrix M is a (6 rows×5 columns) matrix. In FIG. 2, assume that the labels p are related such that $\rho_1$ is related to $\neg p_2$, $\rho_2$ to $p_1$, $\rho_3$ to $p_4$, $\rho_4$ to $\neg p_5$, $\rho_5$ to $\neg p_3$, and $\rho_6$ to $p_5$.

Assume that in an input sequence $\delta \in \{0, 1\}^7$, $\delta_1 = 1$, $\delta_2 = 0$, $\delta_3 =$, $\delta_4 = 0$, $\delta_5 = 0$, $\delta_6 = 1$, and $\delta_7 = 1$. In this case, a submatrix consisting of the rows of the matrix M which are related to literals ($p_1$, $p_3$, $p_6$, $p_7$, $\neg p_2$, $\neg p_4$, $\neg p_5$) surrounded by broken lines is the matrix $M_\delta$. That is, the submatrix consisting of the first row ($M_1$), second row ($M_2$), and fourth row ($M_4$) of the matrix M is the matrix $M_\delta$.

In other words, when map $\gamma: \{1, \ldots, L\} \to \{0, 1\}$ is $[\rho(j) = p_i] \wedge [\delta_i = 1]$ or $[\rho(j) = \neg p_i] \wedge [\delta_i = 0]$, then $\gamma(j) = 1$; otherwise $\gamma(j) = 0$. In this case, $M_\delta := (M_j) := (M_j)_{\gamma(j)=1}$. Note that $M_j$ is the j-th row of the matrix M.

That is, in FIG. 2, map $\gamma(j) = 1$ ($j = 1, 2, 4$), and map $\gamma(j) = 0$ ($j = 3, 5, 6$). Hence, $(M_j)_{\gamma(j)=1}$ is $M_1$, $M_2$, and $M_4$, and is the matrix $M_\delta$.

More specifically, whether or not the j-th row of the matrix M is included in the matrix $M_\delta$ is determined by whether the value of the map $\gamma(j)$ is "0" or "1".

The span program M^ accepts an input sequence $\delta$ if and only if $\vec{1} \in $ span<$M_\delta$>, and rejects the input sequence $\delta$ otherwise. That is, the span program M^ accepts the input sequence $\delta$ if and only if linear combination of the rows of the matrix $M_\delta$ which are obtained from the matrix M^ by the input sequence $\delta$ gives $\vec{1}$. $\vec{1}$ is a row vector which has a value "1" in each element.

For example, in an example of FIG. 2, the span program M^ accepts the input sequence $\delta$ if and only if linear combination of the respective rows of the matrix $M_\delta$ consisting of the first, second, and fourth rows of the matrix M gives $\vec{1}$. That is, if there exist $\alpha_1$, $\alpha_2$, and $\alpha_4$ with which $\alpha_1(M_1) + \alpha_2(M_2) + \alpha_4(M_4) = \vec{1}$, the span program M^ accepts the input sequence $\delta$.

The span program is called monotone if its labels p are related to only positive literals $\{p_1, \ldots, p_n\}$. The span program is called non-monotone if its labels $\rho$ are related to the literals $\{p_1, \ldots, p_n, \neg p_1, \ldots, \neg p_n\}$. It is assumed herein that the span program is non-monotone. An access structure (non-monotone access structure) is constructed using the non-monotone span program. Briefly, an access structure controls access to encryption, that is, it controls whether a ciphertext is to be decrypted or not.

The span program being non-monotone, instead of being monotone, allows for a wider range of applications of the cryptographic scheme constructed using the span program.

<2-2. Access Structure>

U ($\subset \{0, 1\}^*$) is a universe and a set of attributes, and U is represented by values of attributes, that is, $v \in F_q^x$ ($:= F_q \setminus \{0\}$).

It is defined such that the attributes are a variable p in $M^{\wedge} := (M, \rho)$. That is, $p := v$. The access structure S is a span program $M^{\wedge} := (M, \rho)$ with variables $p := v$ and $p' := v', \ldots$. That is, the access structure S is $S := (M, \rho)$ with p: $\{1, \ldots, L\} \to \{v, v', \ldots, \neg v, \neg v', \ldots\}$.

Let $\Gamma$ be a set of attributes. That is, $\Gamma := \{x_j|_{1 \leq j \leq n'}\}$.

When $\Gamma$ is given to the access structure S, map $\gamma$: $\{1, \ldots, L\} \to \{0, 1\}$ for the span program $M^{\wedge} := (M, \rho)$ is defined as follows. For each integer $i=1, \ldots, L$, set $\gamma(j) = 1$ if $[\rho(i) = v_i] \neg [v_i \in \Gamma]$ or $[\rho(i) = \wedge v_i] \wedge [v_i \in \Gamma]$. Set $\gamma(j) = 0$ otherwise.

The access structure S:=(M, ρ) accepts Γ if and only if $\vec{1} \in$ span $<(M_i)_{\gamma(i)=1}>$.

<2-3. Secret Distribution Scheme>

A secret distribution scheme for the access structure S:=(M, ρ) will be described.

The secret distribution scheme is distributing secret information to render it nonsense distributed information. For example, secret information s is distributed into 10 pieces to generate 10 pieces of distributed information. Each of the 10 pieces of distributed information does not have information on the secret information s. Hence, even when one of the pieces of distributed information is obtained, no information can be obtained on the secret information s. On the other hand, if all of the 10 pieces of distributed information are obtained, the secret information s can be recovered.

There is another secret distribution scheme according to which the secret information s can be recovered if some (for example, 8 pieces) of distributed information can be obtained, without obtaining all of the 10 pieces of distributed information. A case like this where the secret information s can be recovered using 8 pieces out of 10 pieces of distributed information will be called 8-out-of-10. That is, a case where the secret information s can be recovered using t pieces out of n pieces of distributed information will be called t-out-of-n. This t will be called a threshold value.

There is still another secret distribution scheme according to which when 10 pieces of distributed information $d_1, \ldots, d_{10}$ are generated, the secret information s can be recovered with 8 pieces of distributed information $d_1, \ldots, d_8$, but the secret information s cannot be recovered with 8 pieces of distributed information $d_3, \ldots, d_{10}$. In other words, secret distribution schemes include a scheme according to which whether or not the secret information s can be recovered is controlled not only by the number of pieces of distributed information obtained, but also the combination of distributed information obtained.

FIG. 3 is an explanatory drawing of $s_0$. FIG. 4 is an explanatory drawing of $\vec{s}^T$.

Let a matrix M be an (L rows×r columns) matrix. Let $\vec{f}^T$ be a column vector indicated in Formula 118.

$$\vec{f}^T := (f_1, \ldots f_r)^T \xleftarrow{U} \mathbb{F}_q^r \qquad \text{[Formula 118]}$$

Let $s_0$ indicated in Formula 119 be secret information to be shared.

$$s_0 := \vec{1} \cdot \vec{f}^T := \Sigma_{k=1}^r f_k \qquad \text{[Formula 119]}$$

Let $\vec{s}^T$ indicated in Formula 120 be a vector of L pieces of distributed information of $s_0$.

$$\vec{s}^T := (s_1, \ldots s_L)^T := M \cdot \vec{f}^T \qquad \text{[Formula 120]}$$

Let the distributed information $s_i$ belong to $\rho(i)$.

If the access structure S:=(M, ρ) accepts Γ, that is, if $\vec{1} \in$ span$<(M_i)_{\gamma(i)=1}>$ for $\gamma:\{1, \ldots, L\} \to \{0, 1\}$, then there exist constants $\{\alpha_i \in \mathbb{F}_q | i \in I\}$ such that $I \subseteq \{i \in \{1, \ldots, L\} | \gamma(i)-=1\}$.

This is obvious from the explanation about the example of FIG. 2 that if there exist $\alpha_1, \alpha_2,$ and $\alpha_4$ with which $\alpha_1(M_1)+\alpha_2(M_2)+\alpha_4(M_4)=\vec{1}$, the span program M accepts the input sequence δ. That is, if the span program M^ accepts the input sequence δ when there exist $\alpha_1, \alpha_2,$ and $\alpha_4$ with which $\alpha_1(M_1)+\alpha_2(M_2)+\alpha_4(M_4)=\vec{1}$, then there exist $\alpha_1, \alpha_2,$ and $\alpha_4$ with which $\alpha_1(M_1)+\alpha_2(M_2)+\alpha_4(M_4)=\vec{1}$.

Note Formula 121.

$$\Sigma_{i \in I} \alpha_i s_i := s_0 \qquad \text{[Formula 121]}$$

Note that constants $\{\alpha_i\}$ are computable in time polynomial in the size of the matrix M.

<3. Basic Structure of Cryptographic Scheme (KP-ABE Scheme)>

The structure of the KP-ABE scheme will be briefly described. Note that KP (key policy) means that a policy, namely an access structure, is embedded in a key.

The KP-ABE scheme includes four algorithms: Setup, KeyGen, Enc, and Dec.

(Setup)

A Setup algorithm is a probabilistic algorithm that takes as input a security parameter λ and an upper limit n for the number of attributes for a ciphertext, and outputs a public parameter pk and a master key sk.

(KeyGen)

A KeyGen algorithm is a probabilistic algorithm that takes as input the public parameter pk, the master key sk, and an access structure S:=(M, ρ), and outputs a decryption key $sk_S$.

(Enc)

An Enc algorithm is a probabilistic algorithm that takes as input the public parameter pk, a message m, and an attribute set $\Gamma:=\{x_j\}_{1 \leq j \leq n'}$, and outputs a ciphertext $ct_\Gamma$.

(Dec)

A Dec algorithm is an algorithm that takes as input the public parameter pk, the decryption key $sk_S$, and the ciphertext $ct_\Gamma$, and outputs the message m or a distinguished symbol ⊥.

<4. Basic Configuration of Cryptographic System 10>

The cryptographic system 10 that implements the algorithms of the KP-ABE scheme will be described.

Figure 5:
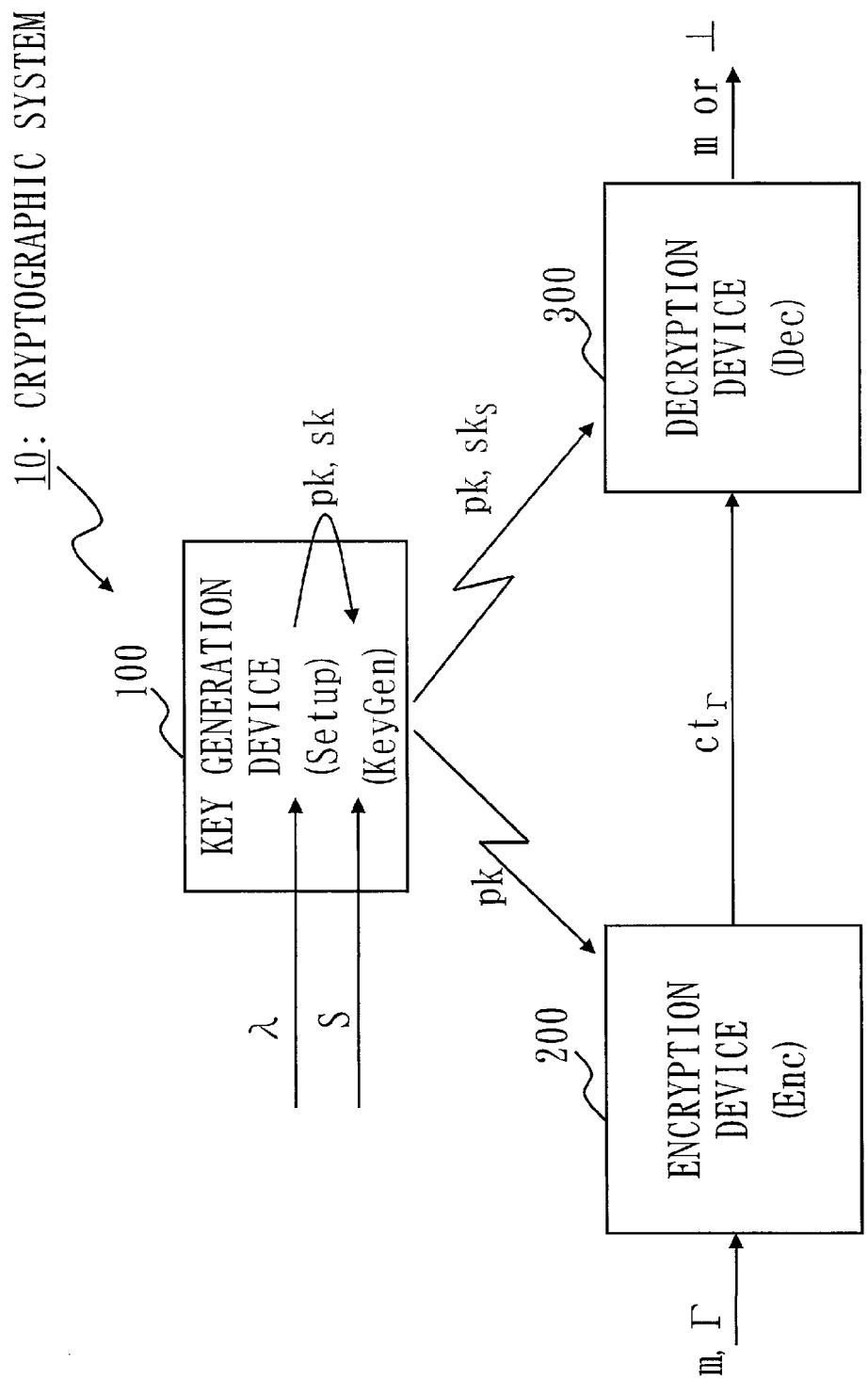
FIG. 5 is a configuration diagram of a cryptographic system 10 that implements a KP-ABE scheme according to Embodiment 1.

FIG. 5 is a configuration diagram of the cryptographic system 10 that implements the KP-ABE scheme according to Embodiment 1.

The cryptographic system 10 includes a key generation device 100, an encryption device 200 (an example of a transmission device), and a decryption device 300 (an example of a reception device).

The key generation device 100 executes the Setup algorithm taking as input a security parameter λ and an upper limit n for the number of attributes for a ciphertext, and thereby generates a public parameter pk and a master key sk. Then, the key generation device 100 publishes the public parameter pk. The key generation device 100 also executes the KG algorithm taking as input an access structure S, and thereby generates a decryption key $sk_S$, and transmits the decryption key $sk_S$ to the decryption device 300 in secrecy.

The encryption device 200 executes the Enc algorithm taking as input the public parameter pk, a message m, and an attribute set Γ, and thereby generates a ciphertext $ct_\Gamma$. The encryption device 200 transmits the ciphertext $ct_\Gamma$ to the decryption device 300.

The decryption device 300 executes the Dec algorithm taking as input the public parameter pk, the decryption key $sk_S$, and the ciphertext $ct_\Gamma$, and outputs the message m or a distinguished symbol ⊥.

<5. Key Technique and Simplified Cryptographic Scheme>

<5-1. Encoding>

In the functional encryption scheme described in Patent Literature 1, an identifier t is assigned to each attribute category, and a vector which is an element of a ciphertext (or a decryption key) is generated for each identifier t.

In Embodiment 1, a method for encoding attribute information is specially devised such that the identifier t for an attribute category is eliminated and one vector is used as an element of a ciphertext.

In Embodiment 1, a vector (one vector) which is an element of a ciphertext is generated such that each element of a vector $\vec{y}:=(y_1, \ldots, y_n)$ (first vector) consisting of coefficients $y_j$ of a polynomial having attribute information $x_i$ as roots is set as the coefficient of each basis vector of a basis B. That is, a vector which is an element of a ciphertext is generated such that the vector $\vec{y}:=(y_1, \ldots, y_n)$ being $f(z)=(z-x_1)(z-x_2)\ldots(z-x_n)=y_1z^n+\ldots+y_{n-1}z+y_n$ is set as the coefficient of each basis vector of the basis B.

A vector (one or more vectors) which is an element of a decryption key is generated such that a vector $\vec{v}_i:=(v_i^{n-1}, \ldots, v_i, 1)$ (second vector) consisting of $v_i^j$ being a power of $v_i$ is set as the coefficient of each basis vector of a basis B*, for each integer $i=1, \ldots, L$.

With this arrangement, it is possible to control such that when a pairing operation is performed on the vector which is the element of the ciphertext and the vector which is the element of the decryption key, $v_i$ is assigned to $f(z)$, and if $v_i$ is equal to any of $x_1, \ldots, x_n$, then $f(v_i)=0$, and if $v_i$ is not equal to any of $x_1, \ldots, x_n$, then $f(v_i) \neq 0$.

<5-2. Sparse Matrix>

In the functional encryption scheme described in Patent Literature 1, a basis B and a basis B* being a pair of dual bases are generated. The basis B and the basis B* are generated using a fully random linear transformation X (change-of-basis matrix) uniformly selected from GL(N, $F_q$). In particular, the basis B and the basis B* are generated by transforming a canonical basis A by linear transformations X and $(X^{-1})^T$, respectively. Note that N denotes the number of dimensions of span<B> and span<B>.

In a typical application in which dual pairing vector spaces are applied to a cryptographic process, a part of the basis B (to be referred to as B^) is used as a public parameter, and the corresponding part of the basis B* (to be referred to as B^*) is used as a trapdoor.

In Embodiment 1, a special form of the random linear transformation X being $X \in GL(N, F_q)$ (a sparse matrix) is employed, in place of the fully random linear transformation X described above.

<5-3. Simplified Cryptographic Scheme>

A simplified KP-ABE scheme will be described.

A ciphertext in the simplified KP-ABE scheme consists of two vector elements $(c_0, c_1) \in G^5 \times G^n$ as well as $c_3 \neq G_T$. A secret key consists of the L+1 number of vector elements $(k^*_0, k^*_1, \ldots, k^*_L \in G^5 \times (G^n)^L)$ for an access structure $S:=(M, \rho)$, where L denotes the number of rows in a matrix M and each vector element $k^*_i$ corresponds to each row of the matrix M. Note that $(c_0, c_1) \in G^5 \times G^n$ signifies that $c_0$ is five elements of G, and $c_1$ is the n number of elements of G. Similarly, $(k^*_0, k^*_1, \ldots, k^*_L \in G^5 \times (G^n)^L)$ signifies that $k^*_0$ is five elements of G, and $k^*_1, \ldots, k^*_L$ are the n number of elements of G.

Therefore, to achieve constant-size ciphertexts, it is necessary to compress $c_1 \in G^n$ to a constant size in n.

In Embodiment 1, a special linear transformation X indicated in Formula 122 is employed.

$$X := \begin{pmatrix} \mu & & & \mu'_1 \\ & \ddots & & \vdots \\ & & \mu & \mu'_{n-1} \\ & & & \mu'_n \end{pmatrix} \in \mathcal{H}(n, \mathbb{F}_q) \quad \text{[Formula 122]}$$

Note that $\mu, \mu'_1, \ldots, \mu'_n$ are values uniformly selected from a finite field $F_q$, and a blank in the linear transformation X denotes $0 \in F_q$. Note also that $H(n, F_q)$ signifies a set of n-dimensional matrices having the finite field $F_q$ as elements.

A public key (basis in DPVS) is a basis B indicated in Formula 123-1.

$$\mathbb{B} := \begin{pmatrix} b_1 \\ \vdots \\ b_n \end{pmatrix} := \begin{pmatrix} \mu g & & & \mu'_1 g \\ & \ddots & & \vdots \\ & & \mu g & \mu'_{n-1} g \\ & & & \mu'_n g \end{pmatrix} \quad \text{[Formula 123-1]}$$

Let a ciphertext associated with an attribute set $\Gamma:=(x_1, \ldots, x_{n'})$ be a ciphertext $c_1$ indicated in Formula 123-2.

$$c_1 := (\omega \vec{y})_\mathbb{B} = \omega(y_1 b_1 + \ldots + y_n b_n) = (y_1 \omega \mu g, \ldots, y_{n-1} \omega \mu g, \omega(\Sigma_{i=1}^n y_i \mu'_i) g) \quad \text{[Formula 123]}$$

Note that $\omega$ is a value uniformly selected from the finite field $F_q$, and $\vec{y}:=(y_1, y_n)$ is a vector indicated in Formula 124.

$$\Sigma_{j=0}^{n-1} y_{n-j} z^j = z^{n-1-n'} \cdot \Pi_{j=1}^{n'}(z-x_j) \quad \text{[Formula 124]}$$

Then, the ciphertext $c_1$ can be compressed to two group elements $C_1$ and $C_2$ indicated in Formula 125 and the vector $\vec{y}$.

$$C_1 := \omega \mu g,$$

$$C_2 := \omega(\Sigma_{i=1}^n y_i \mu'_i) g \quad \text{[Formula 103]}$$

This is because the ciphertext $c_1$ is obtained by $(y_1 C_1, \ldots, y_{n-1} C_1, C_2)$. Note that $y_i C_1 = y_i \omega \mu g$ for each $i=1, \ldots, n-1$.

Therefore, the ciphertext (excluding the vector $\vec{y}$) can be two group elements, and the size is constant in n.

Let $B^*:=(b^*_i)$ be the dual orthonormal basis of $B:=(b_i)$, and let the basis B* be a master secret key in the simplified KP-ABE scheme.

$(c_0, k^*_0, c_3)$ is specified such that $e(c_0, k^*_0) = g_T^{\zeta - \omega s_0}$ and $c_3 := g_T^\zeta m \in G_T$. Note that $s_0(s_0)$ is a center secret of shared information $\{s_i\}_{i=1,\ldots,L}$ associated with the access structure S.

Using the shared information $\{s_i\}_{i=1,\ldots,L}$, a set of secret keys for the access structure S is set as indicated in Formula 126.

$$k^*_i := (s_i \vec{e}_1 + \theta_i \vec{v}_i)_{\mathbb{B}^*} \text{ if } \rho(i) = (t, \vec{v}_i), \quad \text{[Formula 126]}$$

$$k^*_i := (s_i \vec{v}_i)_{\mathbb{B}^*} \text{ if } \rho(i) = \neg(t, \vec{v}_i)$$

where $$\vec{v}_i := (v_i^{n-1}, \ldots, v_i, 1),$$

$$\theta_i \xleftarrow{U} \mathbb{F}_q$$

From the dual orthonormality of the basis B and the basis B*, if the access structure S accepts the attribute set $\Gamma$, there exists a complementary coefficients $\{\alpha_i\}_{i \in I}$ such that Formula 127 is satisfied.

$$e(c_1, \tilde{k}^*) = g_T^{\omega s_0} \qquad \text{[Formula 127]}$$

where $$\tilde{k}^* := \sum_{i \in I \wedge \rho(i) = v_i} \alpha_i k_i^* + \sum_{i \in I \wedge \rho(i) = \neg v_i} \alpha_i (\vec{y} \cdot \vec{v}_i)^{-1} k_i^*$$

Hence, a decryptor can compute $g_T^{\omega s_0}$ and obtain a message m if and only if the access structure S accepts the attribute set $\Gamma$.

The ciphertext $c_1$ is represented as $(y_1 C_1, \ldots, y_{n-1} C_1, C_2) \in G^n$, and a secret key $k^{\rightharpoonup *}$ is parsed as n-tuple $(D^*_1, \ldots, D^*_n)$. Thus, the value of $e(c_1, k^{\rightharpoonup *})$ is as indicated in Formula 128.

$$\prod_{i=1}^{n-1} e(y_i C_1, D_i^*) \cdot e(C_2, D_n^*) = \qquad \text{[Formula 128]}$$
$$\prod_{i=1}^{n-1} e(C_1, y_i D_i^*) \cdot e(C_2, D_n^*) =$$
$$e\left(C_1, \sum_{i=1}^{n-1} y_i D_i^*\right) \cdot e(C_2, D_n^*)$$

That is, the n−1 number of scalar multiplications in G and two pairing operations are enough for computing $e(c_1, k^{\rightharpoonup *})$. This means that only a small (constant) number of pairing operations are required for decryption. Generally, a pairing operation is an operation which requires processing time. Therefore, by reducing the number of pairing operations, the processing time for the entirety of processing can be shortened.

In the simplified KP-ABE scheme, the ciphertext $c_1$ has only the basis vector in which the vector $\vec{y}$ is set (real encoding part), and the secret key $k^*_1$ has only the basis vector in which the vector $\vec{v}$ is set (real encoding part).

In the KP-ABE scheme to be described below, in order to enhance security, a hidden part, a secret key randomness part, and a ciphertext randomness part are added to the ciphertext $c_1$ and the secret key $k^*_1$ in addition to the real encoding part.

Therefore, the linear transformation X is expanded six-fold, as indicated in Formula 129. Then, the real encoding part, the hidden part, the secret key randomness part, and the ciphertext randomness part are assigned n, 2n, 2, and n dimensions, respectively.

$$X := \begin{pmatrix} X_{1,1} & \ldots & X_{1,6} \\ \vdots & & \vdots \\ X_{6,1} & \ldots & X_{6,6} \end{pmatrix} \qquad \text{[Formula 129]}$$

Note that each $X_{i,j}$ is $X \in H(n, F_q)$ indicated in Formula 122. The vector space consists of four orthogonal subspaces. That is, the vector space consists of four orthogonal subspaces for the encoding part, the hidden part, the secret key randomness part, and the ciphertext randomness part.

<6. Cryptographic Scheme>

Figure 6:
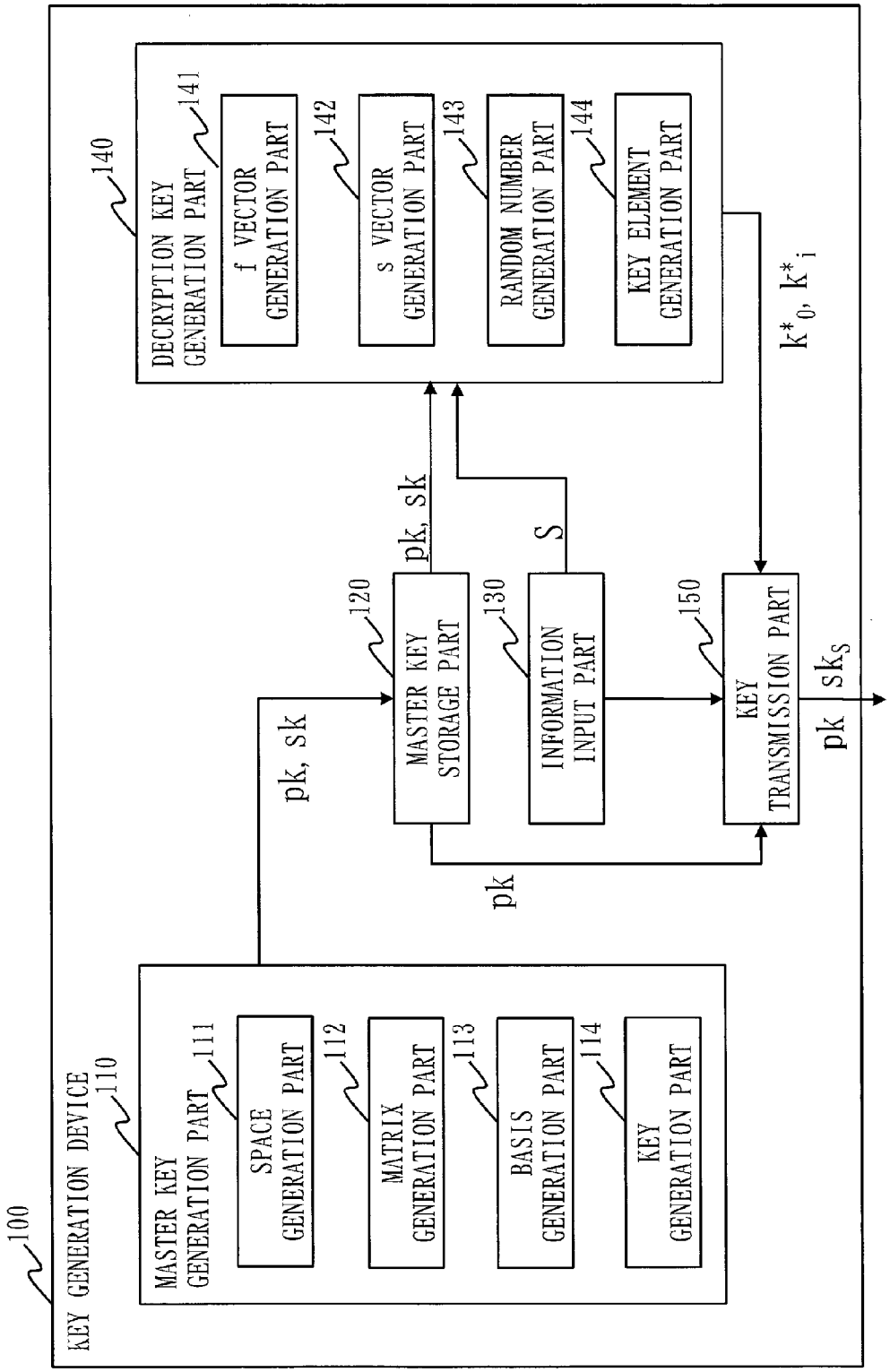
FIG. 6 is a configuration diagram of a key generation device 100 according to Embodiment 1.
Figure 7:
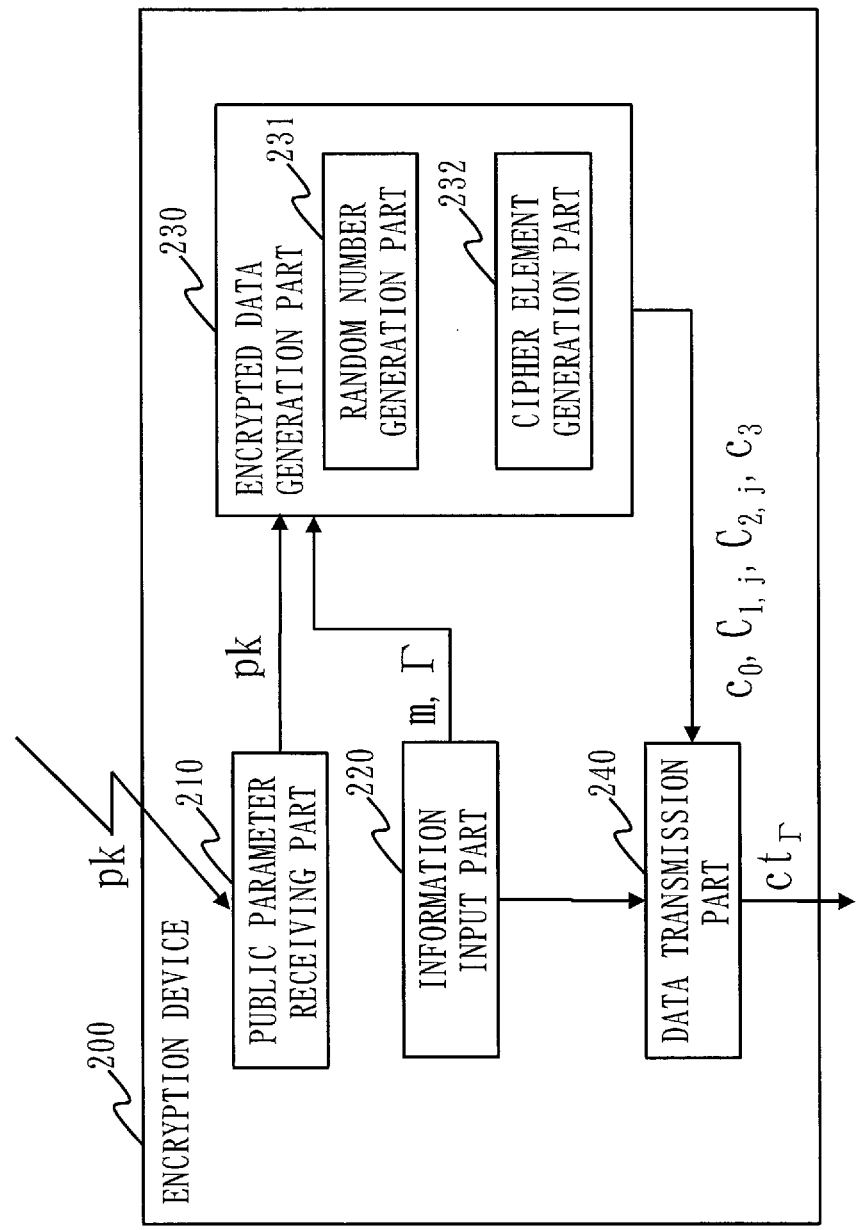
FIG. 7 is a configuration diagram of an encryption device 200 according to Embodiment 1.
Figure 8:
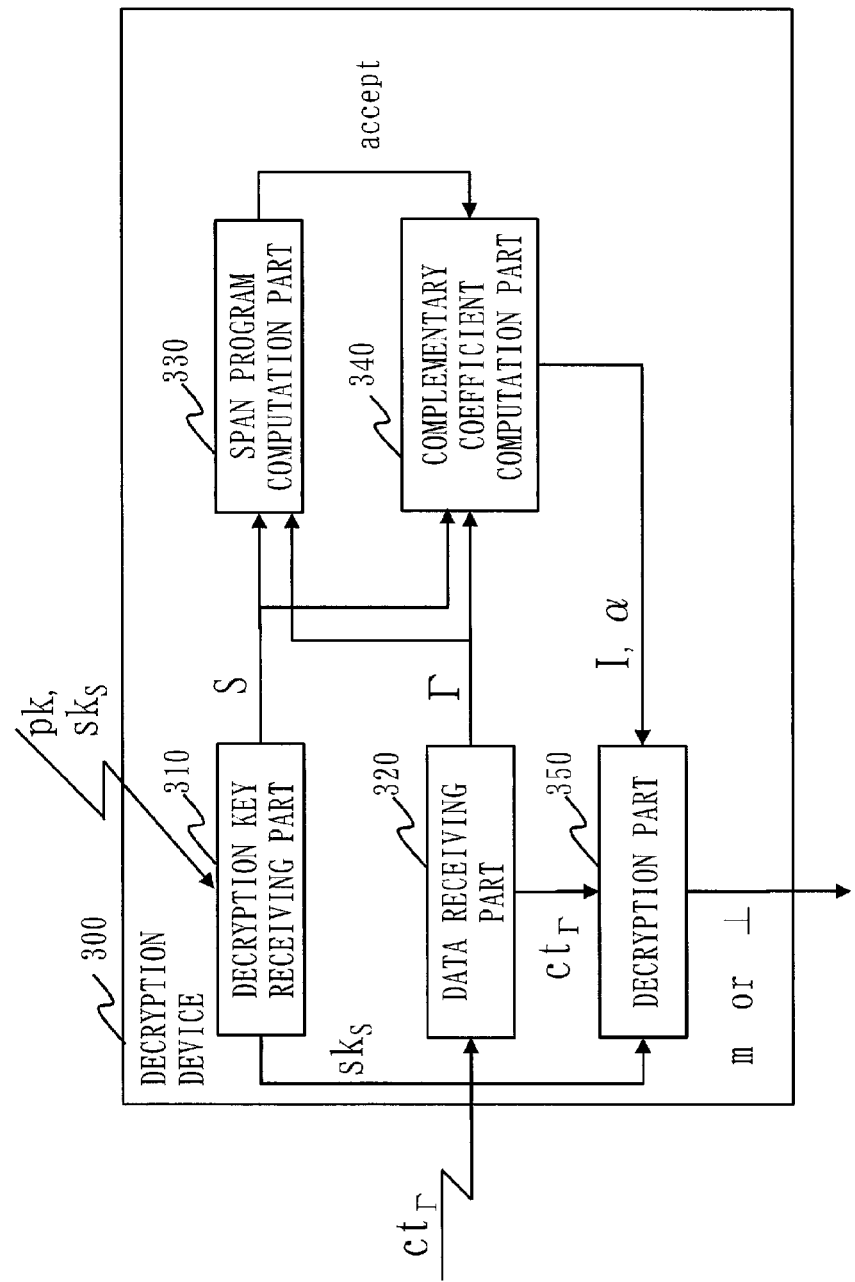
FIG. 8 is a configuration diagram of a decryption device 300 according to Embodiment 1.

FIG. 6 is a configuration diagram of the key generation device 100 according to Embodiment 1. FIG. 7 is a configuration diagram of the encryption device 200 according to Embodiment 1. FIG. 8 is a configuration diagram of the decryption device 300 according to Embodiment 1.

Figure 9:
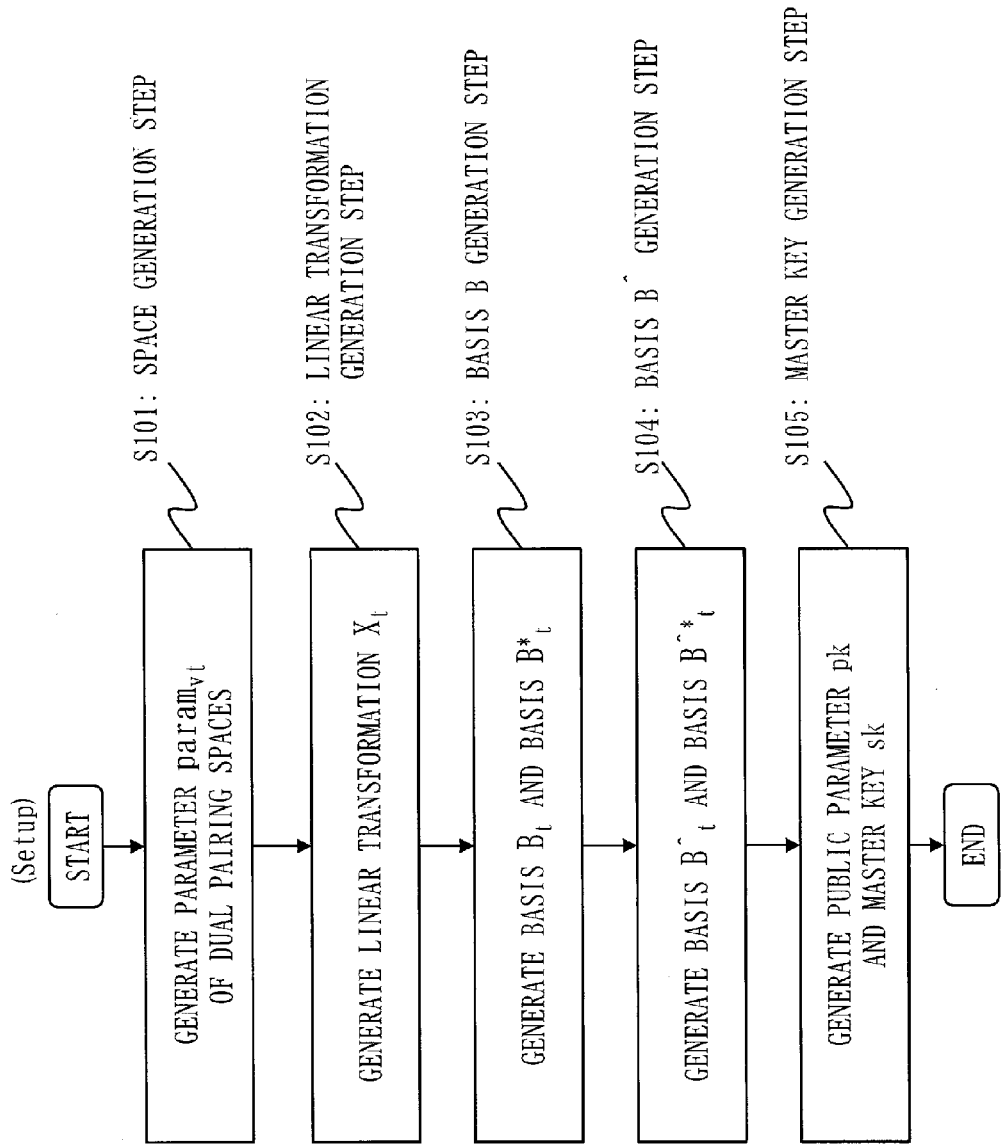
FIG. 9 is a flowchart illustrating the process of a Setup algorithm according to Embodiment 1.
Figure 10:
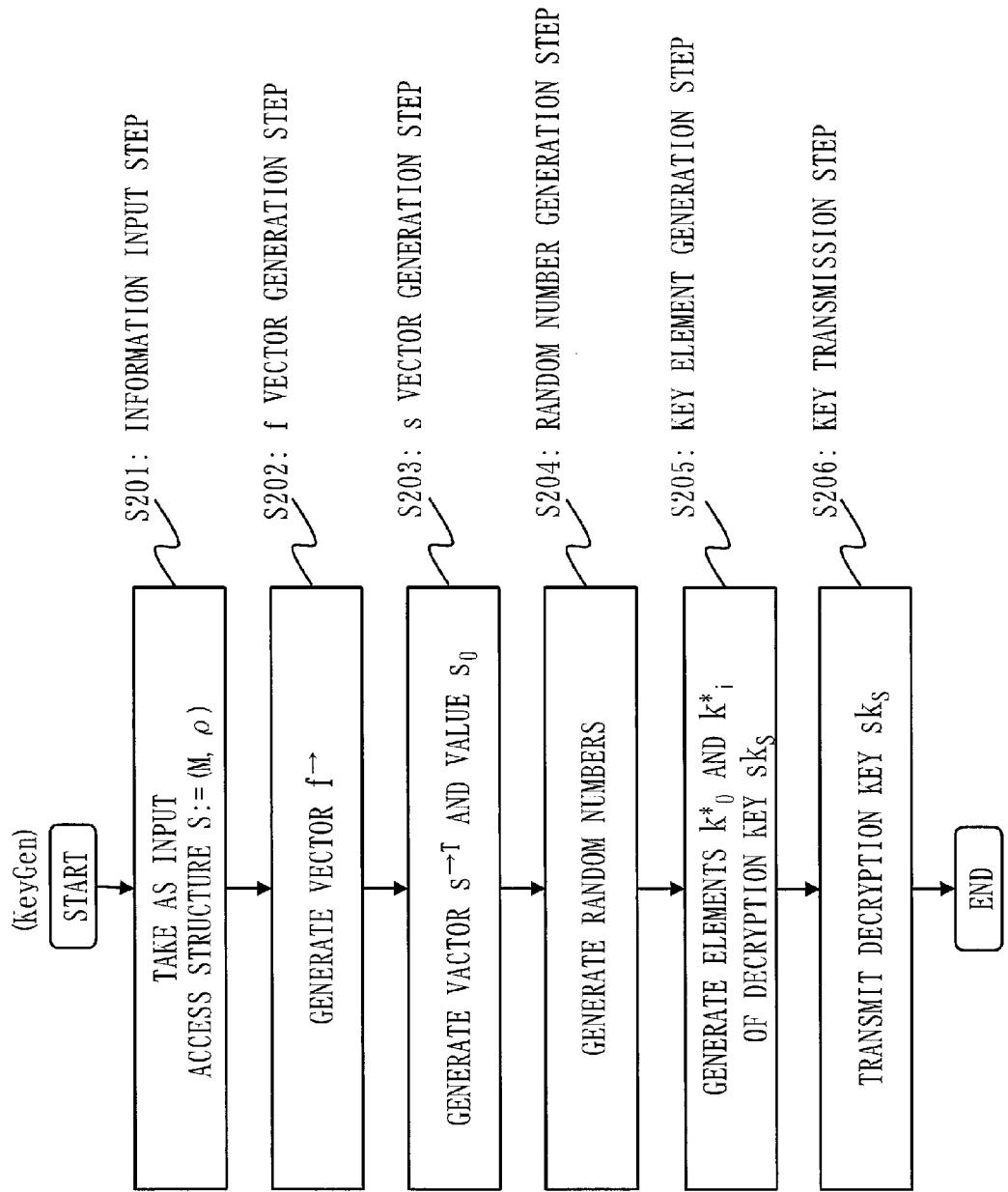
FIG. 10 is a flowchart illustrating the process of a KeyGen algorithm according to Embodiment 1.
Figure 11:
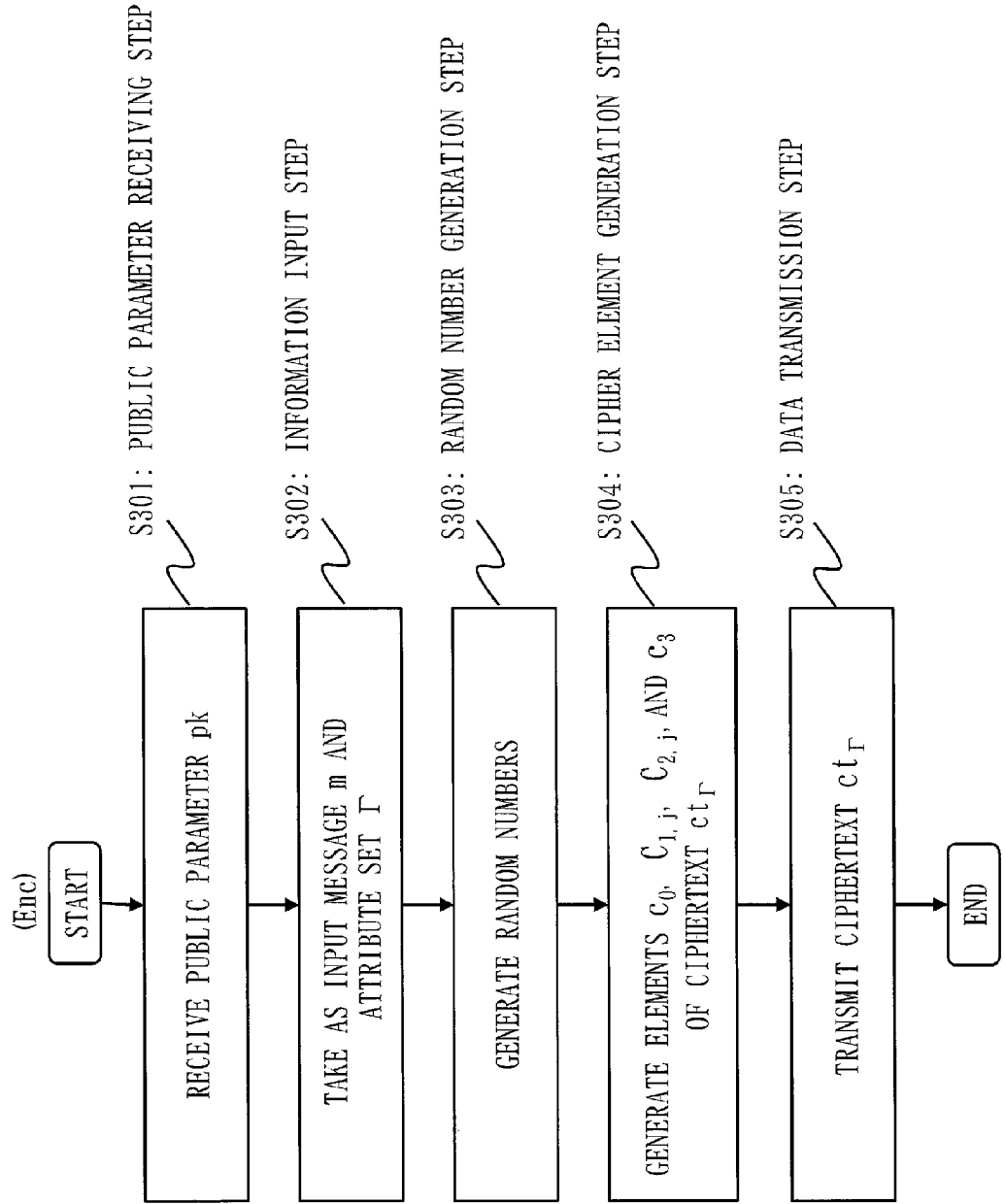
FIG. 11 is a flowchart illustrating the process of an Enc algorithm according to Embodiment 1.
Figure 12:
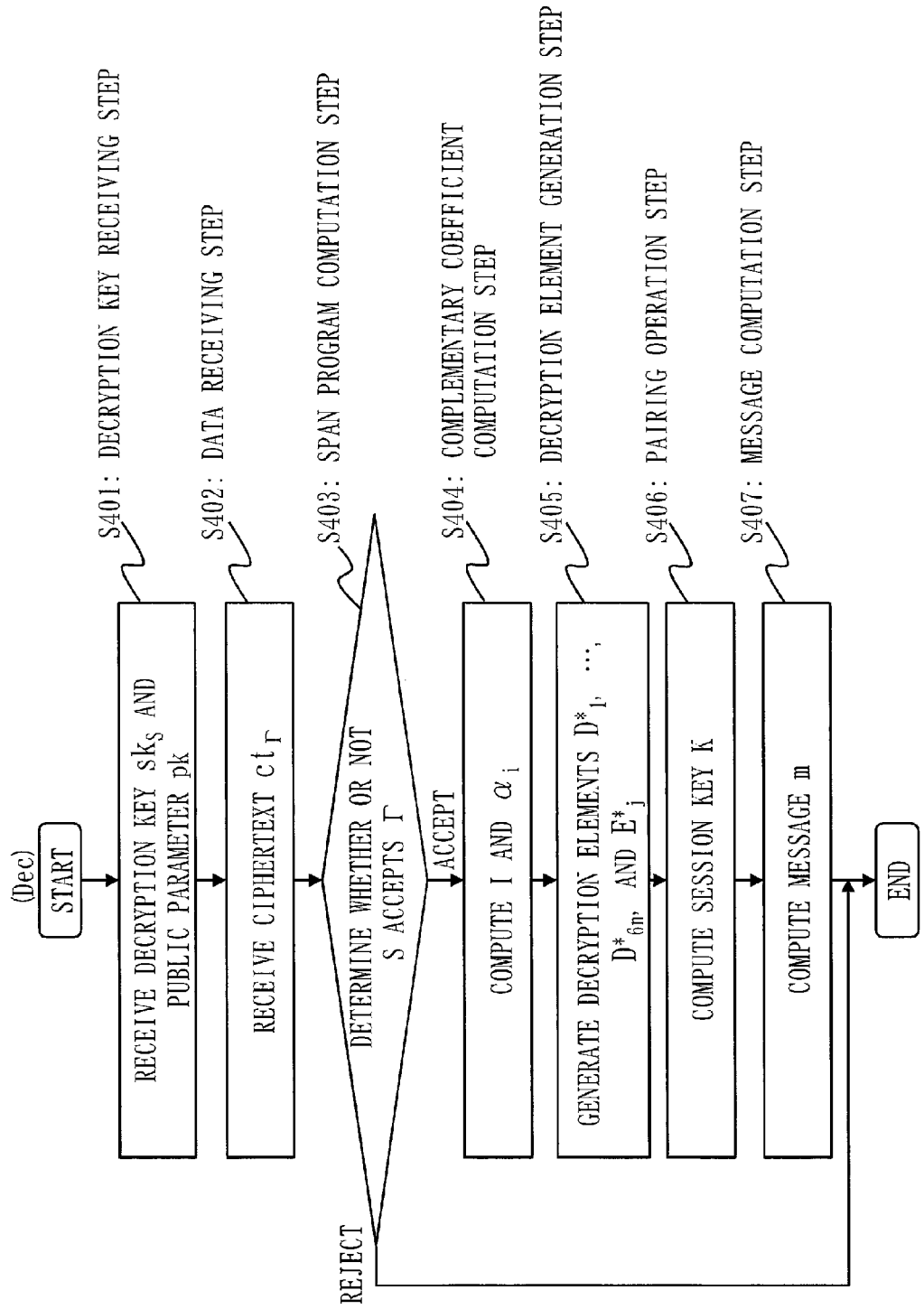
FIG. 12 is a flowchart illustrating the process of a Dec algorithm according to Embodiment 1.

FIG. 9 and FIG. 10 are flowcharts illustrating the operation of the key generation device 100 according to Embodiment 1. FIG. 9 is a flowchart illustrating the process of the Setup algorithm according to Embodiment 1, and FIG. 10 is a flowchart illustrating the process of the KeyGen algorithm according to Embodiment 1. FIG. 11 is a flowchart illustrating the operation of the encryption device 200 according to Embodiment 1 and illustrating the process of the Enc algorithm according to Embodiment 1. FIG. 12 is a flowchart illustrating the operation of the decryption device 300 according to Embodiment 1 and illustrating the process of the Dec algorithm according to Embodiment 1.

The function and operation of the key generation device 100 will be described.

As illustrated in FIG. 6, the key generation device 100 includes a master key generation part 110, a master key storage part 120, an information input part 130, a decryption key generation part 140, and a key transmission part 150. The master key generation part 110 includes a space generation part 111, a matrix generation part 112, a basis generation part 113, and a key generation part 114. The decryption key generation part 140 includes an f vector generation part 141, an s vector generation part 142, a random number generation part 143, and a key element generation part 144.

With reference to FIG. 9, the process of the Setup algorithm will be described.

(S101: Space Generation Step)

With a processing device, the space generation part 111 executes $G_{bpg}$ taking as input a security parameter $1^\lambda$, and thereby generates a parameter $\text{param}_G := (q, G, G_T, g, e)$ of symmetric bilinear pairing groups.

Further, the space generation part 111 sets $N_0 := 5$ and $N_1 := 6n$. Then, with the processing device and for each integer $t=0, 1$, the space generation part 111 executes $G_{dpvs}$ taking as input the security parameter $1^\lambda$, $N_t$, and the parameter $\text{param}_G$ of the symmetric bilinear pairing groups, and thereby generates a parameter $\text{param}_{V_t} := (q, V_t, G_T, A, e)$ of dual pairing vector spaces.

(S102: Linear Transformation Generation Step)

With the processing device, the matrix generation part 112 generates a linear transformation $X_0$, as indicated in Formula 130.

$$X_0 := (\chi_{0,i,j})_{i,j=1,\ldots,5} \xleftarrow{U} GL(N_0, F_q) \qquad \text{[Formula 130]}$$

Note that $(\chi_{0,i,j})_{i,j=1,\ldots,5}$ in Formula 130 signifies a matrix concerning the suffixes i and j of the matrix $\chi_{0,i,j}$.

With the processing device, the matrix generation part 112 also generates a linear transformation $X_1$, as indicated in Formula 131.

$$X_1 \xleftarrow{U} \mathcal{L}(6, n, F_q) \qquad \text{[Formula 131]}$$

Note that $L(6, n, F_q)$ in Formula 131 is as indicated in Formula 132.

$$\mathcal{L}(w, n, F_q) := \left\{ X := \begin{pmatrix} X_{1,1} & \ldots & X_{1,w} \\ \vdots & & \vdots \\ X_{w,1} & \ldots & X_{w,w} \end{pmatrix} \middle| X_{i,j} := \right. \qquad \text{[Formula 132]}$$

-continued $$\left(\begin{array}{cccc} \mu_{i,j} & & & \mu'_{i,j,1} \\ & \ddots & & \vdots \\ & & \mu_{i,j} & \mu'_{i,j,n-1} \\ & & & \mu'_{i,j,n} \end{array}\right) \in \mathcal{H}(, \mathbb{F}_q) \text{ for } i, j = 1, \ldots, w \right\} \cap$$

$$GL(wn, \mathbb{F}_q),$$

$$\mathcal{H}(n, \mathbb{F}_q) := \left\{ \left(\begin{array}{cccc} u & & & u'_1 \\ & \ddots & & \vdots \\ & & u & u'_{n-1} \\ & & & u'_n \end{array}\right) \right.$$

$$\left. u, u'_L \in \mathbb{F}_q, \text{ for } L = 1, \ldots, n, \text{ a blank element in the matrix denotes } 0 \in \mathbb{F}_q \right\}$$

In the following, $\{\mu_{i,j}, \mu'_{i,j,L}\}_{i,j=1,\ldots,6; L=1,\ldots,n}$ denotes non-zero elements in the linear transformation $X_1$.

(S103: Basis B Generation Step)

With the processing device, the basis generation part 113 generates a basis $\mathbb{B}_0$, a variable $B_{i,j}$, and a variable $B'_{i,j,L}$, as indicated in Formula 133.

$b_{0,i} := (\chi_{0,i,1}, \ldots, \chi_{0,i,5})_{\mathbb{A}} = \sum_{j=1}^{5} \chi_{0,i,j} a_j$ for $i=1, \ldots, 5$, $\mathbb{B}_0 := (b_{0,1}, \ldots, b_{0,5})$, $B_{i,j} := \mu_{i,j} g, B_{i,j,L}' := \mu'_{i,j,L} g$ for $i,j=1, \ldots, 6; L=1, \ldots, n$ [Formula 133]

With the processing device, the basis generation part 113 also generates a basis $\mathbb{B}^*_0$ and a basis $\mathbb{B}^*_1$, as indicated in Formula 134.
for t=0, 1, $(\theta_{t,i,j})_{i,j=1,\ldots,N_t} := \psi \cdot (X_t^T)^{-1}$, $b^*_{t,i} := (\theta_{t,i,1}, \ldots, \theta_{t,i,N_t})_{\mathbb{A}} = \sum_{j=1}^{N_t} \theta_{t,i,j} a_j$ for $i=1, \ldots, N_t$, $\mathbb{B}^*_t := (b^*_{t,1}, \ldots, b^*_{t,N_t})$ [Formula 134]

(S104: Basis B^ Generation Step)

With the processing device, the key generation part 114 generates a basis $\hat{\mathbb{B}}_0$, a basis $\hat{\mathbb{B}}_1$, a basis $\hat{\mathbb{B}}^*_0$, and a basis $\hat{\mathbb{B}}^*_1$, as indicated in Formula 135.

$\hat{\mathbb{B}}_0 := (b_{0,1}, b_{0,3}, b_{0,5})$, $\hat{\mathbb{B}} := (b_{1,1}, \ldots, b_{1,n}, b_{1,5n+1}, \ldots, b_{1,6n}) = \{B_{i,j}, B'_{i,j,L}\}_{i=1,6; j=1, \ldots, 6; L=1, \ldots, n}$, $\hat{\mathbb{B}}_0^* := (b_{0,1}^*, b_{0,3}^*, b_{0,4}^*)$, $\hat{\mathbb{B}}_1^* := (b_{1,1}^*, \ldots, b_{1,n}^*, b_{1,3n+1}^*, \ldots, b_{1,5n}^*)$ [Formula 135]

(S105: Master Key Generation Step)

With the processing device, the key generation part 114 generates a public parameter pk:=$(1^\lambda, param_n, \{\hat{\mathbb{B}}_t\}_{t=0,1})$ and a master secret key sk:=$\{\hat{\mathbb{B}}^*_t\}_{t=0,1}$. Then, the key generation part 114 stores the public parameter pk and the master secret key sk in the master key storage part 120.

Note that $param_n := (\{param_{Vt}\}_{t=0,1}, g_T := e(g,g)^\psi)$.

In brief, in (S101) through (S105), the key generation device 100 generates the public parameter pk and the master secret key sk by executing the Setup algorithm indicated in Formula 137, the Setup algorithm using an algorithm $\mathcal{G}^{ABE(1)}_{ob}$ indicated in Formula 136.

$\mathcal{G}^{ABE(1)}_{ob}(1^\lambda, 6, n)$: [Formula 136]

$param_{\mathbb{G}} := (q, \mathbb{G}, \mathbb{G}_T, g, e) \xleftarrow{R} \mathcal{G}_{bpg}(1^\lambda)$, $N_0 := 5, N_1 := 6n$, $param_{V_t} := (q, \mathbb{V}_t, \mathbb{G}_T, \mathbb{A}, e) := \mathcal{G}_{dpvs}(1^\lambda, N_t, param_{\mathbb{G}})$ for $t = 0, 1$, $\psi \xleftarrow{U} \mathbb{F}_q^\times, g_T := e(g,g)^\psi, param_n := (\{param_{V_T}\}_{t=0,1}, g_T)$, $X_0 := (\chi_{0,i,j})_{i,j=1,\ldots,5} \xleftarrow{U} GL(N_0, \mathbb{F}_q), X_1 \xleftarrow{U} \mathcal{L}(6, n, \mathbb{F}_q)$, hereafter $\{\mu_{i,j}, \mu'_{i,j,L}\}_{i,j=1,\ldots,6; L=1,\ldots,n}$ denotes non-zero entries of $X_1$, $b_{0,i} := (\chi_{0,i,1}, \ldots, \chi_{0,i,5})_{\mathbb{A}} = \sum_{j=1}^{5} \chi_{0,i,j} a_j$ for $i = 1, \ldots, 5, \mathbb{B}_0 := (b_{0,1}, \ldots, b_{0,5})$, $B_{i,j} := \mu_{i,j} g, B'_{i,j,L} := \mu'_{i,j,L} g$ for $i, j = 1, \ldots, 6; L = 1, \ldots, n$, for $t = 0, 1$ $(\theta_{t,i,j})_{i,j=1,\ldots,N_t} := \psi \cdot (X_t^T)^{-1}$, $b^*_{t,i} := (\theta_{t,i,1}, \ldots, \theta_{t,i,N_t})_{\mathbb{A}} = \sum_{j=1}^{N_t} \theta_{t,i,j} a_j$ for $i = 1, \ldots, N_t, \mathbb{B}^*_t := (b^*_{t,1}, \ldots, b^*_{t,N_t})$, return $(param_n, \mathbb{B}_0, \mathbb{B}^*_0, \{B_{i,j}, B'_{i,j,L}\}_{i,j=1,\ldots,6; L=1,\ldots,n}, \mathbb{B}^*_1)$.

Setup$(1^\lambda, n)$: [Formula 137]

$(param_n, \mathbb{B}_0, \mathbb{B}^*_0, \{B_{i,j}, B'_{i,j,L}\}_{i,j=1,\ldots,6; L=1,\ldots,n}, \mathbb{B}^*_1) \xleftarrow{R} \mathcal{G}^{ABE(1)}_{ob}(1^\lambda, 6, n)$, $\hat{\mathbb{B}}_0 := (b_{0,1}, b_{0,3}, b_{0,5})$, $\hat{\mathbb{B}}_1 := (b_{1,1}, \ldots, b_{1,n}, b_{1,5n+1}, \ldots, b_{1,6n}) = \{B_{i,j}, B'_{i,j,L}\}_{i=1,6; j=1,\ldots,6; L=1,\ldots,n}$, $\hat{\mathbb{B}}_0^* := (b_{0,1}^*, b_{0,3}^*, b_{0,4}^*)$, $\hat{\mathbb{B}}_1^* := (b_{1,1}^*, \ldots, b_{1,n}^*, b_{1,3n+1}^*, \ldots, b_{1,5n}^*)$, $pk := (1^\lambda, param_n, \{\hat{\mathbb{B}}_t\}_{t=0,1}), sk := \{\hat{\mathbb{B}}^*_t\}_{t=0,1}$, return $pk, sk$.

The public parameter is published, for example, via a network, and is made available for the encryption device 200 and the decryption device 300.

In S103, instead of generating a basis $\mathbb{B}_1$, the variable $B_{i,j}$ is generated. If the basis $\mathbb{B}_1$ is to be generated, it is as indicated in Formula 138.

$$\left(\begin{array}{c} b_{1,(i-1)n+1} \\ \vdots \\ b_{1,in} \end{array}\right) :=$$ [Formula 138]

$$\left(\begin{array}{cccccc} B_{i,1} & & & B'_{i,1,1} & B_{i,6} & & & B'_{i,6,1} \\ & \ddots & & \vdots & & \ddots & & \vdots \\ & & B_{i,1} & B'_{i,1,n-1} & \ldots & & B_{i,6} & B'_{i,6,n-1} \\ & & & B'_{i,1,n} & & & & B'_{i,6,n} \end{array}\right)$$

for $i = 1, \ldots, 6$, $\mathbb{B}_1 := (b_{1,1}, \ldots, b_{1,6n})$

A blank portion in the matrix of Formula 138 denotes that the value of the element is $0 \in \mathbb{G}$. The basis $\mathbb{B}_1$ is the orthonormal basis of the basis $B^*_1$. That is, $e(b_{1,i}, b^*_{1,i})=g_T$, and $e(b_{1,i}, b^*_{1,j})=1$ for integers i and j of $1 \le i \ne j \le 6n$.

With reference to FIG. 10, the process of the KeyGen algorithm will be described.

(S201: Information Input Step)

With an input device, the information input part 130 takes as input an access structure $S:=(M, \rho)$. Note that the matrix M of the access structure S is to be set according to the conditions of a system to be implemented. Note also that attribute information of a user of a decryption key $sk_S$ is set in $\rho$ of the access structure S, for example.

(S202: f Vector Generation Step)

With the processing device, the f vector generation part 141 randomly generates a vector $\vec{f}$, as indicated in Formula 139.

$$\vec{f} \xleftarrow{U} \mathbb{F}_q^r \qquad \text{[Formula 139]}$$

(S203: s Vector Generation Step)

With the processing device, the s vector generation part 142 generates a vector $\vec{s}^T:=(s_1, \ldots, s_L)^T$, as indicated in Formula 140.

$$\vec{s}^T:=(s_1, \ldots, s_L)^T:=M \cdot \vec{f}^T \qquad \text{[Formula 140]}$$

With the processing device, the s vector generation part 142 also generates a value $s_0$, as indicated in Formula 141.

$$s_0:=\vec{1} \cdot \vec{f}^T \qquad \text{[Formula 141]}$$

(S204: Random Number Generation Step)

With the processing device, the random number generation part 143 generates random numbers, as indicated in Formula 142.

$$\eta_0 \xleftarrow{U} \mathbb{F}_q, \qquad \text{[Formula 142]}$$
$$\vec{\eta}_i \xleftarrow{U} \mathbb{F}_q^{2n} \text{ for } i = 1, \ldots, L,$$
$$\theta_i \xleftarrow{U} \mathbb{F}_q \text{ for } i = 1, \ldots, L$$

(S205: Key Element Generation Step)

With the processing device, the key element generation part 144 generates an element $k^*_0$ of the decryption key $sk_S$, as indicated in Formula 143.

$$k_0^*:=(-s_0, 0, 1, \eta_0, 0)_{\mathbb{B}_0^*} \qquad \text{[Formula 143]}$$

With the processing device, the key element generation part 144 also generates an element $k^*_i$ of the decryption key $sk_S$ for each integer $i=1, \ldots, L$, as indicated in Formula 144.

$$\text{for } i = 1, \ldots, L, \vec{v}_i := (v_i^{n-1}, \ldots, v_i, 1), \qquad \text{[Formula 144]}$$
$$\text{if } \rho(i) = v_i,$$
$$k_i^* := (\overbrace{s_i \vec{e}_1 + \theta_i \vec{v}_i}^{n}, \overbrace{0^{2n}}^{2n}, \overbrace{\vec{\eta}_i}^{2n}, \overbrace{0^n}^{n})_{\mathbb{B}_1^*},$$
$$\text{if } \rho(i) = \neg v_i,$$
$$k_i^* := (\overbrace{s_i \vec{v}_i}^{n_t}, \overbrace{0^{2n}}^{2n}, \overbrace{\vec{\eta}_i}^{2n}, \overbrace{0^n}^{n})_{\mathbb{B}_1^*}$$

(S206: Key Transmission Step)

With a communication device and via the network, for example, the key transmission part 150 transmits the decryption key $sk_S$ having, as elements, the access structure S inputted in (S201) and $k^*_0, k^*_1, \ldots,$ and $k^*_L$ generated in (S205) to the decryption device 300 in secrecy. As a matter of course, the decryption key $sk_S$ may be transmitted to the decryption device 300 by another method.

In brief, in (S201) through (S205), the key generation device 100 generates the decryption key $sk_S$ by executing the KeyGen algorithm indicated in Formula 145. In (S206), the key generation device 100 transmits the generated decryption key $sk_S$ to the decryption device 300.

$$KeyGen(pk, sk, \mathbb{S} = (M, \rho)): \qquad \text{[Formula 145]}$$
$$\vec{f} \xleftarrow{U} \mathbb{F}_q^r,$$
$$\vec{s}^T := (s_1, \ldots, s_L)^T := M \cdot \vec{f}^T, s_0 := \vec{1} \cdot \vec{f}^T,$$
$$\eta_0 \xleftarrow{U} \mathbb{F}_q,$$
$$k_0^* := (-s_0, 0, 1, \eta_0, 0)_{\mathbb{B}_0^*},$$
$$\text{for } i = 1, \ldots, L, \vec{v}_i := (v_i^{n-1}, \ldots, v_i, 1),$$
$$\vec{\eta}_i \xleftarrow{U} \mathbb{F}_q^{2n}$$
$$\text{if } \rho(i) = v_i \in \mathbb{F}_q^\times, \theta_i \xleftarrow{U} \mathbb{F}_q,$$
$$k_i^* := (\overbrace{s_i \vec{e}_1 + \theta_i \vec{v}_i}^{n}, \overbrace{0^{2n}}^{2n}, \overbrace{\vec{\eta}_i}^{2n}, \overbrace{0^n}^{n})_{\mathbb{B}_1^*},$$
$$\text{if } \rho(i) = \neg v_i,$$
$$k_i^* := (\overbrace{s_i \vec{v}_i}^{n_t}, \overbrace{0^{2n}}^{2n}, \overbrace{\vec{\eta}_i}^{2n}, \overbrace{0^n}^{n})_{\mathbb{B}_1^*}$$
$$sk_\mathbb{S} := (\mathbb{S}, k_0^*, k_1^*, \ldots, k_L^*)$$
$$\text{return } sk_\mathbb{S}.$$

The function and operation of the encryption device 200 will be described.

As illustrated in FIG. 7, the encryption device 200 includes a public parameter receiving part 210, an information input part 220, an encrypted data generation part 230, and a data transmission part 240. The encrypted data generation part 230 includes a random number generation part 231 and a cipher element generation part 232.

With reference to FIG. 11, the process of the Enc algorithm will be described.

(S301: Public Parameter Receiving Step)

With the communication device and via the network, for example, the public parameter receiving part 210 receives the public parameter pk generated by the key generation device 100.

(S302: Information Input Step)

With the input device, the information input part 220 takes as input a message m to be transmitted to the decryption device 300. With the input device, the information input part 220 also takes as input an attribute set $\Gamma:=\{x_1, \ldots, x_{n'} | x_j \in \mathbb{F}_q^\times, n' \le n-1\}$. Note that attribute information of a user capable of decryption is set in the attribute set $\Gamma$, for example.

(S303: Random Number Generation Step)

With the processing device, the random number generation part 231 generates random numbers, as indicated in Formula 146.

$$\omega, \varphi_0, \varphi_1, \zeta \xleftarrow{U} \mathbb{F}_q \quad \text{[Formula 146]}$$

(S304: Cipher Element Generation Step)

With the processing device, the cipher element generation part 232 generates an element $c_0$ of a ciphertext $ct_\Gamma$, as indicated in Formula 147.

$$c_0 := (\omega, 0, \zeta, 0, \varphi_0)_{\mathbb{B}_0} \quad \text{[Formula 147]}$$

With the processing device, the cipher element generation part 232 also generates elements $C_{1,j}$ and $C_{2,j}$ of the ciphertext $ct_\Gamma$, as indicated in Formula 148.
for j=1, . . . , 6

$$C_{1,j} := \omega B_{1,j} + \eta_1 B_{6,j},$$

$$C_{2,j} := \Sigma_{L=1}^n y_L(\omega B_{1,j,L}' + \phi_1 B_{6,j,L}') \quad \text{[Formula 148]}$$

where $$\vec{y} := (y_1, \ldots, y_n) \text{ such that } \Sigma_{j=0}^{n-1} y_{n-j} z^j = z^{n-1-n'} \cdot \Pi_{j=1}^{n'}(z - x_j)$$

With the processing device, the cipher element generation part 232 also generates an element $c_3$ of the ciphertext $ct_\Gamma$, as indicated in Formula 149.

$$c_3 := g_T^\zeta m \quad \text{[Formula 149]}$$

(S305: Data Transmission Step)

With the communication device and via the network, for example, the data transmission part 240 transmits the ciphertext $ct_\Gamma$ having, as elements, the attribute set $\Gamma$ inputted in (S302) and $c_0$, $C_{1,j}$, $C_{2,j}$, and $c_3$ generated in (S304) to the decryption device 300. As a matter of course, the ciphertext $ct_\Gamma$ may be transmitted to the decryption device 300 by another method.

In brief, in (S301) through (S304), the encryption device 200 generates the ciphertext $ct_\Gamma$ by executing the Enc algorithm indicated in Formula 150. In (S305), the encryption device 200 transmits the generated ciphertext $ct_\Gamma$ to the decryption device 300.

$$Enc(pk, m, \Gamma = \{x_1, \ldots, x_{n'} \mid x_j \in \mathbb{F}_q^\times, n' \leq n-1\}): \quad \text{[Formula 150]}$$

$$\omega, \varphi_0, \varphi_1, \zeta \xleftarrow{U} \mathbb{F}_q,$$

$$\vec{y} := (y_1, \ldots, y_n) \text{ such that } \sum_{j=0}^{n-1} y_{n-j} z^j =$$

$$z^{n-1-n'} \cdot \prod_{j=1}^{n'}(z - x_j),$$

$$c_0 := (\omega, 0, \zeta, 0, \varphi_0)_{\mathbb{B}_0},$$

$$C_{1,j} := \omega B_{1,j} + \eta_1 B_{6,j},$$

$$C_{2,j} := \sum_{L=1}^n y_L(\omega B_{1,j,L}' + \varphi_1 B_{6,j,L}')$$

for $j = 1, \ldots, 6$, $$c_3 := g_T^\zeta m,$$

$$ct_\Gamma := (\Gamma, c_0, \{C_{1,j}, C_{2,j}\}_{j=1,\ldots,6}, c_3),$$

return $ct_\Gamma$.

The function and operation of the decryption device 300 will be described.

As illustrated in FIG. 8, the decryption device 300 includes a decryption key receiving part 310, a data receiving part 320, a span program computation part 330, a complementary coefficient computation part 340, and a decryption part 350.

With reference to FIG. 12, the process of the Dec algorithm will be described.

(S401: Decryption Key Receiving Step)

With the communication device and via the network, for example, the decryption key receiving part 310 receives the decryption key $sk_S$ transmitted by the key generation device 100. The decryption key receiving part 310 also receives the public parameter pk generated by the key generation device 100.

(S402: Data Receiving Step)

With the communication device and via the network, for example, the data receiving part 320 receives the ciphertext $ct_\Gamma$ transmitted by the encryption device 200.

(S403: Span Program Computation Step)

With the processing device, the span program computation part 330 determines whether or not the access structure S included in the decryption key $sk_S$ received in (S401) accepts F included in the ciphertext $ct_\Gamma$ received in (S402). The method for determining whether or not the access structure S accepts $\Gamma$ is as described in "2. Concept for Implementing Cryptographic Scheme".

If the access structure S accepts $\Gamma$ (accept in S403), the span program computation part 330 advances the process to (S404). If the access structure S rejects $\Gamma$ (reject in S403), the span program computation part 330 determines that the ciphertext $ct_\Gamma$ cannot be decrypted with the decryption key $sk_S$, and ends the process.

(S404: Complementary Coefficient Computation Step)

With the processing device, the complementary coefficient computation part 340 computes I and a constant (complementary coefficient) $\{\alpha_i\}_{i \in I}$ such that Formula 151 is satisfied.

$$\vec{1} = \sum_{i \in I} \alpha_i M_i \quad \text{[Formula 151]}$$

where $M_i$ is the $i$-th row of $M$, and $$I \subseteq \{i \in \{1, \ldots, L\} \mid [\rho(i) = v_i \land v_i \in \Gamma] \lor$$

$$[\rho(i) = \neg v_i \land v_i \notin \Gamma]\}$$

(S405: Decryption Element Generation Step)

With the processing device, the decryption part 350 generates decryption elements $D^*_1, \ldots, D^*_{6n}, E^*_j$, as indicated in Formula 152.

$$(D^*_1, \ldots, D^*_{6n}) := \sum_{i \in I \land \rho(i) = v_i} \alpha_i k_i^* + \sum_{i \in I \land \rho(i) = \neg v_i} \frac{\alpha_i}{\vec{v}_i \cdot \vec{y}} k_i^* \quad \text{[Formula 152]}$$

$$E^*_j := \sum_{L=1}^{n-1} y_{L-1} D^*_{(j-1)n+L} \text{ for } j = 1, \ldots, 6$$

(S406: Pairing Operation Step)

With the processing device, the decryption part 350 computes Formula 153, and thereby generates a session key $K = g_T^\zeta$.

$$K := e(c_0, k_0^*) \cdot \Pi_{j=1}^6 (e(C_{1,j}, E_j^*) \cdot e(C_{2,j}, D_{jn}^*)) \quad \text{[Formula 153]}$$

(S407: Message Computation Step)

With the processing device, the decryption part 350 computes m'=$c_3$/K, and thereby generates a message m'(=m).

In brief, in (S401) through (S407), the decryption device 300 generates the message m'(=m) by executing the Dec algorithm indicated in Formula 154.

$$Dec(pk, sk_{\mathbb{S}} := (\mathbb{S}, k_0^*, k_1^*, \ldots, k_L^*),$$
$$ct_\Gamma := (\Gamma, c_0, \{C_{1,j}, C_{2,j}\}_{j=1,\ldots,6}, c_3)): \qquad \text{[Formula 154]}$$

If $\mathbb{S}$ accepts $\Gamma$, then compute $I$ and $\{\alpha_i\}_{i \in I}$ such that, $$\vec{1} = \sum_{i \in I} \alpha_i M_i$$

where $M_i$ is the $i$-th row of $M$, and $$I \subseteq \{i \in \{1, \ldots, L\} \mid [\rho(i) = v_i \wedge v_i \in \Gamma] \vee [\rho(i) = \neg v_i \wedge v_i \notin \Gamma]\}$$

$$\vec{y} := (y_1, \ldots, y_n) \text{ such that } \sum_{j=0}^{n-1} y_{n-j} z^j =$$
$$z^{n-1-n'} \cdot \prod_{j=1}^{n'} (z - x_j),$$

$$(D_1^*, \ldots, D_{6n}^*) := \sum_{i \in I \wedge \rho(i) = v_i} \alpha_i k_i^* + \sum_{i \in I \wedge \rho(i) = \neg v_i} \frac{\alpha_i}{\vec{v}_i \cdot \vec{y}} k_i^*,$$

$$E_j^* := \sum_{L=1}^{n-1} y_{L-1} D_{(j-1)n+L}^* \text{ for } j = 1, \ldots, 6,$$

$$K := e(c_0, k_0^*) \cdot \prod_{j=1}^{6} (e(C_{1,j}, E_j^*) \cdot e(C_{2,j}, D_{jn}^*)),$$

return $m' := c_3 / K$.

Based on Formula 138, $B_1 := (b_{1,1}, \ldots, b_{1,6n})$ is identified by $\{B_{i,j}, B'_{i,j,L}\}_{i,j=1,\ldots,6;\, L=1,\ldots,n}$. $\{B_{i,j}, B'_{i,j,L}\}_{i=1,6;\, j=1,\ldots,6;\, L=1,\ldots}$, included in the output of the Setup algorithm is identified by $\hat{B}_1 := (b_{1,1}, \ldots, b_{1,n}, b_{1,5n+1}, \ldots, b_{1,6n})$.

Then, the Dec algorithm can be described as a Dec' algorithm indicated in Formula 155.

$$Dec'(pk, sk_{\mathbb{S}} := (\vec{v}, k_0^*, k_1^*, \ldots, k_L^*),$$
$$ct_\Gamma := (\Gamma, c_0, \{C_{1,j}, C_{2,j}\}_{j=1,\ldots,6}, c_3)): \qquad \text{[Formula 155]}$$

If $\mathbb{S}$ accepts $\Gamma$, then compute $I$ and $\{\alpha_i\}_{i \in I}$ such that, $$\vec{1} = \sum_{i \in I} \alpha_i M_i$$

where $M_i$ is the $i$-th row of $M$, and $$I \subseteq \{i \in \{1, \ldots, L\} \mid [\rho(i) = v_i \wedge v_i \in \Gamma] \vee [\rho(i) = \neg v_i \wedge v_i \notin \Gamma]\}$$

$$\vec{y} := (y_1, \ldots, y_n) \text{ such that } \sum_{j=0}^{n-1} y_{n-j} z^j = z^{n-1-n'} \cdot \prod_{j=1}^{n'} (z - x_j),$$

$$c_1 = \begin{pmatrix} \overline{y_1 C_{1,1}, \ldots, y_{n-1} C_{1,1} C_{2,1}}^n, \\ \overline{y_1 C_{1,2}, \ldots, y_{n-1} C_{1,2}, C_{2,2}}^n, \end{pmatrix}$$

$$\ldots \begin{pmatrix} \overline{y_1 C_{1,5}, \ldots, y_{n-1} C_{1,5} C_{2,5}}^n, \\ \overline{y_1 C_{1,6}, \ldots, y_{n-1} C_{1,6}, C_{2,6}}^n, \end{pmatrix},$$

that is, $c_1 = (\omega\vec{y}, 0^{2n}, 0^{2n}, \varphi_1\vec{y})_{\mathbb{B}_1}$, $$K := e(c_0, k_0^*) \cdot$$
$$e\left(c_1, \sum_{i \in I \wedge \rho(i) = v_i} \alpha_i k_i^* + \sum_{i \in I \wedge \rho(i) = \neg v_i} \frac{\alpha_i}{\vec{v}_i \cdot \vec{y}} k_i^*\right),$$

return $m' := c_3 / K$.

As indicated in Formula 156, when the Dec' algorithm is employed, $K := g_T^\zeta$ is obtained. Therefore, the message m' (=m) can be obtained by dividing $c_3 = g_T^\zeta m$ by K.

$$e(c_0, k_0^*) \cdot \prod_{i \in I \wedge \rho(i) = v_i} e(c_1, k_i^*)^{\alpha_i} \cdot \prod_{i \in I \wedge \rho(i) = \neg v_i} e(c_1, k_i^*)^{\alpha_i/(\vec{v}_i \cdot \vec{y})} = \qquad \text{[Formula 156]}$$

$$g_T^{-\omega s_0 + \zeta} \prod_{i \in I \wedge \rho(i) = v_i} g_T^{\omega \alpha_i s_i} \prod_{i \in I \wedge \rho(i) = \neg v_i} g_T^{\omega \alpha_i s_i (\vec{v}_i \cdot \vec{y})/(\vec{v}_i \cdot \vec{y})} =$$

$$g_T^{\omega(-s_0 + \sum_{i \in I} \alpha_i s_i) + \zeta} = g_T^\zeta.$$

In the KP-ABE scheme described in Embodiment 1, the ciphertext $ct_\Gamma$ consists of a total of 17 elements of G, which are five elements in the element $c_0$, and 12 elements in the element $C_{1,j}$ and the element $C_{2,j}$ for each integer $j=1, \ldots, 6$, as well as one element of $G_T$ in the element $c_3$. That is, the ciphertext $ct_\Gamma$ is constant-size in n.

In the KP-ABE scheme described in Embodiment 1, the decryption process (Dec algorithm) executes only a total of 17 pairing operations, which are five operations in $e(c_0, k^*_0)$ indicated in Formula 153 and 12 operations in $\Pi_{j=1}^{6}(e(C_{1,j}, E^*_j) \cdot e(C_{2,j}, D^*_{jn}))$. That is, the number of pairing operations required for the decryption process is small.

Embodiment 2

In Embodiment 2, a ciphertext-policy ABE (CP-ABE) scheme with a constant-size secret key will be described.

In Embodiment 2, description will be omitted for what is the same as in Embodiment 1, and differences from Embodiment 1 will be described.

First, a basic structure of a cryptographic scheme according to Embodiment 2 will be described.

Second, a configuration of a cryptographic system 10 that implements the cryptographic scheme according to Embodiment 2 will be described.

Third, the cryptographic scheme according to Embodiment 2 will be described in detail.

<1. Basic Structure of Cryptographic Scheme>

The structure of the CP-ABE scheme will be briefly described. Ciphertext-policy signifies that a policy, namely an access structure, is embedded in a ciphertext.

The CP-ABE scheme includes four algorithms: Setup, KeyGen, Enc, and Dec.

(Setup)

A Setup algorithm is a probabilistic algorithm that takes as input a security parameter λ and an upper limit n for of the number of attributes for a ciphertext, and outputs a public parameter pk and a master key sk.

(KeyGen)

A KeyGen algorithm is a probabilistic algorithm that takes as input the public parameter pk, the master key sk, and an attribute set $\Gamma := \{x_j\}_{1 \leq j \leq n'}$, and outputs a decryption key $sk_\Gamma$.

(Enc)

An Enc algorithm is a probabilistic algorithm that takes as input the public parameter pk, a message m, and an access structure $S := (M, \rho)$, and outputs a ciphertext $ct_S$.

(Dec)

A Dec algorithm is an algorithm that takes as input the public parameter pk, the decryption key $sk_\Gamma$, and the ciphertext $ct_S$, and outputs the message m or a distinguished symbol $\perp$.

<2. Configuration of Cryptographic System 10 that Implements CP-ABE Scheme>

Figure 13:
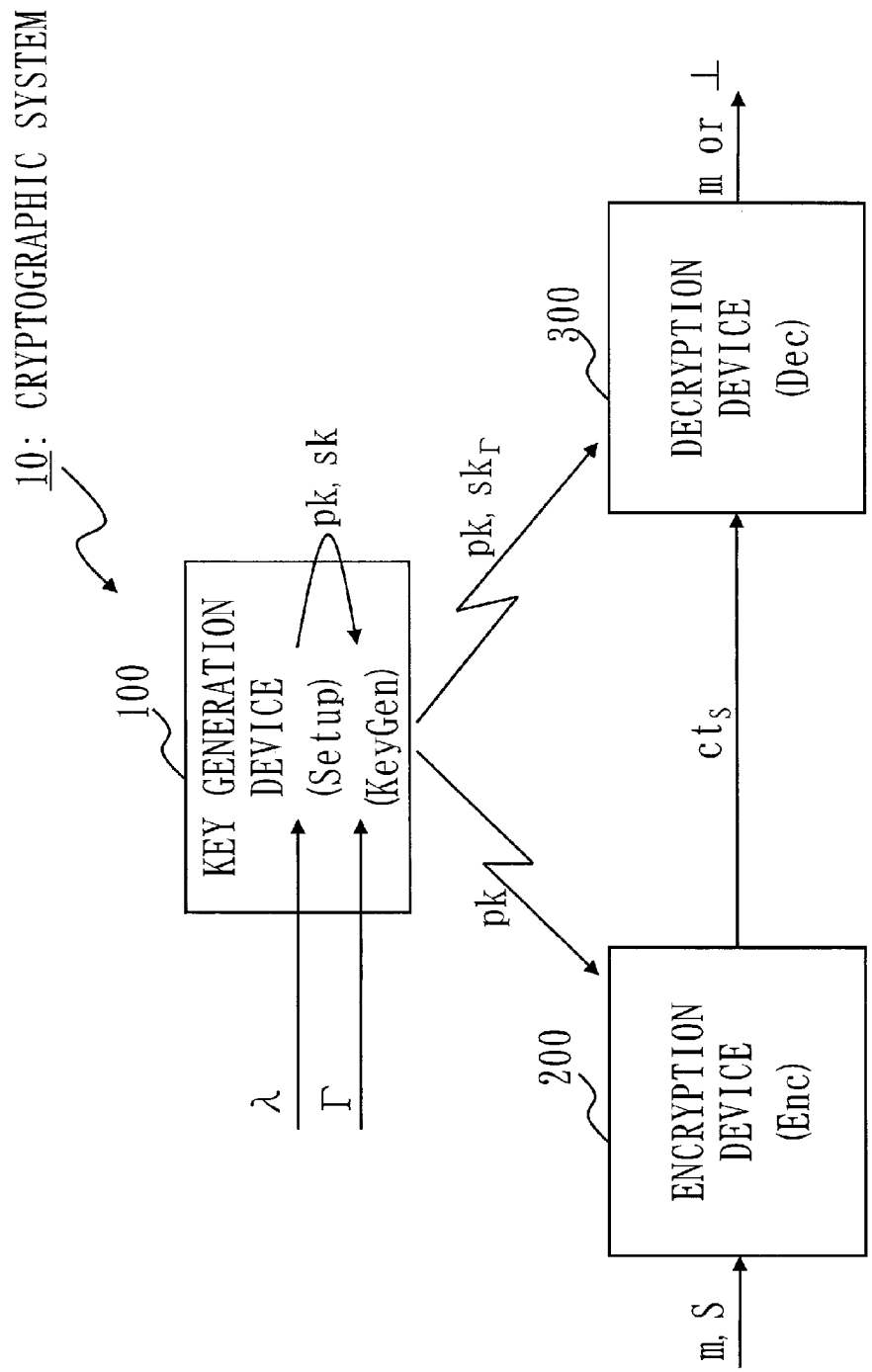
FIG. 13 is a configuration diagram of a cryptographic system 10 that implements a CP-ABE scheme according to Embodiment 2.

FIG. 13 is a configuration diagram of the cryptographic system 10 that implements the CP-ABE scheme according to Embodiment 2.

The cryptographic system 10 includes a key generation device 100, an encryption device 200 (an example of the transmission device), and a decryption device 300 (an example of the reception device).

The key generation device 100 executes the Setup algorithm taking as input a security parameter $\lambda$ and an upper limit n for the number of attributes for a ciphertext, and thereby generates a public parameter pk and a master key sk. Then, the key generation device 100 publishes the generated public parameter pk. The key generation device 100 also executes the KeyGen algorithm taking as input an attribute set $\Gamma$, thereby generates a decryption key $sk_\Gamma$, and transmits the decryption key $sk_\Gamma$ to the decryption device 300 in secrecy.

The encryption device 200 executes the Enc algorithm taking as input the public parameter pk, a message m, and an access structure S, and thereby generates a ciphertext $ct_S$. The encryption device 200 transmits the generated ciphertext $ct_S$ to the decryption device 300.

The decryption device 300 executes the Dec algorithm taking as input the public parameter pk, the decryption key $sk_\Gamma$, and the ciphertext $ct_S$, and outputs the message m or a distinguished symbol $\perp$.

<3. Cryptographic Scheme>

Figure 14:
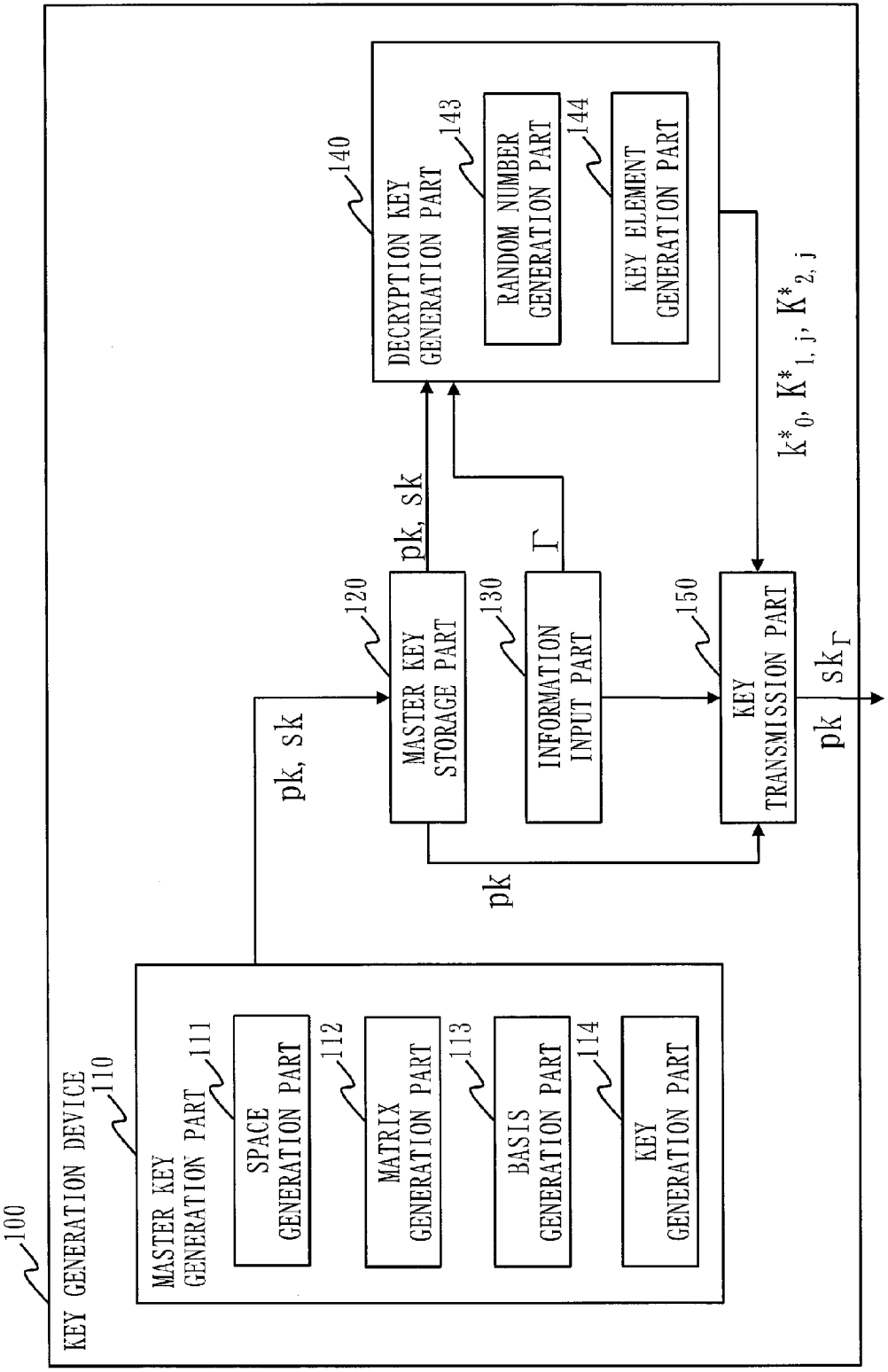
FIG. 14 is a configuration diagram of a key generation device 100 according to Embodiment 2.
Figure 15:
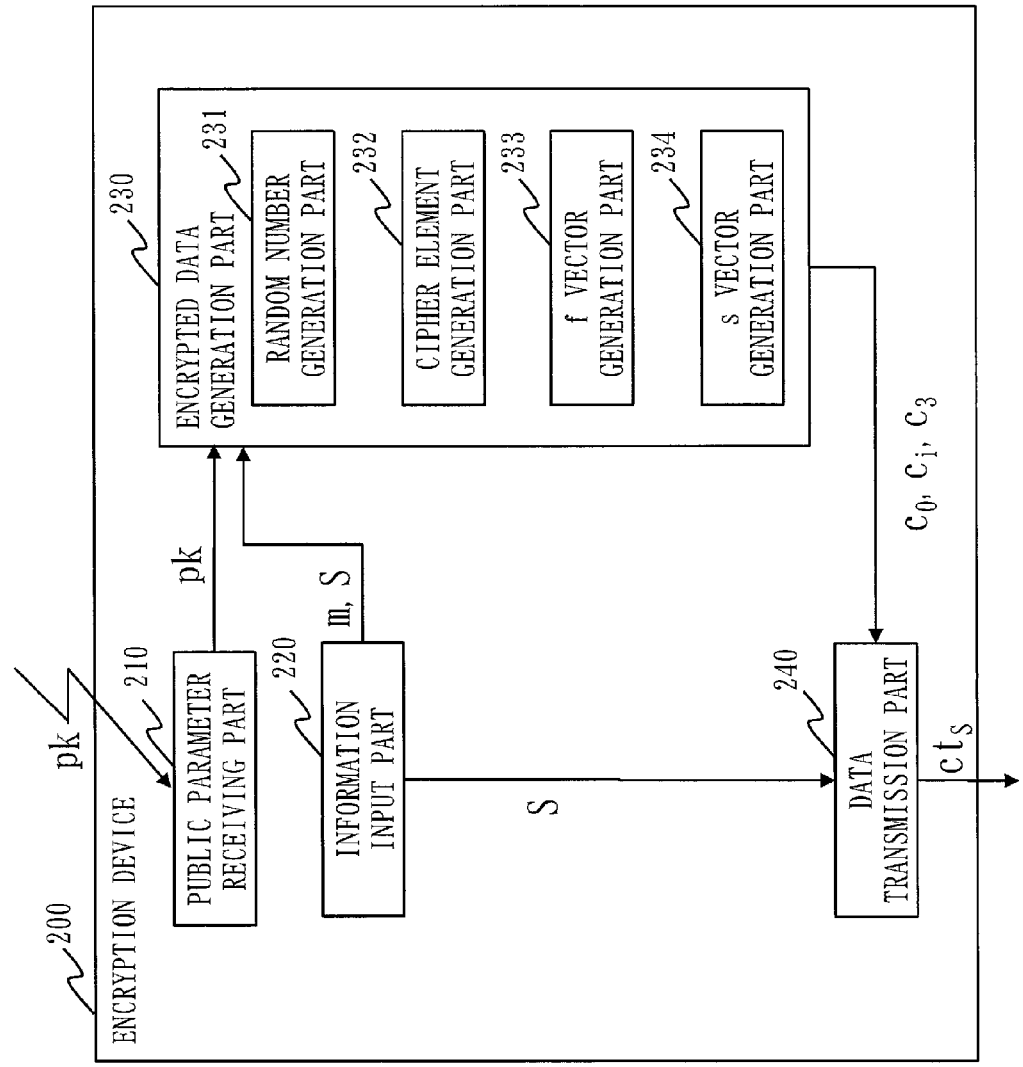
FIG. 15 is a configuration diagram of an encryption device 200 according to Embodiment 2.

FIG. 14 is a configuration diagram of the key generation device 100 according to Embodiment 2. FIG. 15 is a configuration diagram of the encryption device 200 according to Embodiment 2. The configuration of the decryption device 300 is the same as the configuration of the decryption device 300 according to Embodiment 1 illustrated in FIG. 8.

Figure 16:
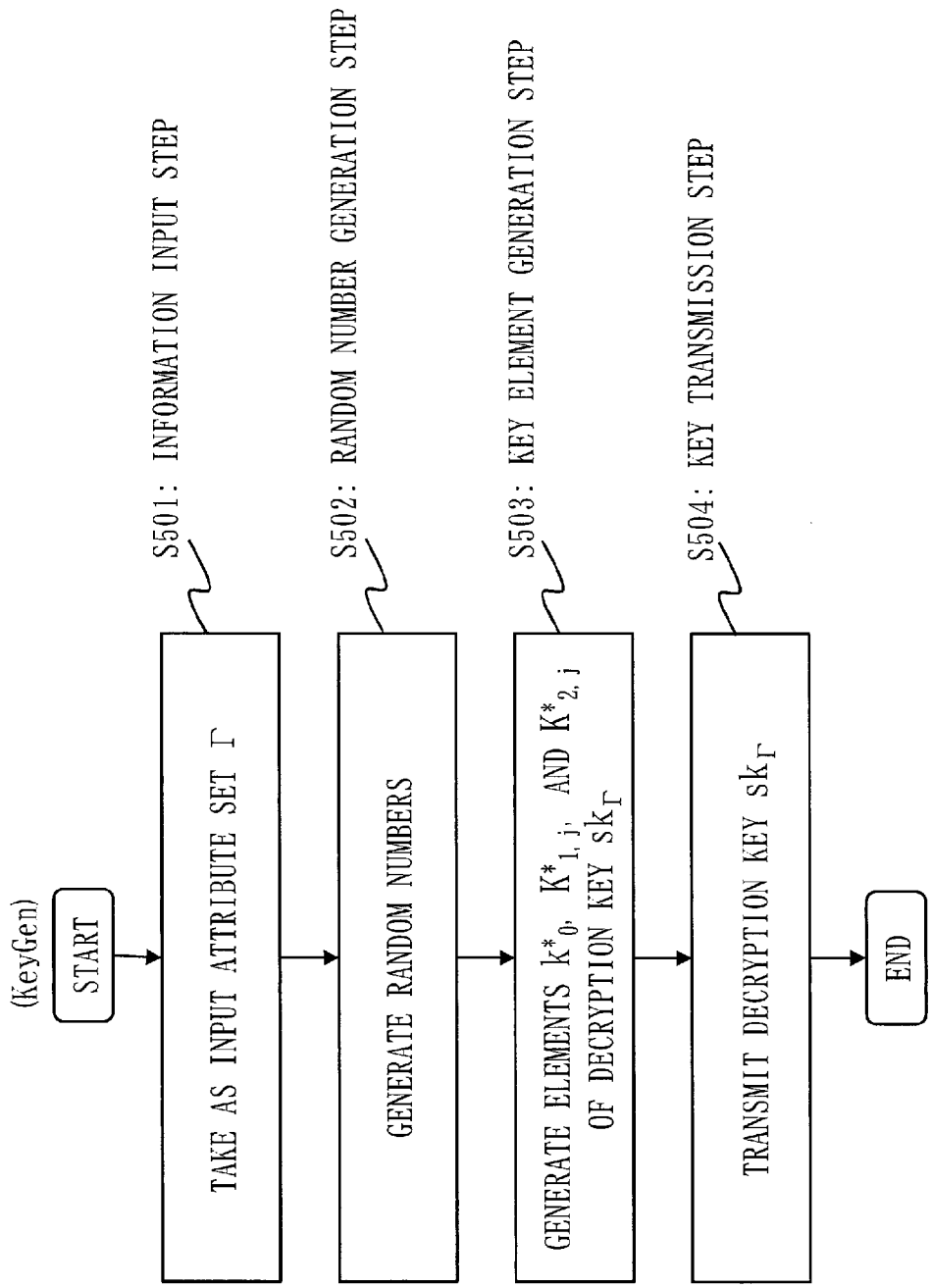
FIG. 16 is a flowchart illustrating the process of a KeyGen algorithm according to Embodiment 2.
Figure 17:
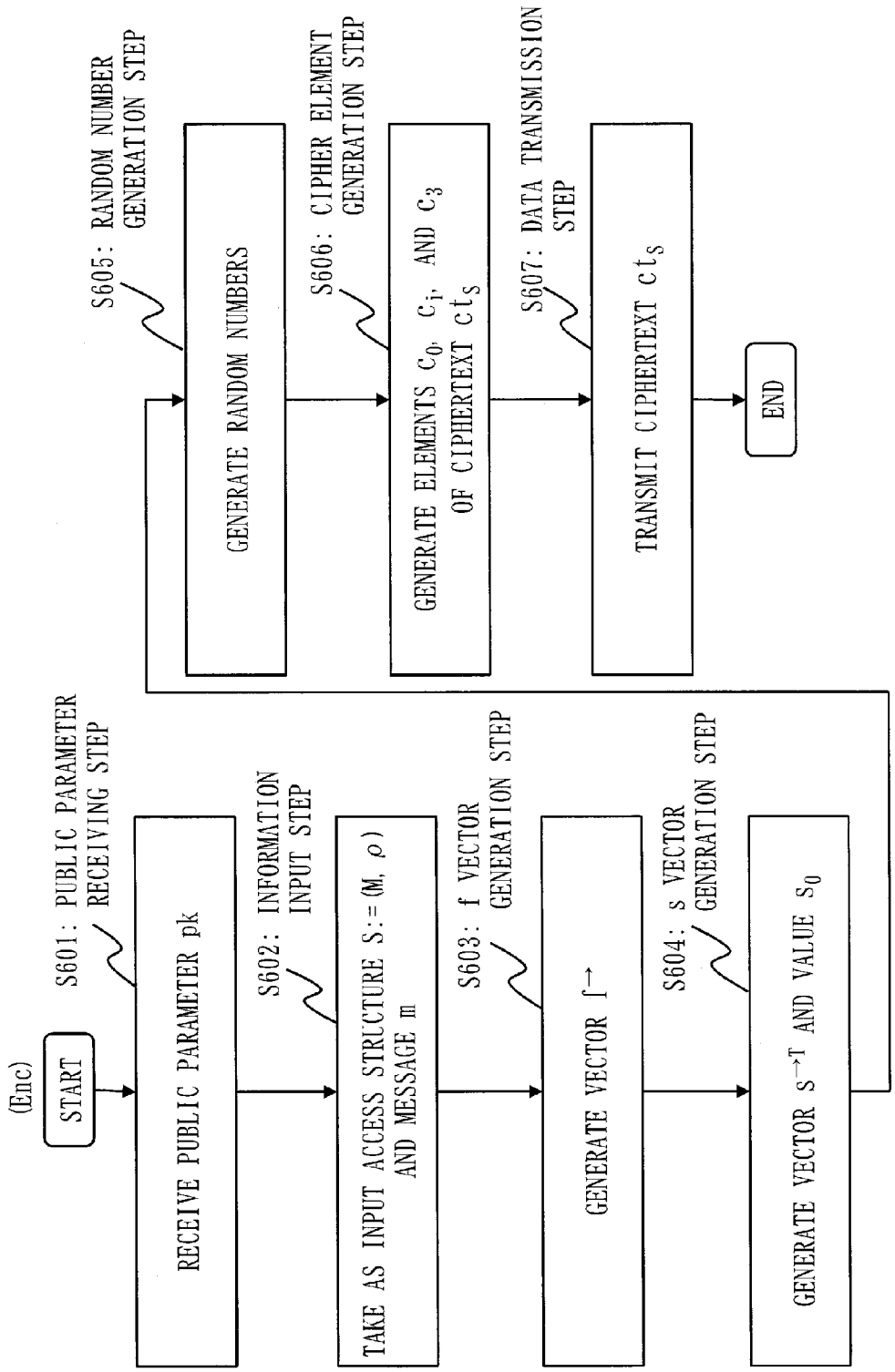
FIG. 17 is a flowchart illustrating the process of an Enc algorithm according to Embodiment 2.

FIG. 16 is a flowchart illustrating the process of the KeyGen algorithm according to Embodiment 2. FIG. 17 is a flowchart illustrating the process of the Enc algorithm according to Embodiment 2. The process of the Setup algorithm and the process of the Dec algorithm have the same flow as that of the process of the Setup algorithm and the process of the Dec algorithm according to Embodiment 1 indicated in FIG. 9 and FIG. 12, respectively.

The function and operation of the key generation device 100 will be described.

As illustrated in FIG. 14, the key generation device 100 includes a master key generation part 110, a master key storage part 120, an information input part 130, a decryption key generation part 140, and a key transmission part 150. The master key generation part 110 includes a space generation part 111, a matrix generation part 112, a basis generation part 113, and a key generation part 114. The decryption key generation part 140 includes a random number generation part 143 and a key element generation part 144.

With reference to FIG. 9, the process of the Setup algorithm will be described.

The process of (S101) through (S102) is the same as that in Embodiment 1.

(S103: Basis B Generation Step)

With the processing device, the basis generation part 113 generates a basis $D_0$, a variable $D_{i,j}$, and a variable $D'_{i,j,L}$, as indicated in Formula 157, similarly to the basis $B_0$, the variable $B_{i,j}$, and the variable $B'_{i,j,L}$ in Embodiment 1.

$$b_{0,i} := (\chi_{0,i,1}, \ldots, \chi_{0,i,5}) \mathbb{A} = \Sigma_{j=1}^5 \chi_{0,i,j} a_j \text{ for } i=1, \ldots 5,$$

$$\mathbb{D}_0 := (b_{0,1}, \ldots, b_{0,5}),$$

$$D_{i,j} := \mu_{i,j} g, D_{i,j,L}' := \mu_{i,j,L}' g \text{ for } i,j=1, \ldots, 6; L=1, \ldots, n \quad \text{[Formula 157]}$$

With the processing device, the basis generation part 113 also generates a basis $D^*_0$ and a basis $D^*_1$, as indicated in Formula 158, similarly to the basis $B^*_0$ and the basis $B^*_1$ in Embodiment 1.

for t=0, 1

$$(\theta_{t,i,j})_{i,j=1, \ldots, N_t} := \psi \cdot (X_t^T)^{-1},$$

$$b^*_{t,i} := (\theta_{t,i,1}, \ldots, \theta_{t,i,N_t}) \mathbb{A} = \Sigma_{j=1}^{N_t} \theta_{t,i,j} a_j \text{ for } i=1, \ldots, N_t,$$

$$\mathbb{D}^*_t := (b^*_{t,1}, \ldots, b^*_{t,N_t}) \quad \text{[Formula 158]}$$

Then, the basis generation part 113 sets the basis $D^*_0$ as a basis $B_0$, the basis $D_0$ as a basis $B^*_0$, and the basis $D^*_1$ as a basis $B_1$. The basis generation part 113 also sets the variable $D_{i,j}$ as a variable $B^*_{i,j}$ and the variable $D'_{i,j,L}$ as a variable $B'^*_{i,j,L}$ for each integer i, j=1, . . . , 6 and each integer L=1, . . . , n.

(S104: Basis B^ Generation Step)

With the processing device, the key generation part 114 generates a basis $\hat{B}_0$, a basis $\hat{B}_1$, a basis $\hat{B}^*_0$, and a basis $\hat{B}^*_1$, as indicated in Formula 159.

$$\hat{\mathbb{B}}_0 := (b_{0,1}, b_{0,3}, b_{0,4}),$$

$$\hat{\mathbb{B}}_1 = (b_{1,1}, \ldots, b_{1,n}, b_{1,3n+1}, \ldots, b_{1,5n}),$$

$$\hat{\mathbb{B}}_0^* := (b_{0,1}^*, b_{0,3}^*, b_{0,5}^*),$$

$$\hat{\mathbb{B}}_1^* := (b_{1,1}^*, \ldots, b_{1,n}^*, b_{1,5n+1}^*, \ldots, b_{1,6n}^*) = \{D_{i,j}, D_{i,j,L}\}_{i=1,6;j=1,\ldots,6;L=1,\ldots,n} \quad \text{[Formula 159]}$$

The process of (S105) is the same as that in Embodiment 1.

In brief, in (S101) through (S105), the key generation device 100 generates the public parameter pk and the master secret key sk by executing the Setup algorithm indicated in Formula 161, the Setup algorithm using an algorithm $G^{ABE(2)}_{ob}$ indicated in Formula 160. Note that the algorithm $G^{CP-ABE(2)}_{ob}$ uses the algorithm $G^{ABE(1)}_{ob}$ indicated in Formula 136, as indicated in Formula 160.

$$\mathcal{G}_{ob}^{ABE(2)}(1^\lambda, 6, n): \qquad \text{[Formula 160]}$$

$$\left(param_n, \mathbb{D}_0, \mathbb{D}_0^*, \{D_{i,j}, D'_{i,j,L}\}_{i,j=1,\ldots,6;L=1,\ldots,n}, \mathbb{D}_1^*\right) \xleftarrow{R}$$
$$\mathcal{G}_{ob}^{(1)}(1^\lambda, 6, n),$$
$$\mathbb{B}_0 := \mathbb{D}_0^*, \mathbb{B}_0^* := \mathbb{D}_0, \mathbb{B}_1 := \mathbb{D}_1^*, \mathbb{B}_{i,j}^* := D_{i,j}, B'^*_{i,j,L} = D'_{i,j,L}$$
for $i, j = 1, \ldots, 6; L = 1, \ldots, n$,
return $\left(param_n, \mathbb{B}_0,\right.$
$$\left.\mathbb{B}_0^*, \mathbb{B}_1, \{B_{i,j}^*, B'^*_{i,j,L}\}_{i,j=1,\ldots,6;L=1,\ldots,n}\right).$$

$$\text{Setup}(1^\lambda, n): \qquad \text{[Formula 161]}$$

$$\left(param_n, \mathbb{B}_0, \mathbb{B}_0^*, \mathbb{B}_1, \{B_{i,j}^*, B'^*_{i,j,L}\}_{i,j=1,\ldots,6;L=1,\ldots,n}\right) \xleftarrow{R}$$
$$\mathcal{G}_{ob}^{ABE(2)}(1^\lambda, 6, n),$$
$$\hat{\mathbb{B}}_0 := (b_{0,1} b_{0,3} b_{0,4}),$$
$$\hat{\mathbb{B}}_1 := (b_{1,1}, \ldots, b_{1,n}, b_{1,3,n+1}, \ldots, b_{1,5n}),$$
$$\hat{\mathbb{B}}_0^* := (b_{0,1}^*, b_{0,3}^*, b_{0,5}^*),$$
$$\hat{\mathbb{B}}_1^* := (b_{1,1}^*, \ldots, b_{1,n}^*, b_{1,5n+1}^*, \ldots, b_{1,6n}^*) =$$
$$\{B_{i,j}^*, B'^*_{i,j,L}\}_{i=1,6;j=1,\ldots,6;L=1,\ldots,n},$$
$$pk := \left(1^\lambda, param_n, \{\hat{\mathbb{B}}_t\}_{t=0,1}\right), sk := \{\hat{\mathbb{B}}_t^*\}_{t=0,1},$$
return $pk, sk$.

The public parameter is published via the network, for example, and is made available for the encryption device 200 and the decryption device 300.

With reference to FIG. 16, the process of the KeyGen algorithm will be described.

(S501: Information Input Step)

With the input device, the information input part 130 takes as input an attribute set $\Gamma := \{x_1, \ldots, x_{n'} | x_j \in \mathbb{F}_q^X, n' \le n-1\}$. Note that attribute information of a user of a decryption key $sk_\Gamma$ is set in the attribute set $\Gamma$, for example.

(S502: Random Number Generation Step)

With the processing device, the random number generation part 143 generates random numbers, as indicated in Formula 162.

$$\omega, \varphi_0, \varphi_1 \xleftarrow{U} \mathbb{F}_q \qquad \text{[Formula 162]}$$

(S503: Key Element Generation Step)

With the processing device, the key element generation part 144 generates an element $k^*_0$ of the decryption key $sk_\Gamma$, as indicated in Formula 163.

$$k_0^* := (\omega, 0, 1, 0, \varphi_0)_{\mathbb{B}_0^*} \qquad \text{[Formula 163]}$$

With the processing device, the key element generation part 144 also generates elements $K^*_{1,j}$ and $K^*_{2,j}$ of the decryption key $sk_\Gamma$, as indicated in Formula 164.
for $j=1, \ldots, 6$ $$\omega B_{1,j}^* + \varphi_1 B_{6,j}^*,$$

$$K_{2,j} := \Sigma_{L=1}^n y_L(\omega B_{1,j,L}'^* + \varphi_1 B_{6,j,L}'^*) \qquad \text{[Formula 164]}$$

where $$\vec{y} := (y_1, \ldots, y_n) \text{ such that } \Sigma_{j=0}^{n-1} y_{n-j} z^j = z^{n-1-n'} \cdot \Pi_{j=1}^{n'}(z-x_j).$$

(S504: Key Transmission Step)

With the communication device and via the network, for example, the key transmission part 150 transmits the decryption key $sk_\Gamma$ having, as elements, the attribute set $\Gamma$ inputted in (S501) and $k^*_0$, $K^*_{i,j}$, and $K^*_{2,j}$ generated in (S503) to the decryption device 300 in secrecy. As a matter of course, the decryption key $sk_\Gamma$ may be transmitted to the decryption device 300 by another method.

In brief, in (S501) through (S503), the key generation device 100 generates the decryption key $sk_\Gamma$ by executing the KeyGen algorithm indicated in Formula 165. In (S504), the key generation device 100 transmits the generated decryption key $sk_\Gamma$ to the decryption device 300.

$$KeyGen(pk, sk, \Gamma = \{x_1, \ldots, x'_n \mid x_j \in \mathbb{F}_q^X, n' \le n-1\}): \qquad \text{[Formula 165]}$$

$$\omega, \varphi_0, \varphi_1 \xleftarrow{U} \mathbb{F}_q,$$

$$\vec{y} := (y_1, \ldots, y_n) \text{ such that } \sum_{j=0}^{n-1} y_{n-j} z^j =$$
$$z^{n-1-n'} \cdot \prod_{j=1}^{n'} (z - x_j),$$

$$k_0^* := (\omega, 0, 1, 0, \varphi_0)_{\mathbb{B}_0^*},$$

$$K_{1,j} := \omega B_{1,j}^* + \varphi_1 B_{6,j}^*,$$

$$K_{2,j} := \overline{\sum}_{L=1}^n y_L(\omega B_{i,j,L}'^* + \varphi_1 B_{6,j,L}'^*)$$

for $j = 1, \ldots, 6$, $$sk_\Gamma := \left(\Gamma, k_0^*, \{K_{1,j}, K_{2,j}\}_{j=1,\ldots,6}\right),$$

return $sk_\Gamma$.

The function and operation of the encryption device 200 will be described.

As illustrated in FIG. 15, the encryption device 200 includes a public parameter receiving part 210, an information input part 220, an encrypted data generation part 230, and a data transmission part 240. The encrypted data generation part 230 includes a random number generation part 231, a cipher element generation part 232, an f vector generation part 233, and an s vector generation part 234.

With reference to FIG. 17, the process of the Enc algorithm will be described.

The process of (S601) is the same as the process of (S301) indicated in FIG. 11.

(S602: Information Input Step)

With the input device, the information input part 220 takes as input an access structure S:=(M, ρ). Note that the access structure S is to be set according to the conditions of a system to be implemented. Note also that attribute information of a user capable of decryption is set in p of the access structure S, for example.

With the input device, the information input part 220 also takes as input a message m to be transmitted to the decryption device 300.

(S603: f Vector Generation Step)

With the processing device, the f vector generation part 233 randomly generates a vector $\vec{f}$, as indicated in Formula 166.

$$\vec{f} \xleftarrow{U} \mathbb{F}_q^r \qquad \text{[Formula 166]}$$

(S604: s Vector Generation Step)

With the processing device, the s vector generation part 234 generates a vector $\vec{s}^T := (s_1, \ldots, s_L)^T$, as indicated in Formula 167.

$$\vec{s}^T := (s_1, \ldots, s_L)^T := M \cdot \vec{f}^T \qquad \text{[Formula 167]}$$

With the processing device, the s vector generation part 234 also generates a value $s_0$, as indicated in Formula 168.

$$s_0 := \vec{1} \cdot \vec{f}^T \qquad \text{[Formula 168]}$$

(S605: Random Number Generation Step)

With the processing device, the random number generation part 231 generates random numbers, as indicated in Formula 169.

$$\eta_0, \zeta \xleftarrow{U} \mathbb{F}_q, \qquad \text{[Formula 169]}$$
$$\vec{\eta}_i \xleftarrow{U} \mathbb{F}_q^{2n} \text{ for } i = 1, \ldots, L,$$
$$\theta_i \xleftarrow{U} \mathbb{F}_q \text{ for } i = 1, \ldots, L$$

(S606: Cipher Element Generation Step)

With the processing device, the cipher element generation part 232 generates an element $c_0$ of a ciphertext $ct_S$, as indicated in Formula 170.

$$c_0 := (-s_0, 0, \zeta, \eta_0, 0)_{\mathbb{B}_0} \qquad \text{[Formula 170]}$$

With the processing device, the cipher element generation part 232 also generates an element $c_i$ of the ciphertext $ct_S$ for each integer $i=1, \ldots, L$, as indicated in Formula 171.

$$\text{for } i = 1, \ldots, L, \vec{v}_i := (v_i^{n-1}, \ldots, v_i, 1), \qquad \text{[Formula 171]}$$
$$\text{if } \rho(i) = v_i,$$
$$c_i := (\overbrace{s_i \vec{e}_{t,1} + \theta_i \vec{v}_i}^{n}, \overbrace{0^{2n}}^{2n}, \overbrace{\vec{\eta}_i}^{2n}, \overbrace{0^n}^{n})_{\mathbb{B}_1},$$
$$\text{if } \rho(i) = \neg v_i,$$
$$c_i := (\overbrace{s_i \vec{v}_i}^{n_t}, \overbrace{0^{2n}}^{2n}, \overbrace{\vec{\eta}_i}^{2n}, \overbrace{0^n}^{n})_{\mathbb{B}_1},$$

With the processing device, the cipher element generation part 232 also generates an element $c_3$ of the ciphertext $ct_S$, as indicated in Formula 172.

$$c_3 := g_T^\zeta m \qquad \text{[Formula 172]}$$

(S607: Data Transmission Step)

With the communication device and via the network, for example, the data transmission part 240 transmits the ciphertext $ct_S$ having, as elements, the access structure S inputted in (S602) and $c_0, c_1, \ldots, c_L$, and $c_3$ generated in (S606) to the decryption device 300. As a matter of course, the ciphertext $ct_S$ may be transmitted to the decryption device 300 by another method.

In brief, in (S601) through (S606), the encryption device 200 generates the ciphertext $ct_S$ by executing the Enc algorithm indicated in Formula 173. In (S607), the encryption device 200 transmits the generated ciphertext $ct_S$ to the decryption device 300.

$$Enc(pk, m, \mathbb{S} = (M, \rho)): \qquad \text{[Formula 173]}$$
$$\vec{f} \xleftarrow{U} \mathbb{F}_q^r,$$
$$\vec{s}^T := (s_1, \ldots, s_L)^T := M \cdot \vec{f}^T, s_0 := \vec{1} \cdot \vec{f}^T,$$
$$\eta_0, \zeta \xleftarrow{U} \mathbb{F}_q,$$
$$c_0 := (-s_0, 0, \zeta, \eta_0, 0)_{\mathbb{B}_0},$$
$$\text{for } i = 1, \ldots, L, \vec{v}_i := (v_i^{n-1}, \ldots, v_i, 1),$$
$$\vec{\eta}_i \xleftarrow{U} \mathbb{F}_q^{2n}$$
$$\text{if } \rho(i) = v_i \in \mathbb{F}_q^\times, \theta_i \xleftarrow{U} \mathbb{F}_q$$
$$c_i := (\overbrace{s_i \vec{e}_{t,1} + \theta_i \vec{v}_i}^{n}, \overbrace{0^{2n}}^{2n}, \overbrace{\vec{\eta}_i}^{2n}, \overbrace{0^n}^{n})_{\mathbb{B}_1},$$
$$\text{if } \rho(i) = \neg v_i,$$
$$c_i := (\overbrace{s_i \vec{v}_i}^{n_t}, \overbrace{0^{2n}}^{2n}, \overbrace{\vec{\eta}_i}^{2n}, \overbrace{0^n}^{n})_{\mathbb{B}_1},$$
$$c_3 := g_T^\zeta m,$$
$$ct_\mathbb{S} := (\mathbb{S}, c_0, c_1, \ldots, c_L, c_3),$$
$$\text{return } ct_\mathbb{S}.$$

The function and operation of the decryption device 300 will be described.

With reference to FIG. 12, the process of the Dec algorithm will be described.

(S401: Decryption Key Receiving Step)

With the communication device and via the network, for example, the decryption key receiving part 310 receives the decryption key $sk_\Gamma$ transmitted by the key generation device 100. The decryption key receiving part 310 also receives the public parameter pk generated by the key generation device 100.

(S402: Data Receiving Step)

With the communication device and via the network, for example, the data receiving part 320 receives the ciphertext $ct_S$ transmitted by the encryption device 200.

(S403: Span Program Computation Step)

With the processing device, the span program computation part 330 determines whether or not the access structure S included in the ciphertext $ct_S$ received in (S402) accepts $\Gamma$ included in the decryption key $sk_\Gamma$ received in (S401).

If the access structure S accepts $\Gamma$ (accept in S403), the span program computation part 330 advances the process to (S404). If the access structure S rejects $\Gamma$ (reject in S403), the span program computation part 330 determines that the ciphertext $ct_\Gamma$ cannot be decrypted with the decryption key $sk_S$, and ends the process.

The process of (S404) is the same as that in Embodiment 1.

(S405: Decryption Element Generation Step)

With the processing device, the decryption part 350 generates cipher elements $D_1^*, \ldots, D_{6n}^*$, and $E_j^*$, as indicated in Formula 174.

$$(D_1^*, \ldots, D_{6n}^*) := \sum_{i \in I \wedge \rho(i) = v_i} \alpha_i c_i + \sum_{i \in I \wedge \rho(i) = \neg v_i} \frac{\alpha_i}{\vec{v}_i \cdot \vec{y}} c_i, \qquad \text{[Formula 174]}$$

$$E_j^* := \sum_{L=1}^{n-1} y_{L-1} D_{(j-1)n+L}^* \text{ for } j = 1, \ldots, 6$$

(S406: Pairing Operation Step)

With the processing device, the decryption part 350 computes Formula 175, and thereby generates a session key $K=g_T^\xi$.

$$K:=e(c_0,k_0^*)\cdot\Pi_{j=1}^6(e(E_j^*,K_{1,j})\cdot e(D_{jn}^*,K_{2,j})) \qquad \text{[Formula 175]}$$

The process of (S407) is the same as that in Embodiment 1.

In brief, in (S401) through (S407), the decryption device 300 generates the message m'(=m) by executing the Dec algorithm indicated in Formula 176.

$$Dec(pk, sk_\Gamma := (\Gamma, k_0^*, \{K_{1,j}, K_{2,j}\}_{j=1,\ldots,6}), \qquad \text{[Formula 176]}$$
$$ct_\mathbb{S} := (\mathbb{S}, c_0, c_1, \ldots, c_L, c_3)):$$

If $\mathbb{S}$ accepts $\Gamma$, then compute $I$ and $\{\alpha_i\}_{i\in I}$ such that, $$\vec{1} = \sum_{i\in I} \alpha_i M_i$$

where $M_i$ is the $i$-th row of $M$, and $$I \subseteq \{i \in \{1,\ldots,L\} \mid [\rho(i) = v_i \wedge v_i \in \Gamma] \vee [\rho(i) = \neg v_i \wedge v_i \notin \Gamma]\}$$

$$\vec{y} := (y_1,\ldots,y_n) \text{ such that } \sum_{j=0}^{n-1} y_{n-j}z^j = z^{n-1-n'}\cdot \prod_{j=1}^{n'}(z-x_j),$$

$$(D_1^*,\ldots,D_{6n}^*) := \sum_{i\in I\wedge\rho(i)=v_i} \alpha_i c_i + \sum_{i\in I\wedge\rho(i)=\neg v_i} \frac{\alpha_i}{\vec{v_i}\cdot\vec{y}} c_i,$$

$$E_j^* := \sum_{L=1}^{n-1} y_{L-1}D_{(j-1)n+L}^* \text{ for } j = 1,\ldots,6$$

$$K := e(c_0, k_0^*)\cdot \prod_{j=1}^6 (e(E_j^*, K_{1,j})\cdot e(D_{jn}^*, K_{2,j})),$$

return $m' := c_3/K$.

In the CP-ABE scheme described in Embodiment 2, the decryption key $sk_\Gamma$ consists of a total of 17 elements of G, which are five elements in the element $k_0$, and 12 elements in the element $C_{1,j}$ and the element $C_{2,j}$ for each integer $j=1,\ldots,6$. That is, the decryption key $sk_\Gamma$ is constant-size in n.

In the CP-ABE scheme described in Embodiment 2, the decryption process (Dec algorithm) executes only a total of 17 pairing operations, similarly as in the KP-ABE scheme described in Embodiment 1. That is, the number of pairing operations required for the decryption process is small.

Embodiment 3

In Embodiment 3, an FE scheme to which the ABE scheme described in Embodiment 1 or 2 is applied will be described.

In Embodiment 3, description will be omitted for what is the same as in Embodiment 1 or 2, and differences from Embodiment 1 or 2 will be described.

A KP-FE scheme to which the KP-ABE scheme described in Embodiment 1 is applied will be described herein.

In the KP-ABE scheme described in Embodiment 1, the elements $(C_{1,j}, C_{2,j})$ of the ciphertext are associated with the elements $\{k^*_{i}\}_{i=1,\ldots,L}$ of the decryption key. In the KP-FE scheme, elements $(C_{1,j,t}, C_{2,j,t})$ of a ciphertext and elements $\{k^*_{i,t}\}_{i=1,\ldots,L}$ of a decryption key are generated for each category t. Then, the elements $(C_{1,j,t}, C_{2,j,t})$ of the ciphertext are associated with the elements $\{k^*_{i,t}\}_{i=1,\ldots,L}$ of the decryption key.

The configurations of a key generation device 100, an encryption device 200, and a decryption device 300 are the same as the configurations of the key generation device 100, the encryption device 200, and the decryption device 300 according to Embodiment 1 illustrated in FIG. 6 to FIG. 8, respectively.

The process of each algorithm has the same flow as that of the process of each algorithm according to Embodiment 1 illustrated in FIG. 9 to FIG. 12.

With reference to FIG. 9, the process of the Setup algorithm will be described.

(S101: Space Generation Step)

The space generation part 111 generates a parameter $param_G := (q, G, G_T, g, e)$, similarly as in Embodiment 1.

Further, the space generation part 111 sets $N_0 := 5$ and $N_{1,t} := 6n_t$ for each integer $t=1,\ldots,d$, where d is the value representing the number of attribute categories and an integer of 1 or greater, and $n_t$ is an integer of 1 or greater. Then, with the processing device, the space generation part 111 executes $G_{dpvs}$ taking as input a security parameter $1^\lambda$, $N_0$, and the parameter $param_G$ of symmetric bilinear pairing groups, and thereby generates a parameter $param_{V_0} := (q, V_0, G_T, A, e)$ of dual pairing vector spaces. With the processing device, the space generation part 111 also executes $G_{dpvs}$ taking as input the security parameter $1^\lambda$, $N_{1,t}$, and the parameter $param_G$ of symmetric bilinear pairing groups for each integer $t=1,\ldots,d$, and thereby generates a parameter $param_{V_{1,t}} := (q, V_{1,t}, G_T, A, e)$ of dual pairing vector spaces.

(S102: Linear Transformation Generation Step)

With the processing device, the matrix generation part 112 generates a linear transformation $X_0$ and a linear transformation $\{X_{1,t}\}_{t=1,\ldots,d}$.

The linear transformation $X_0$ is the same as that in Embodiment 1. The linear transformation $\{X_{1,t}\}_{t=1,\ldots,d}$ is generated as indicated in Formula 177.

$$X_{1,t} \xleftarrow{U} \mathcal{L}(6, n_t, \mathbb{F}_q) \text{ for } t = 1,\ldots,d \qquad \text{[Formula 177]}$$

In the following, $\{\mu_{i,j,t}, \mu'_{i,j,L,t}\}_{i,j=1,\ldots,6;L=1,\ldots,n}$ denotes non-zero elements in the linear transformation $X_{1,t}$.

(S103: Basis B Generation Step)

With the processing device, the basis generation part 113 generates a basis $B_0$, a variable $B_{i,j,t}$, and a variable $B'_{i,j,L,t}$ as indicated in Formula 178.

$$b_{0,i} := (\chi_{0,i,1},\ldots,\chi_{0,i,5})_\mathbb{A} = \sum_{j=1}^5 \chi_{0,i,j}a_j \qquad \text{[Formula 178]}$$

for $i = 1,\ldots,5$, $\mathbb{B}_0 := (b_{0,1},\ldots,b_{0,5}),$ $B_{i,j,t} := \mu_{i,j,t}g, \; B'_{i,j,L,t} := \mu'_{i,j,L,t}g$ for $i, j = 1,\ldots,6; L = 1,\ldots,n_t; t = 1,\ldots,d$ With the processing device, the basis generation part 113 generates a basis $\mathbb{B}^*_0$ and a basis $\mathbb{B}^*_{1,t}$, as indicated in Formula 179.

$$(\theta_{0,i,j})_{i,j=1,\ldots,5} := \psi \cdot (X_0^T)^{-1},$$

$$b_{0,i}^* := (\theta_{0,i,1}, \ldots, \theta_{0,i,5})_{\mathbb{A}} = \Sigma_{j=1}^5 \theta_{0,i,j} a_j$$
for $i=1,\ldots,5$, $$\mathbb{B}_0^* := (b_{0,1}^*, \ldots, b_{0,5}^*), \quad [\text{Formula 179}]$$

for $t=1,\ldots,d$, $$(\theta_{t,i,j})_{i,j=1,\ldots,N_{1,t}} := \psi \cdot (X_{1,t}^T)^{-1},$$

$$b_{1,i,t}^* := (\theta_{1,i,1,t}, \ldots, \theta_{1,i,N_{1,t},t})_{\mathbb{A}} = \Sigma_{j=1}^{N_{1,t}} \theta_{1,i,j,t} a_j \text{ for } i=1,\ldots,N_{1,t},$$

$$\mathbb{B}_{1,t}^* := (b_{1,1,t}^*, \ldots, b_{1,N_{1,t},t}^*)$$

(S104: Basis B^ Generation Step)

With the processing device, the key generation part 114 generates a basis $\hat{\mathbb{B}}_0$, a basis $\hat{\mathbb{B}}_{1,t}$, a basis $\hat{\mathbb{B}}^*_0$, and a basis $\hat{\mathbb{B}}^*_{1,t}$, as indicated in Formula 180.

$$\hat{\mathbb{B}}_0 := (b_{0,1}, b_{0,3}, b_{0,5}),$$

for $t=1,\ldots,d$, $$\hat{\mathbb{B}}_{1,t} := (b_{1,1,t} \ldots b_{1,n_t,t}, b_{1,5n_t+1,t}, \ldots, b_{1,6n_t,t}) = \{B_{i,j,t}, B'_{i,j,L,t}\}_{i=1,6;j=1,\ldots,L=1,\ldots,n_t;t=1,\ldots,d},$$

$$\hat{\mathbb{B}}^*_0 := (b_{0,1}^*, b_{0,3}^*, b_{0,4}^*),$$

for $t=1,\ldots,d$, $$\hat{\mathbb{B}}^*_{1,t} := (b_{1,1,t}^*, \ldots, b_{1,n_t,t}^*, b_{1,3n_t+1,t}^*, \ldots, b_{1,5n_t,t}^*) \quad [\text{Formula 180}]$$

(S105: Master Key Generation Step)

With the processing device, the key generation part 114 generates a public parameter $pk := (1^\lambda, param_n, \hat{\mathbb{B}}_0, \{\hat{\mathbb{B}}_{1,t}\}_{t=1,\ldots,d})$ and a master secret key $sk := (\hat{\mathbb{B}}^*_0, \{\hat{\mathbb{B}}^*_{1,t}\}_{t=1,\ldots,d})$. Then, the key generation part 114 stores the public parameter pk and the master secret key sk in the master key storage part 120.

Note $param_n := (param_{V_0}, \{param_{V_1,t}\}_{t=1,\ldots,d}, g_T)$.

In brief, in (S101) through (S105), the key generation device 100 generates the public parameter pk and the master secret key sk by executing the Setup algorithm indicated in Formula 182, the Setup algorithm using an algorithm $\mathcal{G}^{FE(1)}_{ob}$ indicated in Formula 181.

$$\mathcal{G}^{FE(1)}_{ob}(1^\lambda, 6, n_t): \quad [\text{Formula 181}]$$

$param_\mathbb{G} := (q, \mathbb{G}, \mathbb{G}_T, g, e) \xleftarrow{R} \mathcal{G}_{bpg}(1^\lambda),$ $N_0 := 5, N_{1,t} := 6n_t, \text{ for } t=1,\ldots,d,$ $param_{V_0} := (q, \mathbb{V}_t, \mathbb{G}_T, \mathbb{A}, e) := \mathcal{G}_{dpvs}(1^\lambda, N_0, param_\mathbb{G}),$ $param_{V_{1,t}} := (q, \mathbb{V}_t, \mathbb{G}_T, \mathbb{A}, e) :=$ $\mathcal{G}_{dpvs}(1^\lambda, N_{1,t}, param_\mathbb{G}) \text{ for } t=1,\ldots,d,$ $\psi \xleftarrow{U} \mathbb{F}_q^\times, g_T := e(g,g)^\psi, param_n :=$ $\left(param_{V_0}, \{param_{V_{1,t}}\}_{t=1,\ldots,d}, g_T\right),$ $X_0 := (\chi_{0,i,j})_{i,j=1,\ldots,5} \xleftarrow{U} GL(N_0, \mathbb{F}_q),$ $X_{1,t} \xleftarrow{U} \mathcal{L}(6, n_t, \mathbb{F}_q) \text{ for } t=1,\ldots,d,$ hereafter, $\{\mu_{i,j,t}, \mu'_{i,j,L,t}\}_{i,j=1,\ldots,6;L=1,\ldots,n_t;t=1,\ldots,d}$ denotes non-zero entries of $X_{1,t}$, $b_{0,i} := (\chi_{0,i,1}, \ldots, \chi_{0,i,5})_{\mathbb{A}} = \sum_{j=1}^5 \chi_{0,i,j} a_j$ for $i=1,\ldots,5, \mathbb{B}_0 := (b_{0,1}, \ldots, b_{0,5}),$ $B_{i,j,t} := \mu_{i,j,t} g, B'_{i,j,L,t} := \mu'_{i,j,L,t} g$ for $i,j=1,\ldots,6; L=1,\ldots,n_t; t=1,\ldots,d$ $(\vartheta_{0,i,j})_{i,j=1,\ldots,5} := \psi \cdot (X_0^T)^{-1},$ $b_{0,i}^* :=$ $(\vartheta_{0,i,1}, \ldots, \vartheta_{0,i,5})_{\mathbb{A}} = \sum_{j=1}^5 \vartheta_{0,i,j} a_j \text{ for } i=1,\ldots,5,$ $\mathbb{B}_0^* := (b_{0,1}^*, \ldots, b_{0,5}^*),$ for $t=1,\ldots,d$ $(\vartheta_{t,i,j})_{i,j=1,\ldots,N_{1,t}} := \psi \cdot (X_{1,t}^T)^{-1},$ $b_{1,i,t}^* := (\vartheta_{1,i,1,t}, \ldots, \vartheta_{1,i,N_{1,t},t})_{\mathbb{A}} =$ $\sum_{j=1}^{N_{1,t}} \vartheta_{1,i,j,t} a_j \text{ for } i=1,\ldots,N_{1,t},$ $\mathbb{B}_{1,t}^* := (b_{1,1,t}^*, \ldots, b_{1,N_{1,t},t}^*),$ return $\left(param_n, \mathbb{B}_0, \mathbb{B}_0^*,$ $\{B_{i,j,t}, B'_{i,j,L,t}\}_{i,j=1,\ldots,6;L=1,\ldots,n_t;t=1,\ldots,d}, \mathbb{B}_{1,t}^*\right).$ Setup($1^\lambda, n_t$): [Formula 182]

$(param_n, \mathbb{B}_0, \mathbb{B}_0^*,$ $\{B_{i,j,t}, B'_{i,j,L,t}\}_{i,j=1,\ldots,6;L=1,\ldots,n_t;t=1,\ldots,d},$ $\mathbb{B}_{1,t}^*) \xleftarrow{R} \mathcal{G}^{FE(1)}_{ob}(1^\lambda, 6, n_t),$ $\hat{\mathbb{B}}_0 := (b_{0,1}, b_{0,3}, b_{0,5}),$ for $t=1,\ldots,d,$ $\hat{\mathbb{B}}_{1,t} := (b_{1,1,t}, \ldots, b_{1,n_t,t}, b_{1,5n_t+1,t}, \ldots, b_{1,6n_t,t})$ $= \{B_{i,j,t}, B'_{i,j,L,t}\}_{i=1,6;j=1,\ldots,6;L=1,\ldots,n_t;t=1,\ldots,d},$ $\hat{\mathbb{B}}_0^* := (b_{0,1}^*, b_{0,3}^*, b_{0,4}^*),$ for $t=1,\ldots,d,$ $\hat{\mathbb{B}}_{1,t}^* := (b_{1,1,t}^*, \ldots, b_{1,n_t,t}^*, b_{1,3n_t+1,t}^*, \ldots, b_{1,5n_t,t}^*),$ $pk := (1^\lambda, param_n, \hat{\mathbb{B}}_0, \{\hat{\mathbb{B}}_{1,t}\}_{t=1,\ldots,d}),$ $sk := (\hat{\mathbb{B}}_0^*, \{\hat{\mathbb{B}}_{1,t}^*\}_{t=1,\ldots,d}),$ return $pk, sk$.

With reference to FIG. 10, the process of the KeyGen algorithm will be described.

The process of (S201) through (S202) is the same as that in Embodiment 1.

(S203: s Vector Generation Step)

With the processing device, the s vector generation part 142 generates a vector $\vec{s}^T := (s_1, \ldots, s_L)^T$, as indicated in Formula 183.

$$\vec{s}^T := (s_1, \ldots, s_L)^T := M \cdot \vec{f}^T \quad [\text{Formula 183}]$$

With the processing device, the s vector generation part 142 also generates a value $s_0$, as indicated in Formula 184.

$$s_0 := \vec{1} \cdot \vec{f}^T \qquad \text{[Formula 184]}$$

(S204: Random Number Generation Step)
With the processing device, the random number generation part 143 generates random numbers, as indicated in Formula 185.

$$\eta_0 \xleftarrow{U} \mathbb{F}_q, \qquad \text{[Formula 185]}$$

$$\vec{\eta}_i \xleftarrow{U} \mathbb{F}_q^{2n_t} \quad \text{for } i = 1, \ldots, L,$$

$$\theta_i \xleftarrow{U} \mathbb{F}_q \quad \text{for } i = 1, \ldots, L$$

(S205: Key Element Generation Step)
With the processing device, the key element generation part 144 generates an element $k^*_0$ of a decryption key $sk_S$, similarly as in Embodiment 1.

With the processing device, the key element generation part 144 also generates an element $k^*_i$ of the decryption key $sk_S$ for each integer $i=1, \ldots, L$ and an index t included in a set $I_{\vec{vi}}$, as indicated in Formula 186.

$$\text{for } i = 1, \ldots, L, \qquad \text{[Formula 186]}$$

$$\text{if } \rho(i) = (t, v_i), \vec{v}_i := (v_i^{n_t-1}, \ldots, v_i, 1),$$

$$k^*_i := (\overbrace{s_i \vec{e}_{1,t} + \theta_i \vec{v}_i}^{n_t}, \overbrace{0^{2n_t}}^{2n_t}, \overbrace{\vec{\eta}_i}^{2n_t}, \overbrace{0^{n_t}}^{n_t})_{\mathbb{B}^*_{1,t}},$$

$$\text{if } \rho(i) = \neg(t, v_i), \vec{v}_i := (v_i^{n_t-1}, \ldots, v_i, 1),$$

$$k^*_i := (\overbrace{s_i \vec{v}_i}^{n_t}, \overbrace{0^{2n_t}}^{2n_t}, \overbrace{\vec{\eta}_i}^{2n_t}, \overbrace{0^{n_t}}^{n_t})_{\mathbb{B}^*_{1,t}}$$

The process of (S206) is the same as that in Embodiment 1.

In brief, in (S201) through (S205), the key generation device 100 generates the decryption key $sk_S$ by executing the KeyGen algorithm indicated in Formula 187. In (S206), the key generation device 100 transmits the generated decryption key $sk_S$ to the decryption device 300.

$$KeyGen(pk, sk, \mathbb{S} = (M, \rho)): \qquad \text{[Formula 187]}$$

$$\vec{f} \xleftarrow{U} \mathbb{F}_q^r,$$

$$\vec{s}^T := (s_1, \ldots, s_L)^T := M \cdot \vec{f}^T, s_0 := \vec{1} \cdot \vec{f}^T,$$

$$\eta_0 \xleftarrow{U} \mathbb{F}_q,$$

$$k^*_0 := (-s_0, 0, 1, \eta_0, 0)_{\mathbb{B}^*_0},$$

$$\text{for } i = 1, \ldots, L, t = 1, \ldots, d,$$

$$\text{if } \rho(i) = (t, v_i),$$

$$\vec{v}_i := (v_i^{n_t-1}, \ldots, v_i, 1), \theta_i \xleftarrow{U} \mathbb{F}_q, \vec{\eta}_i \xleftarrow{U} \mathbb{F}_q^{2n_t},$$

$$k^*_i := (\overbrace{s_i \vec{e}_{1,t} + \theta_i \vec{v}_i}^{n_t}, \overbrace{0^{2n_t}}^{2n_t}, \overbrace{\vec{\eta}_i}^{2n_t}, \overbrace{0^{n_t}}^{n_t})_{\mathbb{B}^*_{1,t}},$$

$$\text{if } \rho(i) = \neg(t, v_i), \vec{v}_i := (v_i^{n_t-1}, \ldots, v_i, 1), \vec{\eta}_i \xleftarrow{U} \mathbb{F}_q^{2n_t},$$

$$k^*_i := (\overbrace{s_i \vec{v}_i}^{n_t}, \overbrace{0^{2n_t}}^{2n_t}, \overbrace{\vec{\eta}_i}^{2n_t}, \overbrace{0^{n_t}}^{n_t})_{\mathbb{B}^*_{1,t}}$$

$$sk_S := (\mathbb{S}, k^*_0, \{k^*_i\}_{i=1,\ldots,L})$$

return $sk_S$.

With reference to FIG. 11, the process of the Enc algorithm will be described.

The process of (S301) is the same as that in Embodiment 1.

(S302: Information Input Step)
With the input device, the information input part 220 takes as input a message m to be transmitted to the decryption device 300. With the input device, the information input part 220 also takes as input an attribute set $\Gamma_t := \{x_{1,t}, \ldots, x_{nt,t}, n_t' \leq n_t - 1, t=1, \ldots, d\}$.

(S303: Random Number Generation Step)
With the processing device, the random number generation part 231 generates random numbers, as indicated in Formula 188.

$$\omega, \varphi_0, \zeta \xleftarrow{U} \mathbb{F}_q, \qquad \text{[Formula 188]}$$

$$\varphi_{1,t} \xleftarrow{U} \mathbb{F}_q \quad t = 1, \ldots, d$$

(S304: Cipher Element Generation Step)
With the processing device, the cipher element generation part 232 generates an element $c_0$ and an element $c_3$ of a ciphertext $ct_\Gamma$, similarly as in Embodiment 1.

With the processing device, the cipher element generation part 232 also generates elements $C_{1,j,t}$ and $C_{2,j,t}$ of the ciphertext $ct_\Gamma$, as indicated in Formula 189.

for $j=1, \ldots, 6; t=1, \ldots, d$ $$C_{1,j,t} := \omega B_{1,j,t} + \eta_{1,t} B_{6,j,t},$$

$$C_{2,j,t} := \Sigma_{L=1}^{n_t} y_{L,t}(\omega B_{1,j,L,t} + \varphi_1 B_{6,j,L,t}') \qquad \text{[Formula 189]}$$

where $$\vec{y}_t := (y_{1,t}, \ldots, y_{n_t,t}) \text{ such that}$$
$$\Sigma_{j=0}^{n_t-1} y_{n_t-j,t} z^j = z^{n_t-1-jn_t} \cdot \Pi_{j=1}^{n_t'}(z - x_{j,t})$$

that

The process of (S305) is the same as that in Embodiment 1.

In brief, in (S301) through (S304), the encryption device 200 generates the ciphertext $ct_\Gamma$ by executing the Enc algorithm indicated in Formula 190. In (S305), the encryption device 200 transmits the generated ciphertext $ct_\Gamma$ to the decryption device 300.

$$Enc(pk, m, \Gamma_t = \qquad \text{[Formula 190]}$$

$$\{x_{1,t}, \ldots, x_{n_t',t}, n_t' \leq n_t - 1, t = 1, \ldots, d\}):$$

$$\omega, \varphi_0, \zeta \xleftarrow{U} \mathbb{F}_q, \varphi_{1,t} \xleftarrow{U} \mathbb{F}_q \quad t = 1, \ldots, d,$$

$$\vec{y}_t := (y_{1,t}, \ldots, y_{n_t,t}) \text{ such that } \sum_{j=0}^{n_t-1} y_{n_t-j,t} z^j =$$

$$z^{n_t-1-n_t'} \cdot \prod_{j=1}^{n_t'} (z - x_{j,t}),$$

$$c_0 := (\omega, 0, \zeta, 0, \varphi_0)_{\mathbb{B}_0},$$

-continued for $j = 1, \ldots, 6; t = 1, \ldots, d$ $C_{1,j,t} := \omega B_{1,j,t} + \eta_{1,t} B_{6,j,t}$, $C_{2,j,t} := \sum_{L=1}^{n_t} y_{L,t}(\omega B'_{1,j,L,t} + \varphi_1 B'_{6,j,L,t})$, $c_3 := g_T^\zeta m$, $ct_\Gamma := (\Gamma_t, c_0, \{C_{1,j,t}, C_{2,j,t}\}_{j=1,\ldots,6; t=1,\ldots,d}, c_3)$, return $ct_\Gamma$.

With reference to FIG. 12, the process of the Dec algorithm will be described.

The process of (S401) through (S404) is the same as that in Embodiment 1.

(S405: Decryption Element Generation Step)

With the processing device, the decryption part 350 generates decryption elements $D^*_{1,t}, \ldots, D^*_{6n_t,t}$ and $E^*_{j,t}$ as indicated in Formula 191.

[Formula 191]

$$(D^*_{1,t}, \ldots, D^*_{6n_t,t}) := \sum_{i \in I_t \wedge \rho(i)=(t,v_i)} \alpha_i k^*_i + \sum_{i \in I_t \wedge \rho(i)=\neg(t,v_i)} \frac{\alpha_i}{\vec{v}_i \cdot \vec{y}_t} k^*_i,$$

$E^*_{j,t} := \sum_{L=1}^{n_t-1} y_{L-1,t} D^*_{(j-1)n_t+L,t}$ for $j = 1, \ldots, 6; t = 1, \ldots, d$ (S406: Pairing Operation Step)

With the processing device, the decryption part 350 computes Formula 192, and thereby generates a session key $K = g_T^\zeta$.

$K := e(c_0, k_0^*) \cdot \prod_{t=1}^d \prod_{j=1}^6 (e(C_{1,j,t}, E^*_{j,t}) \cdot e(C_{2,j,t}, D^*_{jn_t,t}))$ [Formula 192]

The process of (S407) is the same as that in Embodiment 1.

In brief, in (S401) through (S407), the decryption device 300 generates the message m' (=m) by executing the Dec algorithm indicated in Formula 193.

$Dec(pk, sk_\mathbb{S} := (\mathbb{S}, k_0^*, k_1^*, \ldots, k_L^*),$ [Formula 193]

$ct_\Gamma := (\Gamma_t, c_0, \{C_{1,j,t}, C_{2,j,t}\}_{j=1,\ldots,6; t=1,\ldots,d}, c_3))$:

If $\mathbb{S}$ accepts $\Gamma$, then compute $I$ and $\{\alpha_i\}_{i \in I}$ such that, $\vec{1} = \sum_{i \in I} \alpha_i M_i$ where $M_i$ is the $i$-th row of $M$, and $I \subseteq \{i \in \{1, \ldots, L\} \mid [\rho(i) = (t, v_i) \wedge v_i \in \Gamma_t] \vee [\rho(i) = \neg(t, v_i) \wedge v_i \notin \Gamma_t]\}$, $I_t \subseteq \{i \in I \mid \rho(i) = (t, v_i) \vee \rho(i) = \neg(t, v_i)\}$, $\vec{y}_t := (y_{1,t}, \ldots, y_{n_t,t})$ such that $\sum_{j=0}^{n_t-1} y_{n_t-j,t} z^j = z^{n_t-1-n'_t} \cdot \prod_{j=1}^{n'_t}(z - x_{j,t})$, $(D^*_{1,t}, \ldots, D^*_{6n_t,t}) := \sum_{i \in I_t \wedge \rho(i)=(t,v_i)} \alpha_i k^*_i +$ $\sum_{i \in I_t \wedge \rho(i)=\neg(t,v_i)} \frac{\alpha_i}{\vec{v}_i \cdot \vec{y}_t} k^*_i,$ -continued $E^*_{j,t} := \sum_{L=1}^{n_t-1} y_{L-1,t} D^*_{(j-1)n_t+L,t}$ for $j = 1, \ldots, 6; t = 1, \ldots, d$, $K := e(c_0, k_0^*) \cdot$ $\prod_{t=1}^d \prod_{j=1}^6 (e(C_{1,j,t}, E^*_{j,t}) \cdot e(C_{2,j,t}, D^*_{jn_t,t}))$, return $m' := c_3 / K$.

The KP-FE scheme to which the KP-ABE scheme described in Embodiment 1 is applied has been described herein. A CP-FE scheme to which the CP-ABE scheme described in Embodiment 2 is applied can also be constructed in a similar manner. Each algorithm of the CP-FE scheme to which the CP-ABE scheme described in Embodiment 2 is applied is as indicated in Formula 194 through Formula 198.

$\mathcal{G}^{FE(2)}_{ob}(1^\lambda, 6, n_t):$ [Formula 194]

$(param_n, \mathbb{D}_0, \mathbb{D}^*_0,$ $\{D_{i,j,t}, D'_{i,j,L,t}\}_{i,j=1,\ldots,6; L=1,\ldots,n_t; t=1,\ldots,d},$ $\mathbb{D}^*_{1,t}) \xleftarrow{R} \mathcal{G}^{(1)}_{ob}(1^\lambda, 6, n_t),$ $\mathbb{B}_0 := \mathbb{D}^*_0, \mathbb{B}^*_0 := \mathbb{D}_0, \mathbb{B}_{1,t} := \mathbb{D}^*_{1,t},$ $B^*_{i,j,t} := D_{i,j,t}, B'^*_{i,j,L,t} = D'_{i,j,L,t}$ for $i, j = 1, \ldots 6; L = 1, \ldots, n_t,$ return $(param_n, \mathbb{B}_0, \mathbb{B}^*_0,$ $\{\mathbb{B}_{1,t}, \{B^*_{i,j,t}, B'^*_{i,j,L,t}\}_{i,j=1,\ldots,6; L=1,\ldots,n_t}\}_{t=1,\ldots,d}).$ Setup$(1^\lambda, n):$ [Formula 195]

$(param_n, \mathbb{B}_0, \mathbb{B}^*_0,$ $\{B_{1,t}, \{B'_{i,j,t}, B'^*_{i,j,L,t}\}_{i,j=1,\ldots,6; L=1,\ldots,n_t}\}_{t=1,\ldots,d}) \xleftarrow{R}$ $\mathcal{G}^{(2)}_{ob}(1^\lambda, 6, n_t),$ $\hat{\mathbb{B}}_0 := (b_{0,1}, b_{0,3}, b_{0,4}),$ $\hat{\mathbb{B}}_{1,t} := (b_{1,1,t}, \ldots, b_{1,n_t,t}, b_{1,3n_t+1,t}, \ldots, b_{1,5n_t,t}),$ $\hat{\mathbb{B}}^*_0 := (b^*_{0,1}, b^*_{0,3}, b^*_{0,5}),$ $\hat{\mathbb{B}}^*_{1,t} := (b^*_{1,1,t}, \ldots, b^*_{1,n_t,t}, b^*_{1,5n_t+1,t}, \ldots, b^*_{1,6n_t,t})$ $= \{B'_{i,j,t}, B'^*_{i,j,L,t}\}_{i=1,6; j=1,\ldots,6; L=1,\ldots,n_t; t=1,\ldots,d},$ $pk := (1^\lambda, param_n, \hat{\mathbb{B}}_0\{\hat{\mathbb{B}}_{1,t}\}_{t=1,\ldots,d}),$ $sk := (\hat{\mathbb{B}}^*_0\{\hat{\mathbb{B}}^*_{1,t}\}_{t=1,\ldots,d}),$ return $pk, sk.$ KeyGen$(pk, sk, \Gamma_t = x_{1,t}, \ldots, x_{n'_t,t},$ [Formula 196]

$n'_t \leq n_t - 1, t = 1, \ldots, d):$ $\omega, \varphi_0 \xleftarrow{U} \mathbb{F}_q, \varphi_{1,t} \xleftarrow{U} \mathbb{F}_q \quad t = 1, \ldots, d,$ $\vec{y}_t := (y_{1,t}, \ldots, y_{n_t,t})$ such that $\sum_{j=0}^{n_t-1} y_{n_t-j,t} z^j =$ $z^{n_t-1-n'_t} \cdot \prod_{j=1}^{n'_t}(z - x_{j,t}),$ $k_0^* := (\omega, 0, 1, 0, \varphi_0)_{\mathbb{B}^*_0},$ for $j = 1, \ldots, 6, \quad t = 1, \ldots, d,$ $K_{1,j,t} := \omega B_{1,j,t} + \varphi_{1,t} B_{6,j,t},$ $K_{2,j,t} := \sum_{L=1}^{n_t} y_{L,t}(\omega B'_{1,j,L,t} + \varphi_{1,t} B'_{6,j,L,t}),$ $sk_\Gamma := (\Gamma_t, k_0^*, \{K_{1,j,t}, K_{2,j,t}\}_{j=1,\ldots,6; t=1,\ldots,d}),$ return $sk_\Gamma.$ -continued $Enc(pk, m, \mathbb{S} = (M, \rho))$: [Formula 197]

$\vec{f} \xleftarrow{U} \mathbb{F}_q^r$, $\vec{s}^T := (s_1, \ldots, s_L)^T := M \cdot \vec{f}^T, s_0 := \vec{1} \cdot \vec{f}^T$, $\eta_0, \zeta \xleftarrow{U} \mathbb{F}_q$, $c_0 := (-s_0, 0, \zeta, \eta_0, 0)_{\mathbb{B}_0}$, for $i = 1, \ldots, L$, if $\rho(i) = (t, v_i), \vec{v}_i := (v_i^{n_t-1}, \ldots, v_i, 1)$, $\theta_i \xleftarrow{U} \mathbb{F}_q, \vec{\eta}_i \xleftarrow{U} \mathbb{F}_q^{2n_t}$, $c_i := (\overbrace{s_i \vec{e}_{1,t} + \theta_i \vec{v}_i}^{n_t}, \overbrace{0^{2n_t}}^{2n_t}, \overbrace{\vec{\eta}_i}^{2n_t}, \overbrace{0^{n_t}}^{n_t})_{\mathbb{B}_{1,t}}$, if $\rho(i) = \neg (t, v_i), \vec{v}_i := (v_i^{n_t-1}, \ldots, v_i, 1), \vec{\eta}_i \xleftarrow{U} \mathbb{F}_q^{2n_t}$, $c_i := (\overbrace{s_i \vec{v}_i}^{n_t}, \overbrace{0^{2n_t}}^{2n_t}, \overbrace{\vec{\eta}_i}^{2n_t}, \overbrace{0^{n_t}}^{n_t})_{\mathbb{B}_{1,t}}$, $c_3 := g_T^{\zeta} m$, $ct_{\mathbb{S}} := (\mathbb{S}, c_0, \{c_i\}_{i=1,\ldots,L}, c_3)$, return $ct_{\mathbb{S}}$.

$Dec(pk, sk_{\Gamma} :=$ [Formula 198]

$(\Gamma, k_0^*, \{K_{1,j,t}, K_{2,j,t}\}_{j=1,\ldots,6; t=1,\ldots,d})$, $ct_{\mathbb{S}} := (\mathbb{S}, c_0, \{c_i\}_{i=1,\ldots,L}, c_3))$:

If $\mathbb{S}$ accepts $\Gamma$, then compute $I$ and $\{\alpha_i\}_{i \in I}$ such that, $\vec{1} = \sum_{i \in I} \alpha_i M_i$ where $M_i$ is the $i$-th row of $M$, and $I \subseteq \{i \in \{1, \ldots, L\} \mid [\rho(i) = (t, v_i) \wedge v_i \in \Gamma_t] \vee [\rho(i) =$
$\neg (t, v_i) \wedge v_i \notin \Gamma_t]\}$, $I_t \subseteq \{i \in I \mid \rho(i) = (t, v_i) \vee \rho(i) = \neg (t, v_i)\}$, $\vec{y}_t := (y_{1,t}, \ldots, y_{n_t,t})$ such that $\sum_{j=0}^{n_t-1} y_{n_t-j,t} z^j =$ $z^{n_t-1-n_t'} \cdot \prod_{j=1}^{n_t'} (z - x_{j,t})$, $(D_{1,t}^*, \ldots, D_{6n_t,t}^*) := \sum_{i \in I_t \wedge \rho(i) = (t, v_i)} \alpha_i c_i +$ $\sum_{i \in I_t \wedge \rho(i) = \neg (t, v_i)} \frac{\alpha_i}{\vec{v}_i \cdot \vec{y}_t} c_i$, $E_{j,t}^* := \sum_{L=1}^{n_t-1} y_{L-1,t} D_{(j-1)n_t+L,t}^*$ for $j = 1, \ldots, 6; t = 1, \ldots, d$, $K := e(c_0, k_0^*) \cdot$ $\prod_{t=1}^{d} \prod_{j=1}^{6} (e(E_{j,t}^*, K_{1,j,t}) \cdot e(D_{jn_t,t}^*, K_{2,j,t}))$, return $m' := c_3 / K$.

As described above, it is possible to construct the FE scheme by applying the ABE scheme according to Embodiment 1 or 2.

Embodiment 4

In Embodiment 4, an attribute-based signature (ABS) scheme to which the CP-ABE scheme described in Embodiment 2 is applied will be described.

In Embodiment 4, description will be omitted for what is the same as in Embodiment 2, and differences from Embodiment 2 will be described.

First, a basic structure of the signature scheme according to Embodiment 4 will be described.

Second, a configuration of a cryptographic system 10 that implements the signature scheme according to Embodiment 4 will be described.

Third, the signature scheme according to Embodiment 4 will be described in detail.

<1. Basic Structure of Cryptographic Scheme>

The structure of the ABS scheme will be briefly described. The ABS scheme includes four algorithms: Setup, KeyGen, Sig, and Ver.

(Setup)

A Setup algorithm is a probabilistic algorithm that takes as input a security parameter $\lambda$ and an upper limit n for the number of attributes for a ciphertext, and outputs a public parameter pk and a master key sk.

(KeyGen)

A KeyGen algorithm is a probabilistic algorithm that takes as input the public parameter pk, the master key sk, and an attribute set $\Gamma := \{x_j\}_{1 \leq j \leq n'}$, and outputs a signature key $sk_{\Gamma}$.

(Sig)

A Sig algorithm is a probabilistic algorithm that takes as input the public parameter pk, a message m, an access structure $S := (M, \rho)$, and the signature key $sk_{\Gamma}$, and outputs a signature $\sigma$.

(Ver)

A Ver algorithm is an algorithm that takes as input the public parameter pk, the message m, the access structure $S := (M, \rho)$, and the signature $\sigma$, and outputs a value "1" indicating that the verification of the signature has succeeded, or a value "0" indicating that the verification of the signature has failed.

<2. Configuration of Cryptographic System 10 that Implements ABS Scheme>

Figure 18:
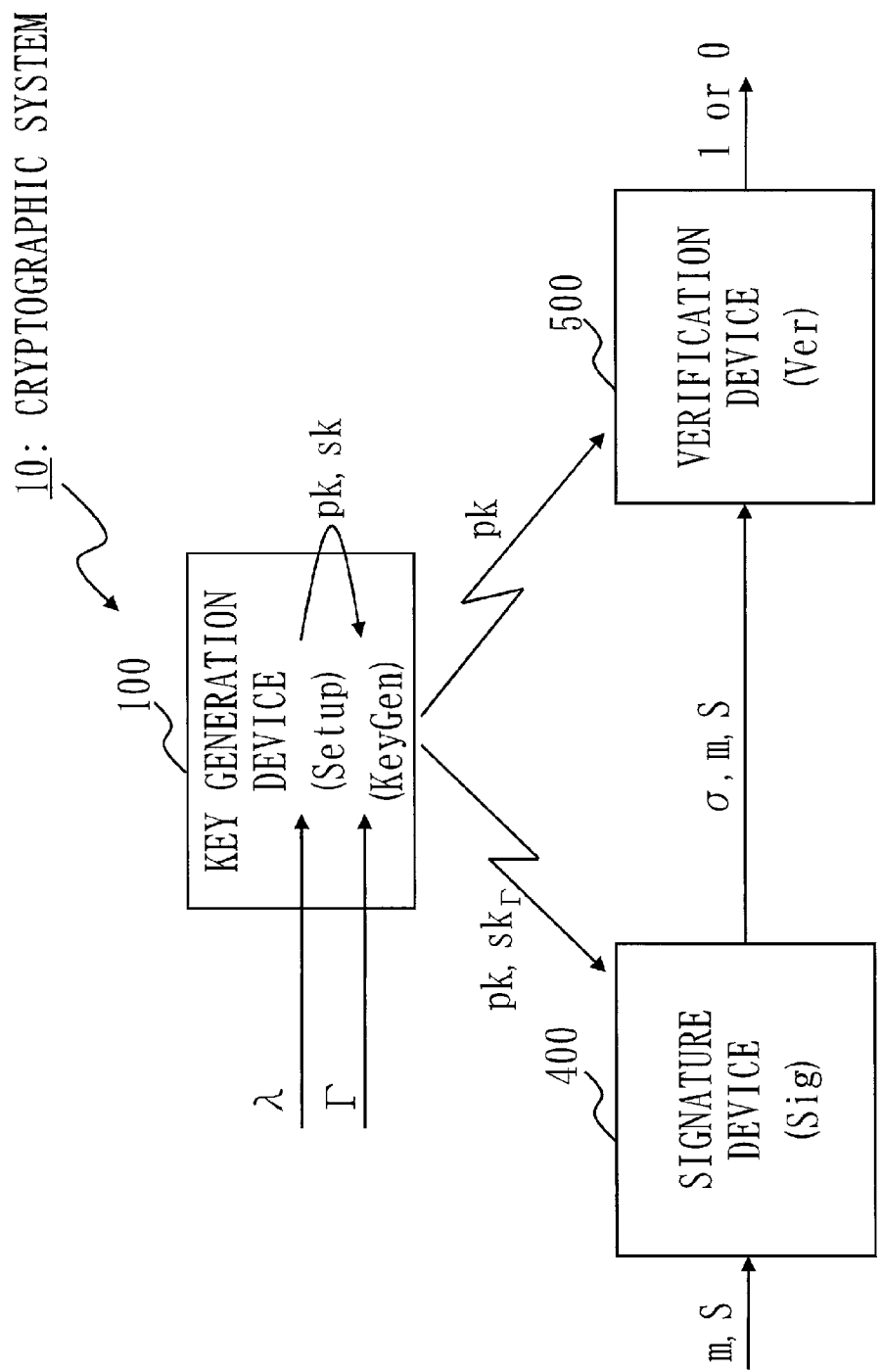
FIG. 18 is a configuration diagram of a cryptographic system 10 that implements an ABS scheme according to Embodiment 4.

FIG. 18 is a configuration diagram of the cryptographic system 10 that implements the ABS scheme according to Embodiment 4.

The cryptographic system 10 includes a key generation device 100, a signature device 400 (an example of the transmission device), and a verification device 500 (an example of the reception device).

The key generation device 100 executes the Setup algorithm taking as input a security parameter $\lambda$ and an upper limit n for the number of attributes for a ciphertext, and thereby generates a public parameter pk and a master key sk. Then, the key generation device 100 publishes the generated public parameter pk. The key generation device 100 also executes the KeyGen algorithm taking as input an attribute set $\Gamma$, and thereby generates a signature key $sk_{\Gamma}$, and transmits the signature key $sk_{\Gamma}$ to the signature device 400 in secrecy.

The signature device 400 executes the Sig algorithm taking as input the public parameter pk, a message m, the access structure S, and the signature key $sk_{\Gamma}$, and thereby generates a signature $\sigma$. The signature device 400 transmits the generated signature $\sigma$, the message m, and the access structure S to the verification device 500.

The verification device 500 executes the Ver algorithm taking as input the public parameter pk, the message m, the access structure S, and the signature $\sigma$, and outputs a value "1" or a value "0".

<3. Signature Scheme>

Figure 19:
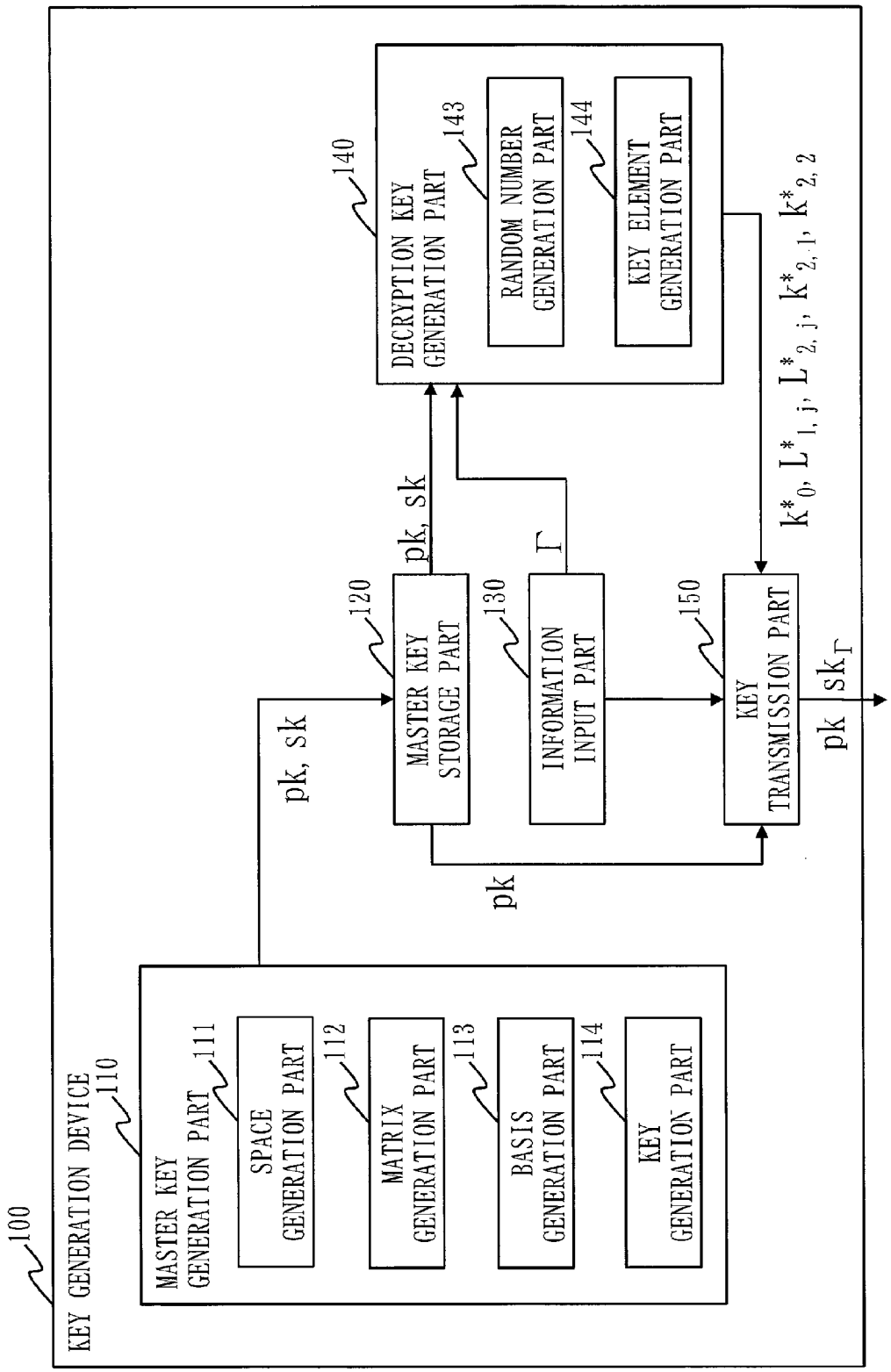
FIG. 19 is a configuration diagram of a key generation device 100 according to Embodiment 4.
Figure 20:
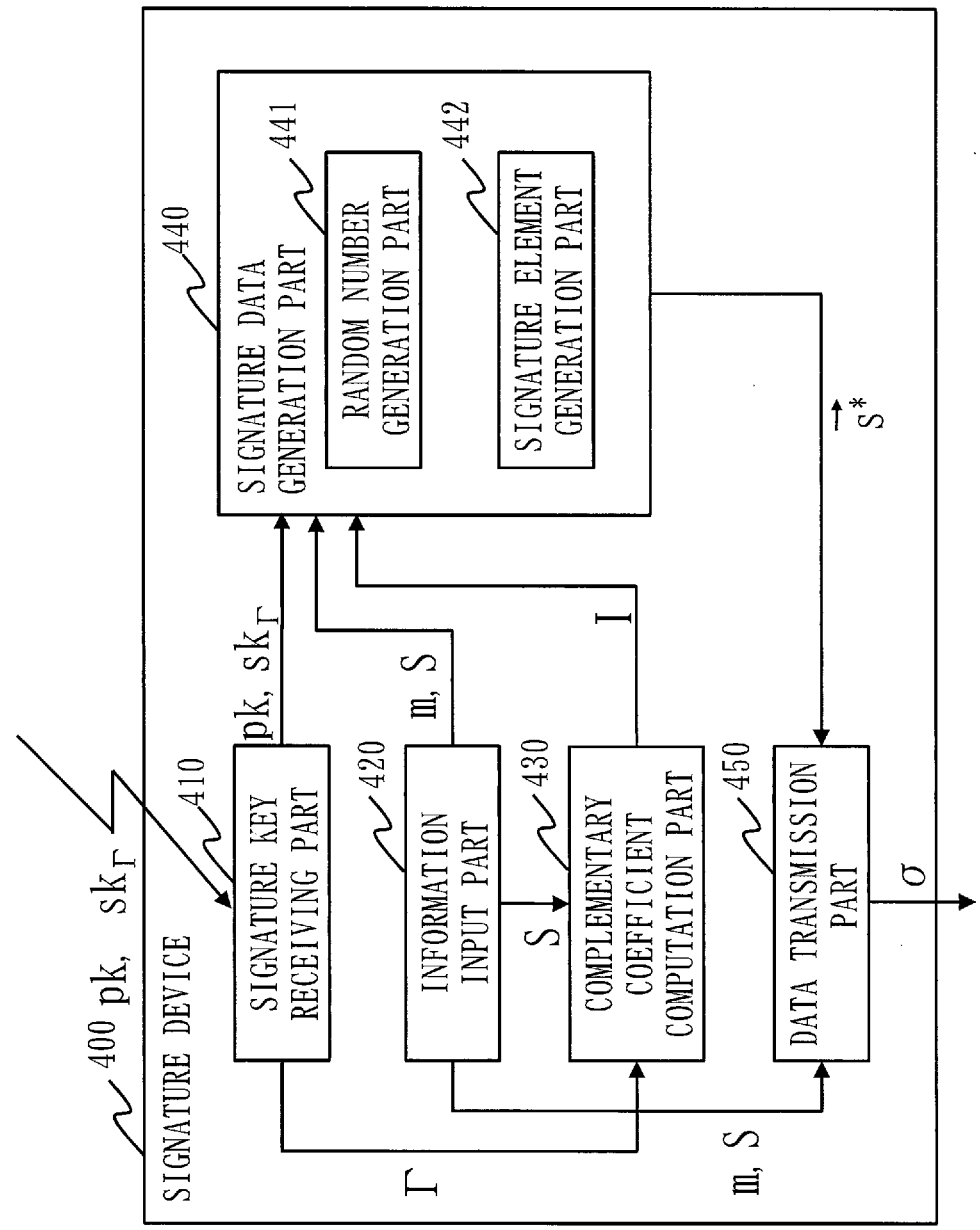
FIG. 20 is a configuration diagram of a signature device 400 according to Embodiment 4.
Figure 21:
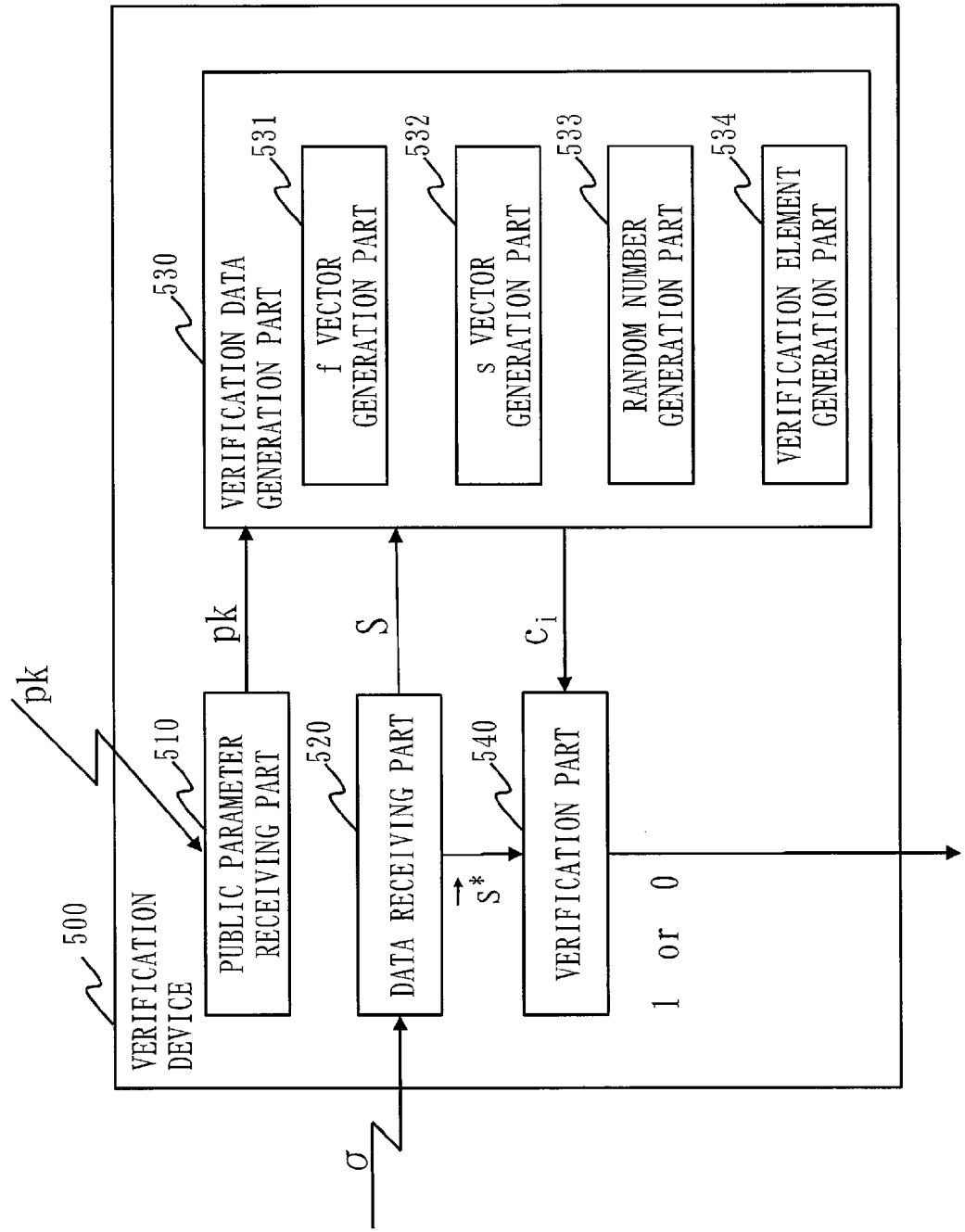
FIG. 21 is a configuration diagram of a verification device 500 according to Embodiment 4.

FIG. 19 is a configuration diagram of the key generation device 100 according to Embodiment 4. FIG. 20 is a configuration diagram of the signature device 400 according to Embodiment 4. FIG. 21 is a configuration diagram of the verification device 500 according to Embodiment 4.

Figure 22:
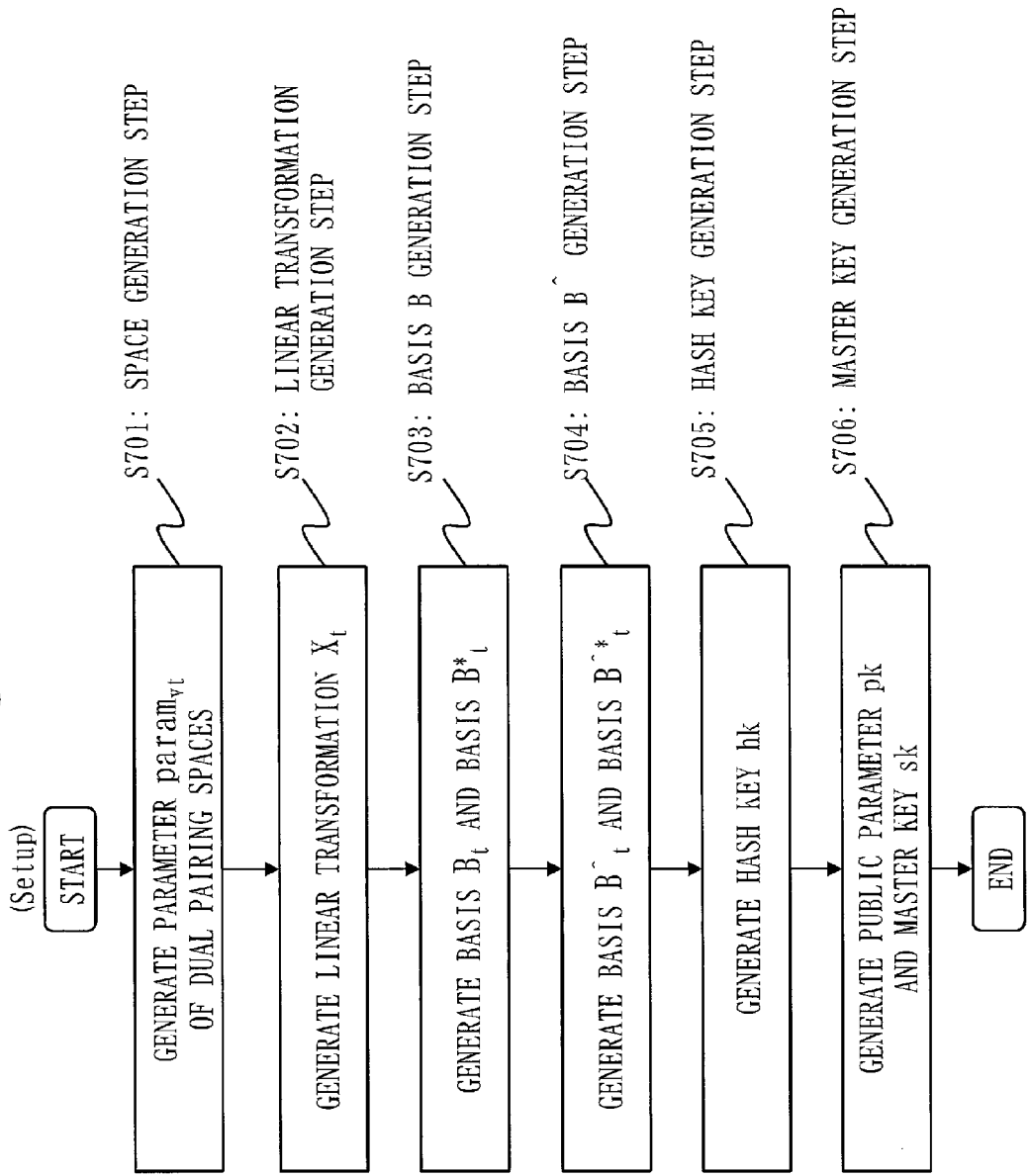
FIG. 22 is a flowchart illustrating the process of a Setup algorithm according to Embodiment 4.
Figure 23:
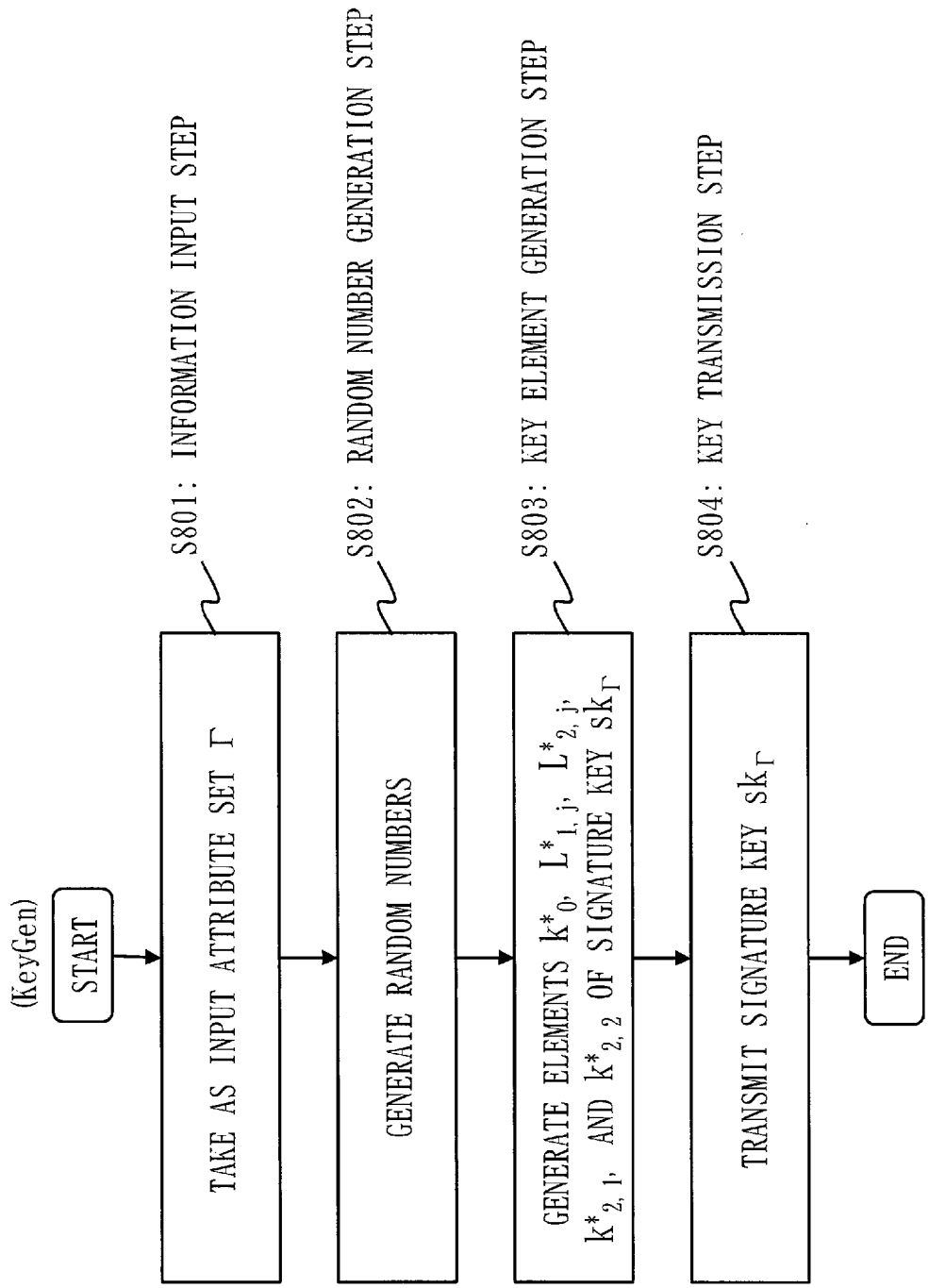
FIG. 23 is a flowchart illustrating the process of a KeyGen algorithm according to Embodiment 4.
Figure 24:
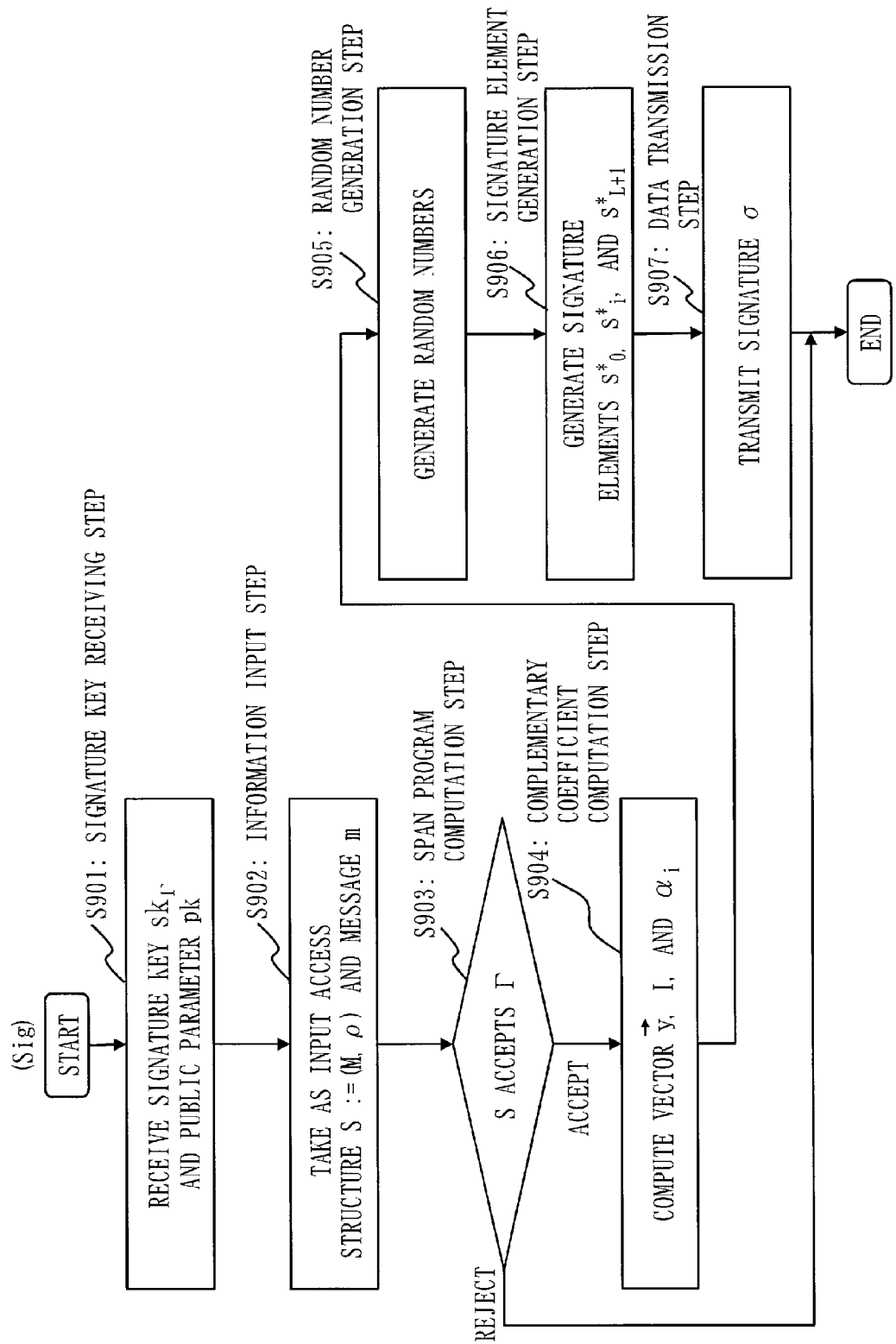
FIG. 24 is a flowchart illustrating the process of a Sig algorithm according to Embodiment 4.
Figure 25:
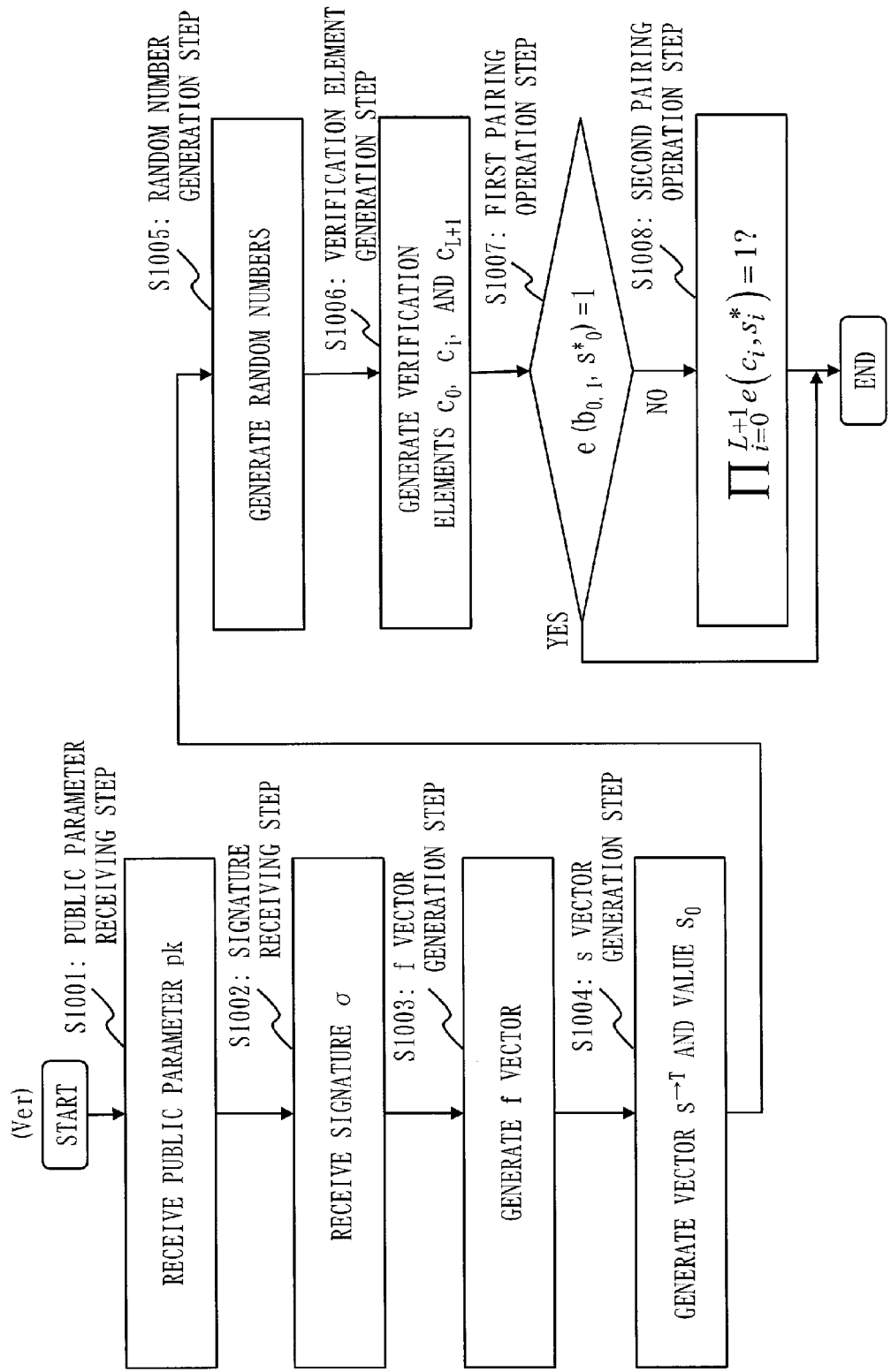
FIG. 25 is a flowchart illustrating the process of a Ver algorithm according to Embodiment 4.

FIG. 22 and FIG. 23 are flowcharts illustrating the operation of the key generation device 100 according to Embodiment 4. FIG. 22 is a flowchart illustrating the process of the Setup algorithm according to Embodiment 4, and FIG. 23 is a flowchart illustrating the process of the KeyGen algorithm according to Embodiment 4. FIG. 24 is a flowchart illustrating the operation of the signature device 400 according to Embodiment 4, and illustrating the process of the Sig algorithm according to Embodiment 4. FIG. 25 is a flowchart illustrating the operation of the verification device 500 according to Embodiment 4, and illustrating the process of the Ver algorithm according to Embodiment 4.

In the following description, $H:=(KH_\lambda, H_{hk}^{\lambda,D})$ is a collision-resistant hash function. A collision-resistant hash function is a hash function for which it is difficult to find two inputs that hash to the same output.

Specifically, the following two items apply to a collision-resistant hash function family H associated with the algorithm $G_{bpg}$ and a polynomial $poly(\lambda)$.

1. A family of key spaces is indexed by $\lambda$. Each such key space is a probability space on bit strings denoted by $KH_\lambda$. There exists a probabilistic polynomial-time algorithm whose output distribution on input $1^\lambda$ is equal to $KH_\lambda$.

2. A family of hash functions is indexed by $\lambda$, hk randomly selected from $KH_\lambda$, and $D:=\{0,1\}^{poly(\lambda)}$, where each such function $H_{hk}^{\lambda,D}$ maps an element of D to $F_q^\times$ with q being the first element of output $param_G$ of algorithm $G_{bpg}$ $(1^\lambda)$. There exists a deterministic polynomial-time algorithm that outputs $H_{hk}^{\lambda,D}(d)$ on input $1^\lambda$, hk, and $d \in D$.

The function and operation of the key generation device 100 will be described.

As illustrated in FIG. 19, the key generation device 100 includes a master key generation part 110, a master key storage part 120, an information input part 130, a decryption key generation part 140, and a key transmission part 150. The master key generation part 110 includes a space generation part 111, a matrix generation part 112, a basis generation part 113, and a key generation part 114. The decryption key generation part 140 includes a random number generation part 143 and a key element generation part 144.

With reference to FIG. 22, the process of the Setup algorithm will be described.

(S701: Space Generation Step)

The space generation part 111 generates a parameter $param_G:=(q, G, G_T, g, e)$, similarly as in (S101) of FIG. 9.

Further, the space generation part 111 sets $N_0:=4$, $N_1:=6n$, and $N_2:=7$. Then, with the processing device and for each integer $t=0, 1, 2$, the space generation part 111 executes $G_{dpvs}$ taking as input the security parameter $1^\lambda$, $N_t$, and the parameter $param_G$ of symmetric bilinear pairing groups, and thereby generates a parameter $param_{v_t}:=(q, V_t, G_T, A, e)$ of dual pairing vector spaces.

(S702: Linear Transformation Generation Step)

With the processing device, the matrix generation part 112 generates a linear transformation $X_t$ for each integer $t=0, 2$, as indicated in Formula 199.

$$X_t := (\chi_{t,i,j})_{i,j=1,\ldots,N_t} \xleftarrow{U} GL(N_t, \mathbb{F}_q) \text{ for } t = 0, 2. \quad \text{[Formula 199]}$$

With the processing device, the matrix generation part 112 also generates a linear transformation $X_1$, as indicated in Formula 200.

$$X_1 \xleftarrow{U} \mathcal{L}(6, n, \mathbb{F}_q) \quad \text{[Formula 200]}$$

In the following, $\{\mu_{i,j}, \mu'_{i,j,L}\}_{i,j=1,\ldots,6; L=1,\ldots,n}$ denotes non-zero elements in the linear transformation $X_1$.

(S703: Basis B Generation Step)

With the processing device, the basis generation part 113 generates a basis $B^*_0$, a basis $B^*_2$, a variable $B^*_{i,j}$, and a variable $B'^*_{i,j,L}$, as indicated in Formula 201.
for $t=0, 2$, $$b_{t,i}=(\chi_{t,i,1},\ldots,\chi_{t,i,N_t}) \mathbb{A} = \Sigma_{j=1}^{N_t} \chi_{t,i,j} a_j \text{ for } i=1,\ldots,N_t,$$

$$\mathbb{B}_t := (b_{t,1},\ldots,b_{t,N_t}) \quad \text{[Formula 201]}$$

for $i, j=1,\ldots, 6; L=1,\ldots, n$, $$B^*_{i,j}=\mu_{i,j}g, B'^*_{i,j,L}=\mu'_{i,j,L}g$$

With the processing device, the basis generation part 113 also generates a basis $B_0$, a basis $B_1$, and a basis $B_2$, as indicated in Formula 202.
for $t=0, 1, 2$, $$(\theta_{t,i,j})_{i,j=1,\ldots,N_t} := \psi \cdot (X_t^T)^{-1},$$

$$b^*_{t,i}:=(\theta_{t,i,1},\ldots,\theta_{t,i,N_t}) \mathbb{A} = \Sigma_{j=1}^{N_t} \theta_{t,i,j} a_j \text{ for } i=1,\ldots,N_t,$$

$$\mathbb{B}^*_t := (b^*_{t,1},\ldots,b^*_{t,N_t}) \quad \text{[Formula 202]}$$

(S704: Basis B^ Generation Step)

With the processing device, the key generation part 114 generates a basis $\hat{B}_0$, a basis $\hat{B}_1$, a basis $\hat{B}_2$, basis $\hat{B}^*_0$, a basis $\hat{B}^*_1$, and a basis $\hat{B}^*_2$, as indicated in Formula 203.

$$\hat{\mathbb{B}}_0:=(b_{0,1}, b_{0,4}),$$

$$\hat{\mathbb{B}}_1:=(b_{1,1},\ldots,b_{1,n}, b_{1,4n+1},\ldots,b_{1,6n}),$$

$$\hat{\mathbb{B}}_2:=(b_{2,1}, b_{2,2}, b_{2,7}),$$

$$\hat{\mathbb{B}}^*_1:=(b_{1,1}^*,\ldots,b_{1,n}^*, b_{1,3n+1}^*,\ldots,b_{1,4n}^*)=\{B_{i,j}^*, B_{i,j,L}^*\}_{i=1,4;j=1,\ldots,6;L=1,\ldots,n},$$

$$\hat{\mathbb{B}}_0^*:=(b_{2,1}^*, b_{2,2}^*, b_{2,5}^*, b_{2,6}^*) \quad \text{[Formula 203]}$$

(S705: Hash Key Generation Step)

With the processing device, the master key generation part 110 computes Formula 204, and thereby randomly generates a hash key hk.

$$hk \xleftarrow{R} KH_\lambda \quad \text{[Formula 204]}$$

(S706: Master Key Generation Step)

With the processing device, the key generation part 114 generates a public parameter $pk:=(1^\lambda, hk, param_n, \{\hat{B}_t\}_{t=0,1,2}, \{\hat{B}^*_t\}_{t=1,2}, b^*_{0,3})$ and a master secret key $sk:=b^*_{0,1}$. Then, the key generation part 114 stores the public parameter pk and the master secret key sk in the master key storage part 120.

Note that $param_n:=(\{param_{V_t}\}_{t=0,1,2}, g_T:=e(g,g)^\psi)$.

In brief, in (S701) through (S706), the key generation device 100 generates the public parameter pk and the master secret key sk by executing the Setup algorithm indicated in Formula 206, the Setup algorithm using an algorithm $G^{ABS}_{ob}$ indicated in Formula 205.

$\mathcal{G}_{ob}^{ABS}(1^\lambda, 6, n):$ [Formula 205]

$param_{\mathbb{G}} := (q, \mathbb{G}, \mathbb{G}_T, g, e) \xleftarrow{R} \mathcal{G}_{bpg}(1^\lambda),$ $N_0 := 4, N_1 := 6n, N_2 := 7,$ $param_{\mathbb{V}_t} := (q, \mathbb{V}_t, \mathbb{G}_T, \mathbb{A}, e) :=$ $\mathcal{G}_{dpvs}(1^\lambda, N_t, param_{\mathbb{G}})$ for $t = 0, 1, 2,$ $\psi \xleftarrow{U} \mathbb{F}_q^\times, g_T := e(g, g)^\psi,$ $param_n := (\{param_{\mathbb{V}_t}\}_{t=0,1,2}, g_T),$ $X_t := (\chi_{t,i,j})_{i,j=1,\ldots,N_t} \xleftarrow{U} GL(N_t, \mathbb{F}_q),$ for $t = 0, 2,$ $X_1 \xleftarrow{U} \mathcal{L}(6, n, \mathbb{F}_q),$ hereafter, $\{\mu_{i,j}, \mu'_{i,j,L}\}_{i,j=1,\ldots,6; L=1,\ldots,n}$ denotes non-zero entries of $X_1$, for $t = 0, 2,$ $b_{t,i} :=$ $(\chi_{t,i,1}, \ldots, \chi_{t,i,N_t})_{\mathbb{A}} = \sum_{j=1}^{N_t} \chi_{t,i,j} a_j$ for $i = 1, \ldots, N_t,$ $\mathbb{B}_t := (b_{t,1}, \ldots, b_{t,N_t}),$ for $i, j = 1, \ldots, 6; L = 1, \ldots, n,$ $B_{i,j}^* := \mu_{i,j} g, B'_{i,j,L} := \mu'_{i,j,L} g$ for $t = 0, 1, 2,$ $(\vartheta_{t,i,j})_{i,j=1,\ldots,N_t} := \psi \cdot (X_t^T)^{-1},$ $b_{t,i}^* := (\vartheta_{t,i,1}, \ldots, \vartheta_{t,i,N_t})_{\mathbb{A}} =$ $\sum_{j=1}^{N_t} \vartheta_{t,i,j} a_j$ for $i = 1, \ldots, N_t,$ $\mathbb{B}_t^* := (b_{t,1}^*, \ldots, b_{t,N_t}^*)$ return $(param_n, \mathbb{B}_0, \mathbb{B}_0^*,$ $\{B_{i,j}, B'_{i,j,L}\}_{i,j=1,\ldots,6; L=1,\ldots,n},$ $\mathbb{B}_1^*, \mathbb{B}_2, \mathbb{B}_2^*).$ Setup($1^\lambda, n$): [Formula 206]

$hk \xleftarrow{R} KH_\lambda,$ $(param_n, \mathbb{B}_0, \mathbb{B}_0^*, \mathbb{B}_1,$ $\{B_{i,j}^*, B'^*_{i,j,L}\}_{i,j=1,\ldots,6;L=1,\ldots,n}) \xleftarrow{R}$ $\mathcal{G}_{ob}^{ABS}(1^\lambda, 6, n),$ $\hat{\mathbb{B}}_0 := (b_{0,1}, b_{0,4}),$ $\hat{\mathbb{B}}_1 := (b_{1,1}, \ldots, b_{1,n}, b_{1,4n+1}, \ldots, b_{1,6n}),$ $\hat{\mathbb{B}}_2 := (b_{2,1}, b_{2,2}, b_{2,7}),$ $\hat{\mathbb{B}}_1^* := (b_{1,1}^*, \ldots, b_{1,n}^*, b_{1,3n+1}^*, \ldots, b_{1,4n}^*) =$ $\{B_{i,j}^*, B'^*_{i,j,L}\}_{i=1,4;j=1,\ldots,6;L=1,\ldots,n},$ $\hat{\mathbb{B}}_0^* := (b_{2,1}^*, b_{2,2}^*, b_{2,5}^*, b_{2,6}^*),$ $pk := (1^\lambda, hk, param_n,$ $\{\hat{\mathbb{B}}_t\}_{t=0,1,2}, \{\hat{\mathbb{B}}_t^*\}_{t=1,2}, b_{0,3}^*), sk := b_{0,1}^*,$ return $pk, sk.$ With reference to FIG. 23, the process of the KeyGen algorithm will be described.

The process of (S801) is the same as the process of (S501) in FIG. 16. However, attribute information of a user of a signature key $sk_\Gamma$ is set in $\rho$ of the access structure S, for example.

(S802: Random Number Generation Step)

With the processing device, the random number generation part 143 generates random numbers, as indicated in Formula 207.

$\omega, \varphi_0, \varphi_1, \varphi_{2,1,1}, \varphi_{2,1,2}, \varphi_{2,2,1}, \varphi_{2,2,2} \xleftarrow{U} \mathbb{F}_q$ [Formula 207]

(S803: Key Element Generation Step)

With the processing device, the key element generation part 144 generates an element $k^*_0$ of the signature key $sk_\Gamma$, as indicated in Formula 208.

$k_0^* := (\omega, 0, \phi_0, 0)_{\mathbb{B}_0^*}$ [Formula 208]

With the processing device, the key element generation part 144 generates elements $L^*_{1,j}$ and $L^*_{2,j}$ of the signature key sky, as indicated in Formula 209.

for $j = 1, \ldots, 6$ $L_{1,j}^* := \omega B_{1,j}^* + \phi_1 B_{4,j}^*,$ $L_{2,j}^* := \Sigma_{L=1}^n y_L(\omega B_{1,j,L}'^* + \phi_1 B_{4,j,L}'^*)$ where $\vec{y} := (y_1, \ldots, y_n)$ such that $\Sigma_{j=0}^{n-1} y_{n-j} z^{j} = z^{n-1-n'} \cdot \Pi_{j=1}^{n'}(z - x_j)$ [Formula 209]

With the processing device, the key element generation part 144 also generates elements $k^*_{2,1}$ and $k^*_{2,2}$ of the signature key sky, as indicated in Formula 210.

$k_{2,1}^* := (\omega(1,0), 0, 0, \phi_{2,1,1}, \phi_{2,1,2}, 0)_{\mathbb{B}_2^*},$ $k_{2,2}^* := (\omega(0,1), 0, 0, \phi_{2,2,1}, \phi_{2,2,2}, 0)_{\mathbb{B}_2^*}$

[Formula 210]

(S804: Key Transmission Step)

With the communication device and via the network, for example, the key transmission part 150 transmits the signature key $sk_\Gamma$ having, as elements, the attribute set $\Gamma$ inputted in (S801) and $k^*_0$, $L^*_{1,j}$, $L^*_{2,j}$, $k^*_{2,1}$, and $k^*_{2,2}$ generated in (S803) to the signature device 400 in secrecy. As a matter of course, the signature key $sk_\Gamma$ may be transmitted to the signature device 400 by another method.

In brief, in (S801) through (S803), the key generation device 100 generates the signature key $sk_\Gamma$ by executing the KeyGen algorithm indicated in Formula 211. In (S804), the key generation device 100 transmits the generated signature key $sk_\Gamma$ to the decryption device 300.

KeyGen($pk, sk, \Gamma = \{x_1, \ldots, x_{n'} | x_j \in \mathbb{F}_q^\times\}$): [Formula 211]

$\omega, \varphi_0, \varphi_1, \varphi_{2,1,1}, \varphi_{2,1,2}, \varphi_{2,2,1}, \varphi_{2,2,2} \xleftarrow{U} \mathbb{F}_q,$ $\vec{y} := (y_1, \ldots, y_n)$ such that $\sum_{j=0}^{n-1} y_{n-j} z^j = z^{n-1-n'} \cdot \prod_{j=1}^{n'}(z - x_j),$ $k_0^* := (\omega, 0, \varphi_0, 0)_{\mathbb{B}_0^*},$ $L_{1,j}^* := \omega B_{1,j}^* + \varphi_1 B_{4,j}^*,$ $L_{2,j}^* := \sum_{L=1}^n y_L(\omega B_{1,j,L}'^* + \varphi_1 B_{4,j,L}'^*)$ for $j = 1, \ldots, 6,$ $k_{2,1}^* := (\omega(1,0), 0, 0, \varphi_{2,1,1}, \varphi_{2,1,2}, 0)_{\mathbb{B}_2^*},$ $k_{2,2}^* := (\omega(0,1), 0, 0, \varphi_{2,2,1}, \varphi_{2,2,2}, 0)_{\mathbb{B}_2^*},$ $sk_\Gamma := (\Gamma, k_0^*, \{L_{1,j}^*, L_{2,j}^*\}_{j=1,\ldots,6}, \{k_{2,t}^*\}_{t=1,2}),$ return $sk_\Gamma.$ Note that the element $k^*_1$ is defined as indicated in Formula 212, based on $\{L^*_{1,j}, L^*_{2,j}\}_{j=1,\ldots,6}$ and the vector $\vec{y}$.

$$k_1^* := \left(\overbrace{y_1 L_{1,1}, \ldots, y_{n-1} L_{1,1}}^{n}, L_{2,1}, \overbrace{y_1 L_{1,2}, \ldots, y_{n-1} L_{1,2}}^{n}, L_{2,2}\right),$$

$$\ldots \left(\overbrace{y_1 L_{1,5}, \ldots, y_{n-1} L_{1,5}}^{n}, L_{2,5}, \overbrace{y_1 L_{1,6}, \ldots, y_{n-1} L_{1,6}}^{n}, L_{2,6}\right)$$

that is, $k_1^* = (\overbrace{\omega \vec{y}}^{n}, \overbrace{0^{2n}}^{2n}, \overbrace{\varphi_1 \vec{y}}^{n}, \overbrace{0^{2n}}^{2n})_{\mathbb{B}_1^*}$, The function and operation of the signature device 400 will be described.

As illustrated in FIG. 20, the signature device 400 includes a signature key receiving part 410, an information input part 420, a complementary coefficient computation part 430, a signature data generation part 440, and a data transmission part 450. The signature data generation part 440 includes a random number generation part 441 and a signature element generation part 442.

With reference to FIG. 24, the process of the Sig algorithm will be described.

(S901: Signature Key Receiving Step)

With the communication device and via the network, for example, the signature key receiving part 410 receives the signature key $sk_\Gamma$ generated by the key generation device 100. The signature key receiving part 410 also receives the public parameter pk generated by the key generation device 100.

(S902: Information Input Step)

With the input device, the information input part 420 takes as input an access structure $S:=(M, \rho)$. With the input device, the information input part 420 also takes as input a message m to which a signature is to be appended.

(S903: Span Program Computation Step)

With the processing device, the complementary coefficient computation part 430 determines whether or not the access structure S inputted in (S902) accepts the attribute set $\Gamma$ included in the signature key $sk_\Gamma$ received in (S901).

If the access structure S accepts the attribute set $\Gamma$ (accept in S903), the complementary coefficient computation part 430 advances the process to (S904). If the access structure S rejects the attribute set $\Gamma$ (rejects in S903), the complementary coefficient computation part 430 ends the process.

(S904: Complementary Coefficient Computation Step)

With the processing device, the complementary coefficient computation part 430 computes a vector $\vec{y}$ such that Formula 213 is satisfied, I such that Formula 214 is satisfied, and a constant (complementary coefficient) $\alpha_i$ for each integer i included in I.

$\vec{y}:=(y_1, \ldots, y_n)$ such that $\sum_{j=0}^{n-1} y_{n-j} z^{j} = z^{n-1-m} \cdot \prod_{j=1}^{m}(z - x_j)$ [Formula 213]

$$\vec{1} = \sum_{i \in I} \alpha_i M_i \quad \text{[Formula 214]}$$

where $M_i$ is the *i-th* row of $M$, and $I \subseteq \{i \in \{1, \ldots, L\} \mid [\rho(i) = v_i \wedge v_i \in \Gamma] \vee$ $[\rho(i) = \neg v_i \wedge v_i \notin \Gamma]\}$ (S905: Random Number Generation Step)

With the processing device, the random number generation part 441 generates random numbers, as indicated in Formula 215.

$$\xi \xleftarrow{U} \mathbb{F}_q^x, \quad \text{[Formula 215]}$$

$$(\beta_i) \xleftarrow{U} \left\{(\beta_1, \ldots, \beta_L) \mid \sum_{i=1}^L \beta_i M_i = \vec{0}\right\}$$

(S906: Signature Element Generation Step)

With the processing device, the signature element generation part 442 generates an element $s^*_0$ of a signature σ, as indicated in Formula 216.

$s_0^* := \xi k_0^* + r_0^*$ [Formula 216]

Note that $r^*_0$ is as indicated in Formula 217.

$$r_0^* \xleftarrow{U} \text{span}\langle b_{0,3}^* \rangle \quad \text{[Formula 217]}$$

With the processing device, the signature element generation part 442 also generates an element $s^*_i$ of the signature σ for each integer i=1, ..., L, as indicated in Formula 218.

$s_i^* := \gamma_i \xi k_1^* + \sum_{i'=1}^{n} u_{i,i'} b_{1,i'}^* + r_i^*$, for $i=1, \ldots, L$ [Formula 218]

Note that $r^*_i$ is as indicated in Formula 219.

$$r_i^* \xleftarrow{U} \text{span}\langle b_{1,3n+1}^*, \ldots, b_{1,4n}^* \rangle \quad \text{[Formula 219]}$$

Note also that $\gamma_i$ and $\vec{u}_i := (u_{i,i'}(i'=1, \ldots, n)$ are as indicated in Formula 220.

$\gamma_i, \vec{u}_i := (u_{i,1}, \ldots, u_{i,n})$ are defined as [Formula 220]

if $i \in I \wedge \rho(i) = \vec{v}_i$, $\gamma_i := \alpha_i$, $\vec{u}_i \xleftarrow{U} \{\vec{u}_i \mid \vec{u}_i \cdot \vec{v}_i = 0 \wedge u_{i,1} = \beta_i\}$, if $i \in I \wedge \rho(i) = \neg \vec{v}_i$, $\gamma_i := \dfrac{\alpha_i}{\vec{v}_i \cdot \vec{y}}$, $\vec{u}_i \xleftarrow{U} \{\vec{u}_i \mid \vec{u}_i \cdot \vec{v}_i = \beta_i\}$, if $i \notin I \wedge \rho(i) = \vec{v}_i$, $\gamma_i := 0$, $\vec{u}_i \xleftarrow{U} \{\vec{u}_i \mid \vec{u}_i \cdot \vec{v}_i = 0 \wedge u_{i,1} = \beta_i\}$, if $i \notin I \wedge \rho(i) = \neg \vec{v}_i$, $\gamma_i := 0$, $\vec{u}_i \xleftarrow{U} \{\vec{u}_i \mid \vec{u}_i \cdot \vec{v}_i = \beta_i\}$ With the processing device, the signature element generation part 442 also generates an element $S^*_{L+1}$ of the signature σ, as indicated in Formula 221.

$s_{L+1}^* := \xi(k_{2,1}^* + H_{hk}^{\lambda,D}(m \| \mathbb{S}) \cdot k_{2,2}^*) + r_{L+1}^*$ [Formula 221]

Note that $r^*_{L+1}$ is as indicated in Formula 222.

$$r^*_{L+1} \xleftarrow{U} \text{span}\langle b^*_{2,5}, b^*_{2,6}\rangle \quad \text{[Formula 222]}$$

(S907: Data Transmission Step)

With the communication device and via the network, for example, the data transmission part 450 transmits the signature σ including the element $s^*_0$, $s^*_i$, and $s^*_{L+1}$, the message m, and the access structure $\mathbb{S}:=(M, \rho)$ to the verification device 500. As a matter of course, the signature σ may be transmitted to the verification device 500 by another method.

In brief, in (S901) through (S906), the signature device 400 generates the signature σ by executing the Sig algorithm indicated in Formula 223. In (S907), the signature device 400 transmits the generated signature σ to the verification device 500.

$Sig(pk, sk_\Gamma, m, \mathbb{S}:=(M, \rho))$: [Formula 223-1]

If $\mathbb{S}$ accepts $\Gamma$, then compute $\vec{y} := (y_1, \ldots, y_n)$ such that $\sum_{j=0}^{n-1} y_{n-j} z^j =$ $z^{n-1-n'} \cdot \prod_{j=1}^{n'} (z - x_j)$ $I$ and $\{\alpha_i\}_{i \in I}$ such that $\vec{1} = \sum_{i \in I} \alpha_i M_i$ where $M_i$ is the $i$-th row of $M$, and $I \subseteq \{i \in \{1, \ldots, L\} \mid [$ $\rho(i) = v_i \wedge v_i \in \Gamma] \vee [\rho(i) = \neg v_i \wedge v_i \notin \Gamma]\}$ $\xi \xleftarrow{U} \mathbb{F}_q^\times$, $(\beta_i) \xleftarrow{U} \{(\beta_1, \ldots, \beta_L) \mid \sum_{i=1}^L \beta_i M_i = \vec{0}\}$, $s^*_0 := \xi k^*_0 + r^*_0$, where $r^*_0 \xleftarrow{U} \text{span}\langle b^*_{0,3}\rangle$, $s^*_i := \gamma_i \cdot \xi k^*_1 + \sum_{t=1}^n u_{i,t} \cdot b^*_{1,t} + r^*_i$, [Formula 223-2]

$\vec{v}_i := (v_i^{n-1}, \ldots, v_i, 1)$, for $i = 1, \ldots, L$, where $r^*_i \xleftarrow{U} \text{span}\langle b^*_{1,3n+1}, \ldots, b^*_{1,4n}\rangle$, $\gamma_i, \vec{u}_i := (u_{i,1}, \ldots, u_{i,n})$ are defined as if $i \in I \wedge \rho(i) = \vec{v}_i$, $\gamma_i := \alpha_i$, $\vec{u}_i \xleftarrow{U} \{\vec{u}_i \mid \vec{u}_i \cdot \vec{v}_i = 0 \wedge u_{i,1} = \beta_i\}$, if $i \in I \wedge \rho(i) = \neg \vec{v}_i$, $\gamma_i := \frac{\alpha_i}{\vec{v}_i \cdot \vec{y}}$, $\vec{u}_i \xleftarrow{U} \{\vec{u}_i \mid \vec{u}_i \cdot \vec{v}_i = \beta_i\}$, if $i \notin I \wedge \rho(i) = \vec{v}_i$, $\gamma_i := 0$, $\vec{u}_i \xleftarrow{U} \{\vec{u}_i \mid \vec{u}_i \cdot \vec{v}_i = 0 \wedge u_{i,1} = \beta_i\}$, if $i \notin I \wedge \rho(i) = \neg \vec{v}_i$, $\gamma_i := 0$, $\vec{u}_i \xleftarrow{U} \{\vec{u}_i \mid \vec{u}_i \cdot \vec{v}_i = \beta_i\}$ $s^*_{L+1} := \xi(k^*_{2,1} + H^{\lambda,D}_{hk}(m\|\mathbb{S}) \cdot k^*_{2,2}) + r^*_{L+1}$ where $r^*_{L+1} \xleftarrow{U} \text{span}\langle b^*_{2,5}, b^*_{2,6}\rangle$, return $\sigma := (s^*_0, \ldots, s^*_{L+1})$.

The function and operation of the verification device 500 will be described.

As illustrated in FIG. 21, the verification device 500 includes a public parameter receiving part 510, a data receiving part 520, a verification data generation part 530, and a verification part 540. The verification data generation part 530 includes an f vector generation part 531, an s vector generation part 532, a random number generation part 533, and a verification element generation part 534.

With reference to FIG. 25, the process of the Ver algorithm will be described.

(S1001: Public Parameter Receiving Step)

With the communication device and via the network, for example, the public parameter receiving part 510 receives the public parameter pk generated by the key generation device 100.

(S1002: Signature Receiving Step)

With the communication device and via the network, for example, the data receiving part 520 receives the signature c transmitted by the signature device 400.

(S1003: f Vector Generation Step)

With the processing device, the f vector generation part 531 randomly generates a vector $\vec{f}$, as indicated in Formula 224.

$$\vec{f} \xleftarrow{U} \mathbb{F}_q^r \quad \text{[Formula 224]}$$

(S1004: s Vector Generation Step)

With the processing device, the s vector generation part 532 generates a vector $\vec{s}^T := (s_1, \ldots, s_L)^T$, as indicated in Formula 225.

$$\vec{s}^T := (s_1, \ldots, s_L)^T := M \cdot \vec{f}^T \quad \text{[Formula 225]}$$

With the processing device, the s vector generation part 532 also generates a value $s_0$, as indicated in Formula 226.

$$s_0 := \vec{1} \cdot \vec{f}^T \quad \text{[Formula 226]}$$

(S1005: Random Number Generation Step)

With the processing device, the random number generation part 533 generates random numbers, as indicated in Formula 227.

$$\eta_0, \eta_{L+1}, \theta_{L+1}, s_{L+1} \xleftarrow{U} \mathbb{F}_q, \quad \text{[Formula 227]}$$

$$\vec{\eta}_i \xleftarrow{U} \mathbb{F}_q^{2n} \text{ for } i = 1, \ldots, L,$$

$$\theta_i \xleftarrow{U} \mathbb{F}_q \text{ for } i = 1, \ldots, L$$

(S1006: Verification Element Generation Step)

With the processing device, the verification element generation part 534 generates an element $c_0$ of a verification key, as indicated in Formula 228.

$$c_0 := (-s_0 - s_{L+1}, 0, 0, \eta_0)_{\mathbb{B}_0} \quad \text{[Formula 228]}$$

With the processing device, the verification element generation part 534 also generates an element $c_i$ of the verification key for each integer $i=1, \ldots, L$, as indicated in Formula 229.

for $i = 1, \ldots, L$, $\vec{v}_i := (v_i^{n-1}, \ldots, v_i, 1)$, [Formula 229]

if $\rho(i) = v_i$ $$c_i := \big(\overbrace{s_i \vec{e}_1 + \theta_i \vec{v}_t}^{n}, \overbrace{0^{2n}}^{2n}, \overbrace{0^n}^{n}, \overbrace{\vec{\eta}_i}^{2n}\big)_{\mathbb{B}_1},$$

-continued if $\rho(i) = \neg v_i$, $$c_i := (\underbrace{s_i \vec{v}_t}_{n}, \underbrace{0^{2n}}_{2n}, \underbrace{0^n}_{n}, \underbrace{\vec{\eta}_i}_{2n})_{\mathbb{B}_1}$$

With the processing device, the verification element generation part 534 also generates an element $c_{L+1}$ of the verification key, as indicated in Formula 230.

$$c_{L+1} := (s_{L+1} - \theta_{L+1} H_{hk}^{\lambda,D}(m\|\mathbb{S}),$$
$$\theta_{L+1}, 0, 0, 0, 0, \eta_{L+1})_{\mathbb{B}_2} \qquad \text{[Formula 230]}$$

(S1007: First Pairing Operation Step)

With the processing device, the verification part 540 computes a pairing operation e $(b_{0,1}, s^*_0)$.

If the result of computing the pairing operation e $(b_{0,1}, s^*_0)$ is a value 1, the verification part 540 outputs a value 0 indicating that the verification of the signature has failed, and ends the process. If the result of computing the pairing operation e $(b_{0,1}, s^*_0)$ is not a value 1, the verification part 540 advances the process to S1008.

(S1008: Second Pairing Operation Step)

With the processing device, the verification part 540 computes a pairing operation indicated in Formula 231.

$$\Pi_{i=0}^{L+1} e(c_i, s_i^*) \qquad \text{[Formula 231]}$$

If the result of computing the pairing operation indicated in Formula 231 is a value 1, the verification part 540 outputs a value 1 indicating that the verification of the signature has succeeded. If the result is other than a value 1, the verification part 540 outputs a value 0 indicating that the verification of the signature has failed.

In brief, in (S1001) through (S1008), the verification device 500 verifies the signature σ by executing the Ver algorithm indicated in Formula 232.

$$Ver(pk, m, \mathbb{S} := (M, \rho), \sigma) \qquad \text{[Formula 232]}$$

$$\vec{f} \xleftarrow{U} \mathbb{F}_q^r, \vec{s}^T := (s_1, \ldots, s_L)^T := M \cdot \vec{f}^T, s_0 := \vec{1} \cdot \vec{f}^T,$$

$$\eta_0, \eta_{L+1}, \theta_{L+1}, s_{L+1} \xleftarrow{U} \mathbb{F}_q,$$

$$c_0 := (-s_0 - s_{L+1}, 0, 0, \eta_0)_{\mathbb{B}_0},$$

for $i = 1, \ldots, L, \vec{v}_i := (v_i^{n-1}, \ldots, v_i, 1),$ if $\rho(i) = v_i$, if $s_i^* \notin \mathbb{V}_1$, return 0, else $\theta_i \xleftarrow{U} \mathbb{F}_q, \vec{\eta}_i \xleftarrow{U} \mathbb{F}_q^{2n},$ $$c_i := (\underbrace{s_i \vec{e}_{t,1} + \theta_i \vec{v}_t}_{n}, \underbrace{0^{2n}}_{2n}, \underbrace{0^n}_{n}, \underbrace{\vec{\eta}_i}_{2n})_{\mathbb{B}_1},$$

if $\rho(i) = \neg v_i$, if $s_i^* \notin \mathbb{V}_1$, return 0, else $\theta_i \xleftarrow{U} \mathbb{F}_q, \vec{\eta}_i \xleftarrow{U} \mathbb{F}_q^{2n},$ $$c_i := (\underbrace{s_i \vec{v}_t}_{n}, \underbrace{0^{2n}}_{2n}, \underbrace{0^n}_{n}, \underbrace{\vec{\eta}_i}_{2n})_{\mathbb{B}_1},$$

$c_{L+1} :=$ $$(s_{L+1} - \theta_{L+1} H_{hk}^{\lambda,D}(m\|\mathbb{S}), \theta_{L+1}, 0, 0, 0, 0, \eta_{L+1})_{\mathbb{B}_2},$$

return 0 if $e(b_{0,1}, s_0^*) = 1,$ return 1 if $\prod_{i=0}^{L+1} e(c_i, s_i^*) = 1,$ return 0 otherwise.

As described above, it is possible to construct the ABS scheme to which the CP-ABE scheme described in Embodiment 2 is applied.

Similarly as in the CP-ABE scheme described in Embodiment 2 in which the size of the decryption key $sk_\Gamma$ can be reduced, the size of the signature key $sk_\Gamma$ can be reduced in the ABS scheme described in Embodiment 4.

The ABS scheme to which the CP-ABE scheme described in Embodiment 2 is applied has been described herein. It is also possible to construct an ABS scheme to which the CP-FE scheme described in Embodiment 3 is applied by applying the concept of Embodiment 3 to the ABS scheme described in Embodiment 4.

Embodiment 5

In the above embodiments, the methods for implementing the cryptographic processes in dual vector spaces have been described. In Embodiment 5, a method for implementing the cryptographic processes in dual modules will be described.

That is, in the above embodiments, the cryptographic processes are implemented in cyclic groups of prime order q. However, when a ring R is expressed using a composite number M as indicated in Formula 233, the cryptographic processes described in the above embodiments can be adapted to a module having the ring R as a coefficient.

$$R := \mathbb{Z}/_{M\mathbb{Z}} \qquad \text{[Formula 233]}$$

where $\mathbb{Z}$: integer, and

M: composite number.

By changing $F_q$ to R in the algorithms described in the above embodiments, the cryptographic processes in dual additive groups can be implemented.

In the above embodiments, the encoding part, the hidden part, the secret key randomness part, and the ciphertext randomness part are n-, 2n-, 2n- and n-dimensional, respectively, and the basis $B_1$ and basis $B^*_1$ are 6n-dimensional. However, it is not limited to this, and the hidden part, the secret key randomness part, and the ciphertext randomness part may be u-, w-, and z-dimensional not depending on n, respectively, and the basis $B_1$ and basis $B^*_1$ may be n+u+w+z-dimensional, where u, w, and z are integers of 0 or greater.

In the above description, in the case of KP, an element of a ciphertext is generated using a first vector, and an element of a decryption key is generated using a second vector, in order to reduce the size of the ciphertext. However, in the case of KP, an element of a decryption key may be generated using a first vector, and an element of a ciphertext may be generated using a second vector, in order to reduce the size of the decryption key.

Similarly, in the above description, in the case of CP, an element of a decryption key is generated using a first vector, and an element of a ciphertext is generated using a second vector, in order to reduce the size of the decryption key. However, in the case of CP, an element of a ciphertext may be generated using a first vector, and an element of a decryption key may be generated using a second vector, in order to reduce the size of the ciphertext.

In the above embodiments, a single key generation device 100 generates a decryption key. However, a single decryption key may be generated by a plurality of key generation devices 100 by combining the algorithms of the above embodiments with a multi-authority scheme described in Non-Patent Literature 3.

From the view point of security proof, in the above embodiments, ρ(i) for each integer i=1, . . . , L may be limited to a positive tuple (t, $\vec{v}$) or negative tuple ¬(t, $\vec{v}$) for respectively different identification information t.

In other words, when ρ(i)=(t, $\vec{v}$) or ρ(i)=¬(t, $\vec{v}$), let a function ρ˜ be map of {1, . . . , L}→{1, . . . , d} such that ρ˜(i)=t. In this case, ρ˜ may be limited to injection. Note that ρ(i) is ρ(i) in the access structure S:=(M, ρ(i)) described above.

Figure 26:
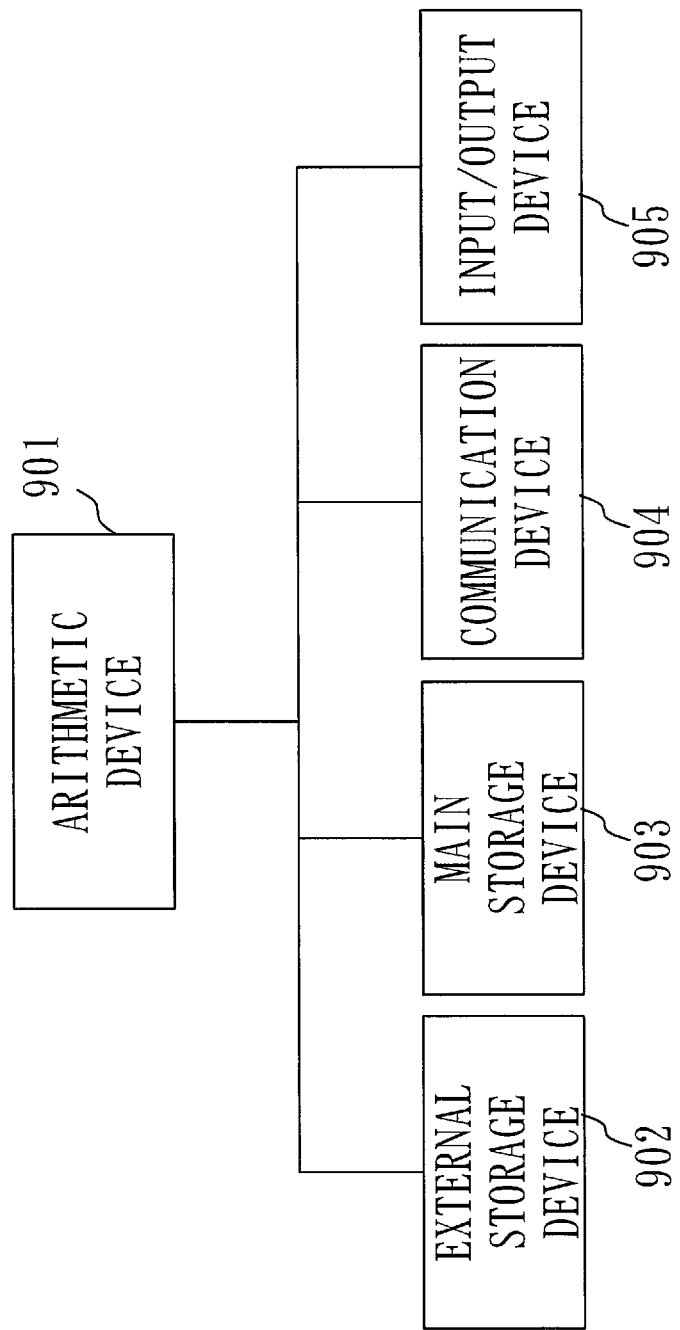
FIG. 26 is a diagram illustrating an example of a hardware configuration of each device of the cryptographic system 10 presented in Embodiments 1 to 5.

FIG. 26 is a diagram illustrating an example of a hardware configuration of each device (the key generation device 100, the encryption device 200, the decryption device 300, the signature device 400, and the verification device 500) of the cryptographic system 10 presented in Embodiments 1 to 5.

Each device of the cryptographic system 10 is a computer, and each element of each device of the cryptographic system 10 can be implemented by a program.

As the hardware configuration of each device of the cryptographic system 10, an arithmetic device 901, an external storage device 902, a main storage device 903, a communication device 904, and an input/output device 905 are connected to a bus.

The arithmetic device 901 is a CPU (Central Processing Unit) or the like that executes programs. The external storage device 902 is, for example, a ROM (Read Only Memory), a flash memory, a hard disk device, or the like. The main storage device 903 is, for example, a RAM (Random Access Memory) or the like. The communication device 904 is, for example, a communication board or the like. The input/output device 905 is, for example, a mouse, a keyboard, a display device, or the like.

The programs are normally stored in the external storage device 902. The programs are loaded into the main storage device 903 to be sequentially read and executed by the arithmetic device 901.

The programs are those that implement the functions described as the master key generation part 110, the master key storage part 120, the information input part 130, the decryption key generation part 140, the key transmission part 150, the public parameter receiving part 210, the information input part 220, the encrypted data generation part 230, the data transmission part 240, the decryption key receiving part 310, the data receiving part 320, the span program computation part 330, the complementary coefficient computation part 340, the decryption part 350, the signature key receiving part 410, the information input part 420, the complementary coefficient computation part 430, the signature data generation part 440, the data transmission part 450, the public parameter receiving part 510, the data receiving part 520, the verification data generation part 530, and the verification part 540.

Further, an operating system (OS) is also stored in the external storage device 902. At least part of the OS is loaded into the main storage device 903, and the arithmetic device 901 executes the above-described programs while executing the OS.

Information, data, signal values, and variable values described as the "public parameter pk", the "master secret key sk", the "decryption keys sk$_\Gamma$ and sk$_S$", the "ciphertexts ct$_S$ and Ct$_\Gamma$", the "Signature Key Sk$_\Gamma$", the "Verification Key", the "Access structure S", the "attribute set Γ", the "message m", the "signature σ", and so on in the description of Embodiments 1 to 5 are stored as files in the main storage device 903.

The configuration of FIG. 26 indicates an example of the hardware configuration of each device of the cryptographic system 10. The hardware configuration of each device of the cryptographic system 10 is not limited to the configuration of FIG. 26, and may be a different configuration.

REFERENCE SIGNS LIST

100: key generation device, 110: master key generation part, 111: space generation part, 112: matrix generation part, 113: basis generation part, 114: key generation part, 120: master key storage part, 130: information input part, 140: decryption key generation part, 141: f vector generation part, 142: s vector generation part, 143: random number generation part, 144: key element generation part, 150: key transmission part, 200: encryption device, 210: public parameter receiving part, 220: information input part, 230: encrypted data generation part, 231: random number generation part, 232: cipher element generation part, 233: f vector generation part, 234: s vector generation part, 240: data transmission part, 300: decryption device, 310: decryption key receiving part, 320: data receiving part, 330: span program computation n part, 340: complementary coefficient computation part, 350: decryption part, 400: signature device, 410: signature key receiving part, 420: information input part, 430: complementary coefficient computation part, 440: signature data generation part, 441: random number generation part, 442: signature element generation part, 450: data transmission part, 500: verification device, 510: public parameter receiving part, 520: data receiving part, 530: verification data generation part, 531: f vector generation part, 532: s vector generation part, 533: random number generation part, 534: verification element generation part, and 540: verification part

The invention claimed is:

1. A cryptographic system to perform a cryptographic process using a basis B and a basis B*, the cryptographic system comprising:
processing circuitry to:
generate a transmission-side vector being a vector in the basis B and being generated using one vector of a first vector consisting of coefficients y$_j$ (j=1, . . . , n) of a polynomial having attribute information x$_i$ (i=1, . . . , n', n' being an integer from 1 to n−1, n being an integer of 2 or greater) as roots and a second vector consisting of v$_1^i$ (i=0, . . . , n−1) being a power of predicate information v$_1$;
perform a pairing operation on the transmission-side vector and a reception-side vector being a vector in the basis B* and being generated using another vector of the first vector and the second vector; and
generate at least one of a ciphertext, decryption key and signature output of reduced size containing the transmission-side vector or reception-side vector to reduce processing time of an encryption or decryption process.

2. The cryptographic system according to claim 1, wherein
the basis B and the basis B* are bases which are generated by transforming a basis A by using a sparse matrix having at least one value other than a constant value 0 in each row and each column.

3. A cryptographic system to perform a cryptographic process using a basis B and a basis B*, the cryptographic system comprising:
processing circuitry to:
generate a transmission-side vector being a vector in the basis B and being generated using one vector of a first vector consisting of coefficients $y_j$ (j=1, ..., n) of a polynomial having attribute information $x_i$ (i=1, ..., n', n' being an integer from 1 to n−1, n being an integer of 2 or greater) as roots and a second vector consisting of $v_1^i$ (i=0, ..., n−1) being a power of predicate information $v_1$;

perform a pairing operation on the transmission-side vector and a reception-side vector being a vector in the basis B* and being generated using another vector of the first vector and the second vector; and generate at least one of a ciphertext, decryption key, and signature output of reduced size containing the transmission-side vector or reception-side vector to reduce processing time of an encryption or decryption process, wherein the first vector is a vector indicated in Formula 1, and the second vector is a vector indicated in Formula 2

$$\vec{y} := (y_1, \ldots, y_n) \text{ such that } \sum_{j=0}^{n-1} y_{n-j} z^j = z^{n-1-n'} \cdot (z - x_j) \quad \text{[Formula 1]}$$

$$\vec{v}_1 := (v_1^{n-1n}, \ldots, v_1, 1) \quad \text{[Formula 2]}$$

4. The cryptographic system according to claim 3, wherein the processing circuitry generates at least one of a ciphertext $ct_\Gamma$ including a transmission-side vector $c_1$ indicated in Formula 3, and decrypts the ciphertext $ct_\Gamma$ by using a decryption key $sk_S$ including a reception-side vector $k^*_i$ indicated in Formula 4

$$c_1 = (\overbrace{\omega \vec{y}, \ldots}^{n})_{\mathbb{B}_1} \quad \text{[Formula 3]}$$

where $\omega \xleftarrow{U} \mathbb{F}_q$ for $i = 1, \ldots, L$, [Formula 4]

if $\rho(i) = v_i$, $k^*_i := (\overbrace{s_i \vec{e}_1 + \theta_i \vec{v}_i, \ldots}^{n})_{\mathbb{B}^*_1}$, if $\rho(i) = \neg v_i$, $k^*_i := (\overbrace{s_i \vec{v}_i, \ldots}^{n_t})_{\mathbb{B}^*_1}$ where $\vec{f} \xleftarrow{U} \mathbb{F}_q^r$, $\vec{s}^T := (s_1, \ldots, s_L)^T := M \cdot \vec{f}^T$, $s_0 := \vec{1} \cdot \vec{f}^T$, $\theta_i \xleftarrow{U} \mathbb{F}_q$, $\vec{v}_i := (v_i^{n-1}, \ldots, v_i, 1)$.

5. The cryptographic system according to claim 3, wherein the processing circuitry generates at least one of a ciphertext $ct_S$ including a transmission-side vector $c_i$ indicated in Formula 5, and decrypts the ciphertext $ct_S$ by using a decryption key $sk_\Gamma$ including a reception-side vector $k^*_1$ indicated in Formula 6 for $i = 1, \ldots, L$, [Formula 5]

if $\rho(i) = v_i$, $c_i := (\overbrace{s_i \vec{e}_1 + \theta_i \vec{v}_i, \ldots}^{n})_{\mathbb{B}_1}$, if $\rho(i) = \neg v_i$, $c_i := (\overbrace{s_i \vec{v}_i, \ldots}^{n_t})_{\mathbb{B}_1}$ where $\vec{f} \xleftarrow{U} \mathbb{F}_q^r$, $\vec{s}^T := (s_1, \ldots, s_L)^T := M \cdot \vec{f}^T$, $s_0 := \vec{1} \cdot \vec{f}^T$, $\theta_i \xleftarrow{U} \mathbb{F}_q$, $\vec{v}_i := (v_i^{n-1}, \ldots, v_i, 1)$ $$k^*_1 = (\overbrace{\omega \vec{y}, \ldots}^{n})_{\mathbb{B}^*_1} \quad \text{[Formula 6]}$$

where $\omega \xleftarrow{U} \mathbb{F}_q$.

6. The cryptographic system according to claim 3, wherein the processing circuitry generates at least one of a ciphertext $ct_\Gamma$ including a transmission-side vector $c_{1,t}$ indicated in Formula 7, and decrypts the ciphertext $ct_\Gamma$ by using a decryption key $sk_S$ including a reception-side vector $k^*_{1,t}$ indicated in Formula 8

$$c_{1,t} = (\overbrace{\omega \vec{y}_t, \ldots}^{n_t})_{\mathbb{B}_{1,t}} \quad \text{[Formula 7]}$$

where $\omega \xleftarrow{U} \mathbb{F}_q$, $\vec{y}_t := (y_{1,t}, \ldots, y_{n_t,t})$ such that $\sum_{j=0}^{n_t-1} y_{n_t-j,t} z^j = z^{n_t-1-n'_t} \cdot \prod_{j=1}^{n'_t} (z - x_{j,t})$ for $i = 1, \ldots, L$, [Formula 8]

if $\rho(i) = (t, v_i)$, $k^*_i := (\overbrace{s_i \vec{e}_{1,t} + \theta_i \vec{v}_i, \ldots}^{n_t})_{\mathbb{B}^*_{1,t}}$, if $\rho(i) = \neg (t, v_i)$, $k^*_i := (\overbrace{s_i \vec{v}_i, \ldots}^{n_t})_{\mathbb{B}^*_{1,t}}$ where $\vec{f} \xleftarrow{U} \mathbb{F}_q^r$, $\vec{s}^T := (s_1, \ldots, s_L)^T := M \cdot \vec{f}^T$, $s_0 := \vec{1} \cdot \vec{f}^T$, $\theta_i \xleftarrow{U} \mathbb{F}_q$, $\vec{v}_i := (v_i^{n_t-1}, \ldots, v_i, 1)$.

7. The cryptographic system according to claim 3, wherein the processing circuitry generates at least one of a ciphertext $ct_S$ including a transmission-side vector $c_{i,t}$ indicated in Formula 9, and decrypts the ciphertext $ct_S$ by using a decryption key $sk_\Gamma$ including a reception-side vector $k^*_{1,t}$ indicated in Formula 10

$$\text{for } i = 1, \ldots, L, \quad \text{[Formula 9]}$$
$$\text{if } \rho(i) = (t, v_i),$$
$$c_i := (\overbrace{s_i \vec{e}_{1,t} + \theta_i \vec{v}_t, \ldots}^{n_t})_{\mathbb{B}_{1,t}},$$
$$\text{if } \rho(i) = \neg(t, v_i),$$
$$c_i := (\overbrace{s_i \vec{v}_i, \ldots}^{n_t})_{\mathbb{B}_{1,t}},$$
where
$$\vec{f} \xleftarrow{U} \mathbb{F}_q^r,$$
$$\vec{s}^T := (s_1, \ldots, s_L)^T := M \cdot \vec{f}^T,$$
$$s_0 := \vec{1} \cdot \vec{f}^T,$$
$$\theta_{i,t} \xleftarrow{U} \mathbb{F}_q,$$
$$\vec{v}_i := (v_i^{n_t-1}, \ldots, v_i, 1)$$

$$k^*_{1,t} = (\overbrace{\omega \vec{y}_t, \ldots}^{n_t})_{\mathbb{B}^*_{1,t}} \quad \text{[Formula 10]}$$
where
$$\omega \xleftarrow{U} \mathbb{F}_q,$$
$$\vec{y}_t := (y_{1,t}, \ldots, y_{n_t,t}) \text{ such that } \sum_{j=0}^{n_t-1} y_{n_t-j,t} z^j =$$
$$z^{n_t-1-n'_t} \cdot \prod_{j=1}^{n'_t}(z - x_{j,t}).$$

8. The cryptographic system according to claim 3, wherein
the processing circuitry generates a signature Sig including a transmission-side vector $s^*_i$ indicated in Formula 11, and
verifies the signature Sig by using a verification key vk including a reception-side vector $c_i$ indicated in Formula 12

$$s^*_i := \gamma_i \cdot \xi k^*_1 + \sum_{t=1}^n u_{i,t} \cdot b^*_{1,t}, \text{ for } i = 1, \ldots, L \quad \text{[Formula 11]}$$
where
$$k^*_1 = (\overbrace{\omega \vec{y}, \ldots}^{n})_{\mathbb{B}^*_1},$$
$$\xi \xleftarrow{U} \mathbb{F}_q,$$
$$\gamma_i, \vec{u}_i := (u_{i,1}, \ldots, u_{i,n}) \text{ are defined as}$$
if $i \in I \wedge \rho(i) = \vec{v}_i$,
$$\gamma_i := \alpha_i,$$
$$\vec{u}_i \xleftarrow{U} \{\vec{u}_i \mid \vec{u}_i \cdot \vec{v}_i = 0 \wedge u_{i,1} = \beta_i\},$$
if $i \in I \wedge \rho(i) = \neg \vec{v}_i$,
$$\gamma_i := \frac{\alpha_i}{\vec{v}_i \cdot \vec{y}},$$
$$\vec{u}_i \xleftarrow{U} \{\vec{u}_i \mid \vec{u}_i \cdot \vec{v}_i = \beta_i\},$$
if $i \notin I \wedge \rho(i) = \vec{v}_i$,
$$\gamma_i := 0,$$
$$\vec{u}_i \xleftarrow{U} \{\vec{u}_i \mid \vec{u}_i \cdot \vec{v}_i = 0 \wedge u_{i,1} = \beta_i\},$$
if $i \notin I \wedge \rho(i) = \neg \vec{v}_i$,
$$\gamma_i := 0,$$
$$\vec{u}_i \xleftarrow{U} \{\vec{u}_i \mid \vec{u}_i \cdot \vec{v}_i = \beta_i\}$$

-continued $$\text{for } i = 1, \ldots, L, \quad \text{[Formula 12]}$$
if $\rho(i) = v_i$,
$$c_i := (\overbrace{s_i \vec{e}_1 + \theta_i \vec{v}_t, \ldots}^{n})_{\mathbb{B}_1},$$
if $\rho(i) = \neg v_i$,
$$c_i := (\overbrace{s_i \vec{v}_t, \ldots}^{n_t})_{\mathbb{B}_1}$$
where
$$\vec{f} \xleftarrow{U} \mathbb{F}_q^r,$$
$$\vec{s}^T := (s_1, \ldots, s_L)^T := M \cdot \vec{f}^T,$$
$$s_0 := \vec{1} \cdot \vec{f}^T,$$
$$\theta_i \xleftarrow{U} \mathbb{F}_q,$$
$$\vec{v}_i := (v_i^{n-1}, \ldots, v_i, 1).$$

9. A non-transitory computer readable medium storing a cryptographic program for performing a cryptographic process using a basis B and a basis B*, the cryptographic program causing a computer to execute:

a transmission-side process of generating a transmission-side vector being a vector in the basis B and being generated using one vector of a first vector consisting of coefficients $y_j$ (j=1, n) of a polynomial having attribute information $x_i$ (i=1, . . . , n', n' being an integer from 1 to n−1, n being an integer of 2 or greater) as roots and a second vector consisting of $v_1^i$ (i=0, . . . , n−1) being a power of predicate information $v_1$;

a reception-side process of performing a pairing operation on the transmission-side vector and a reception-side vector being a vector in the basis B* and being generated using another vector of the first vector and the second vector; and wherein at least one of the transmission-side process and reception-side process generates at least one of a ciphertext, decryption key and signature output of reduced size containing the transmission-side vector or reception-side vector to reduce processing time of an encryption or decryption process.

* * * * *